May 10, 1966     R. L. BURKHOLDER ETAL     3,251,040
COMPUTER INPUT-OUTPUT SYSTEM

Filed Dec. 1, 1961     48 Sheets-Sheet 1

INVENTORS
*HERMAN OSOFSKY*
*ROBERT J. GOUNTANIS*
*ROBERT L. BURKHOLDER*
BY *Thomas J. Nikolai*
AGENT

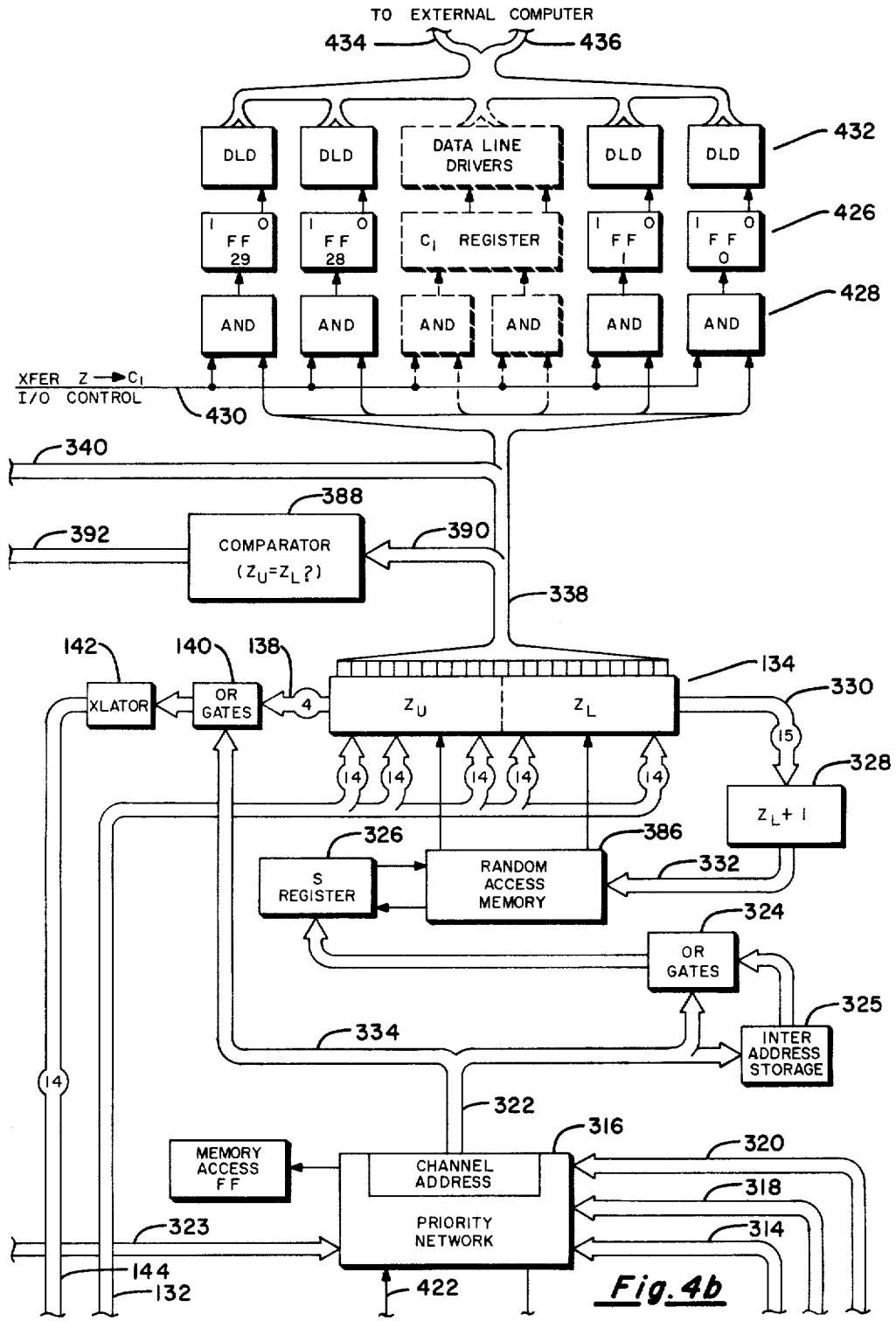

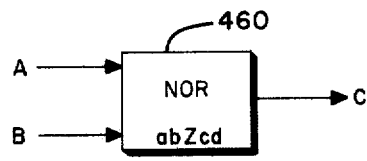
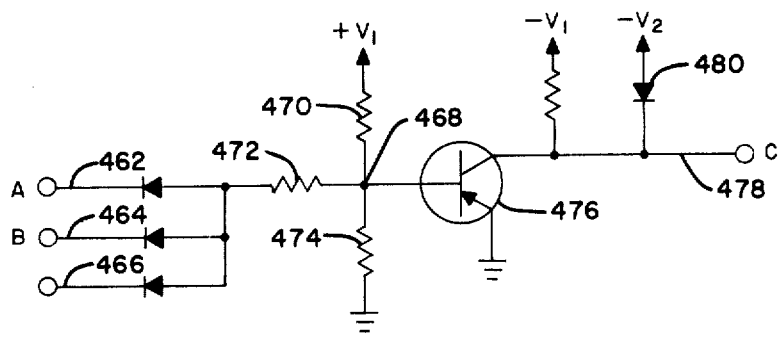
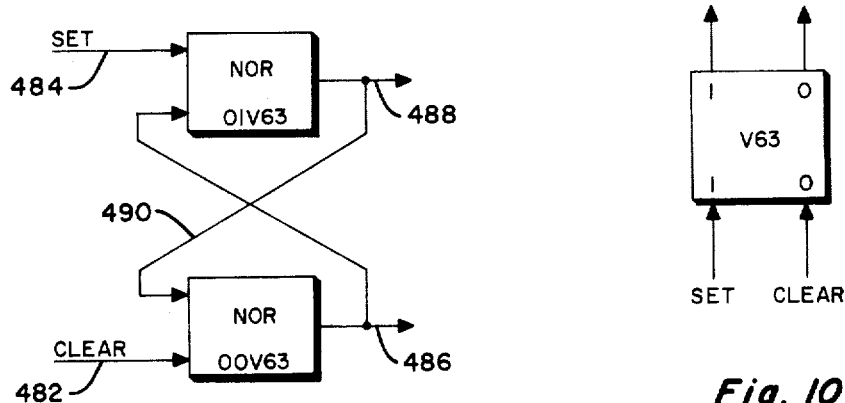

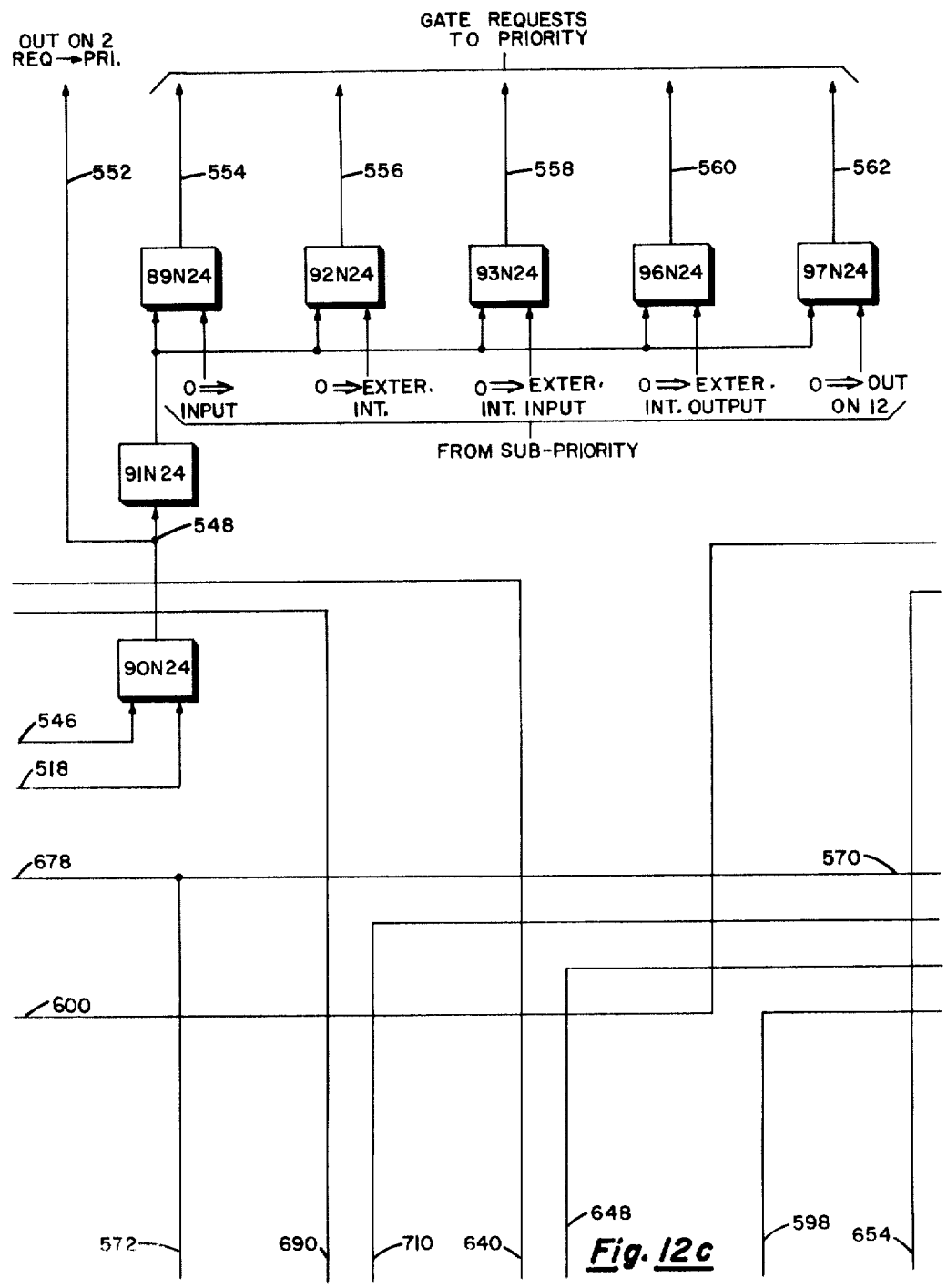

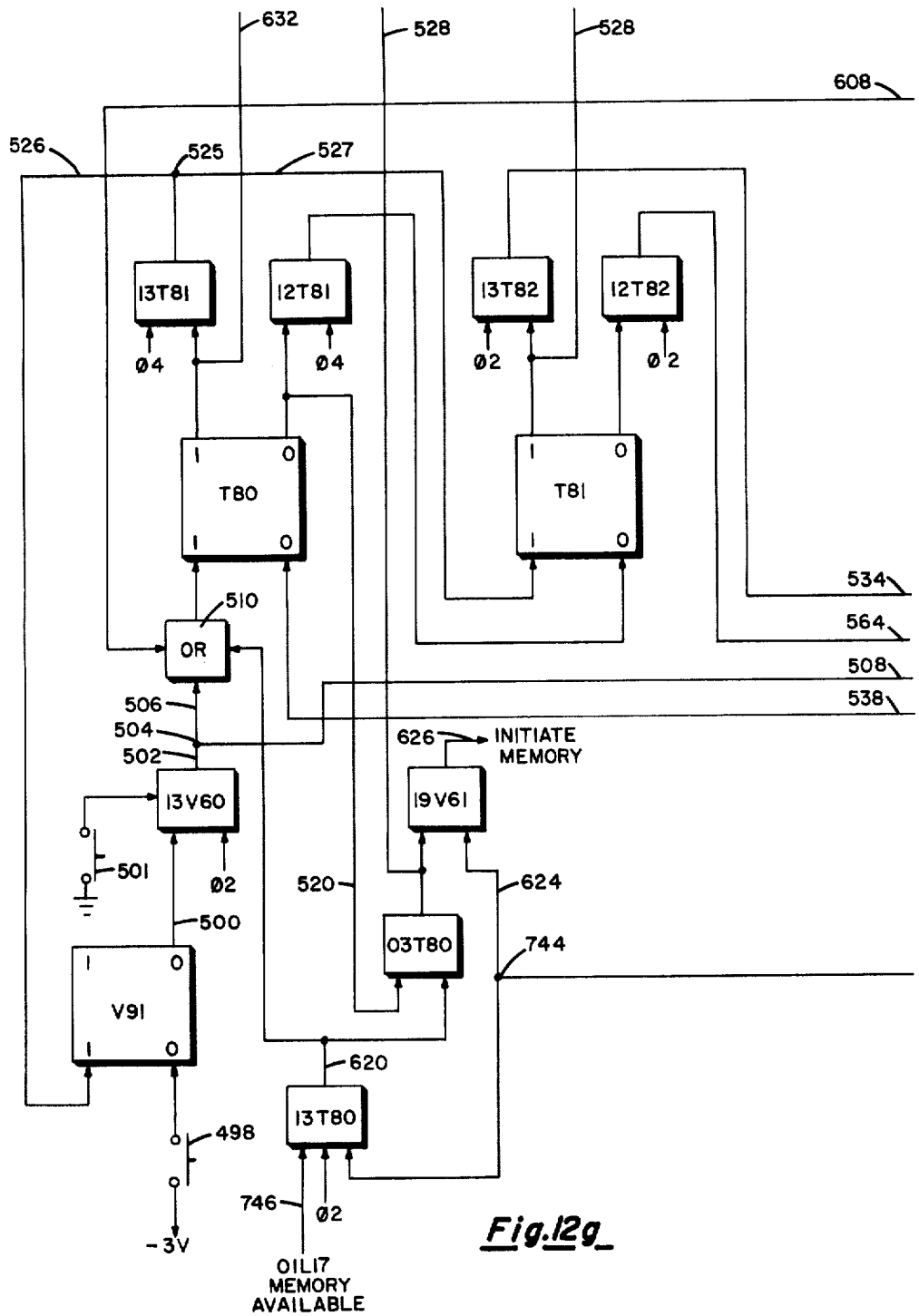

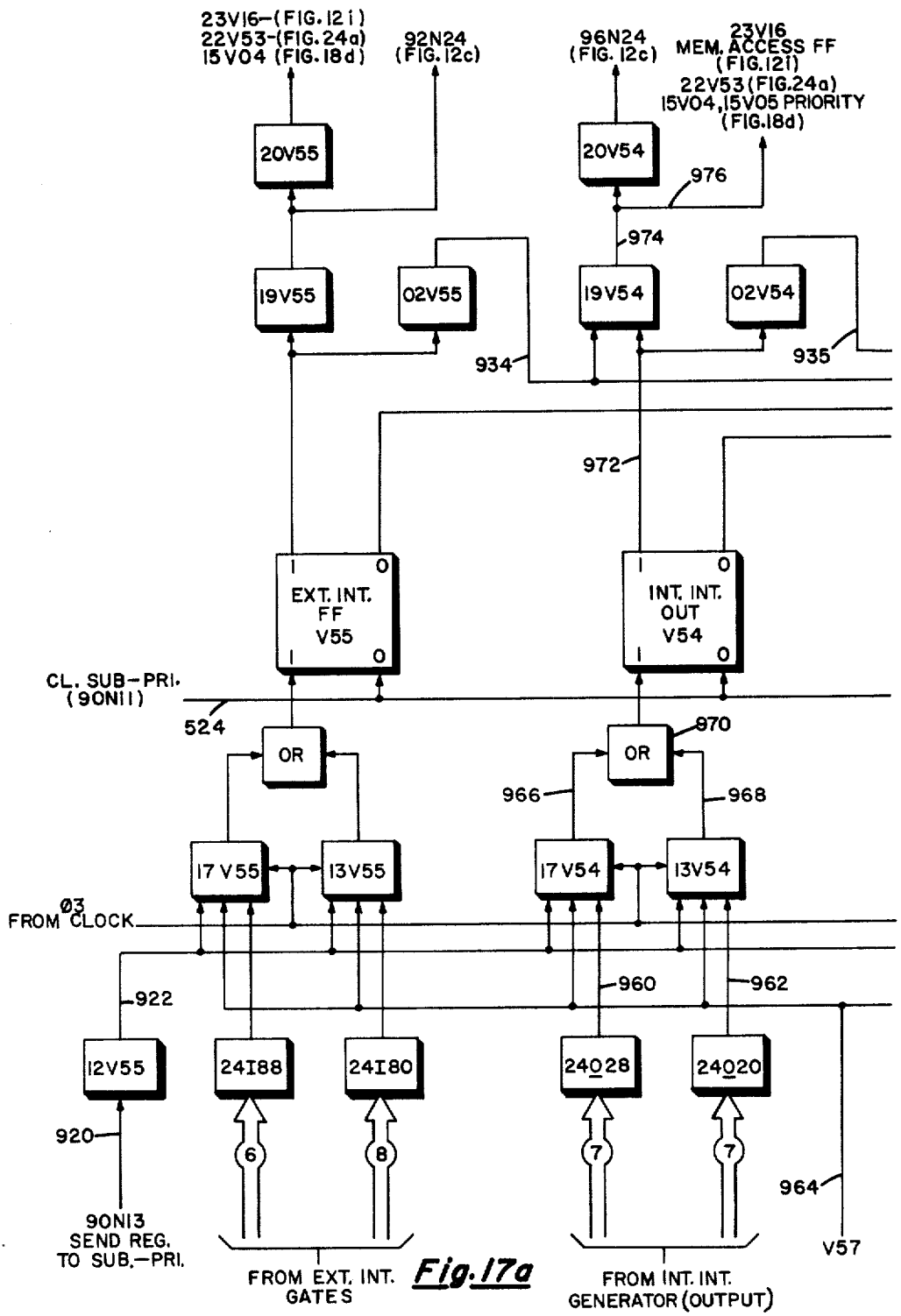

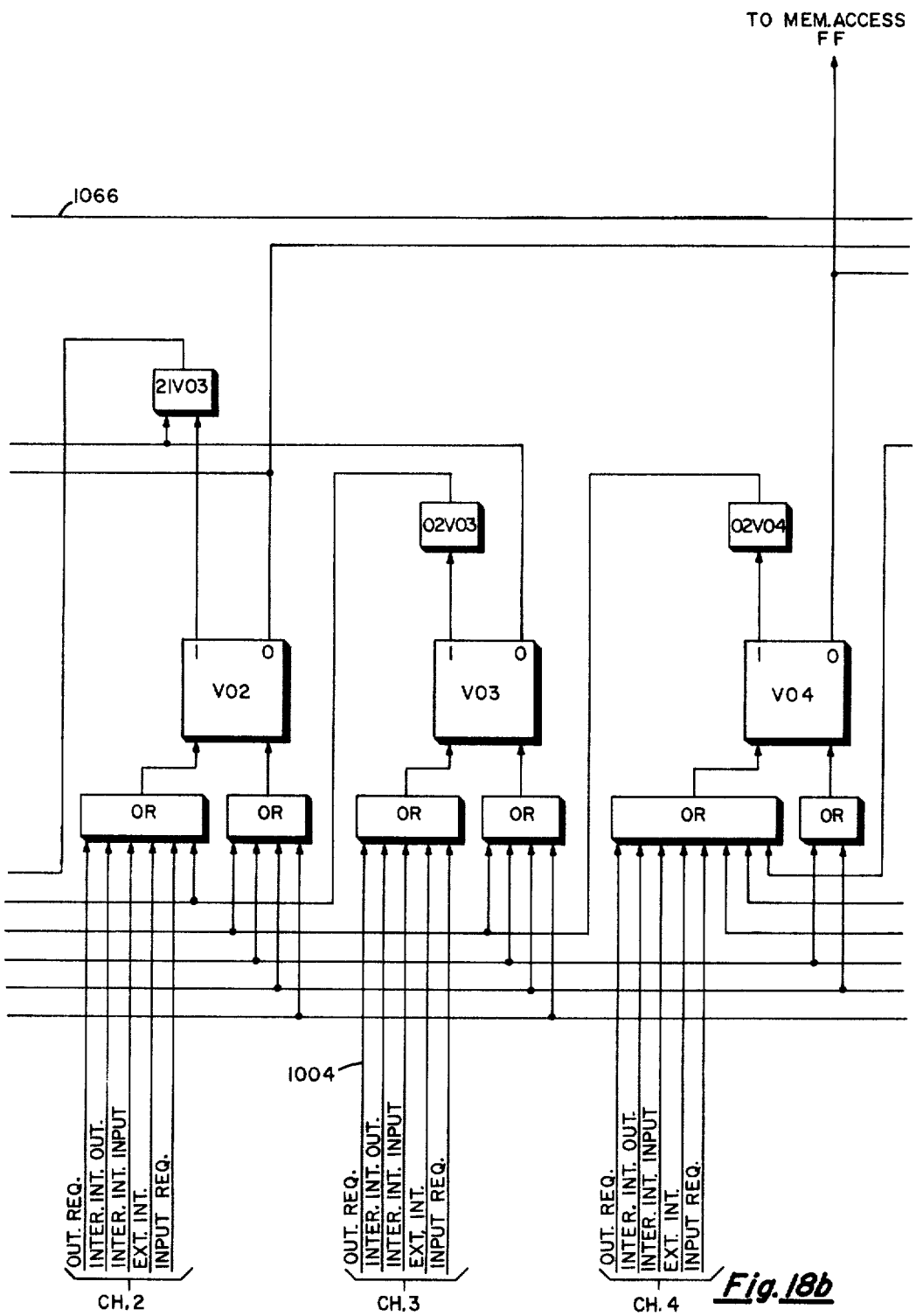

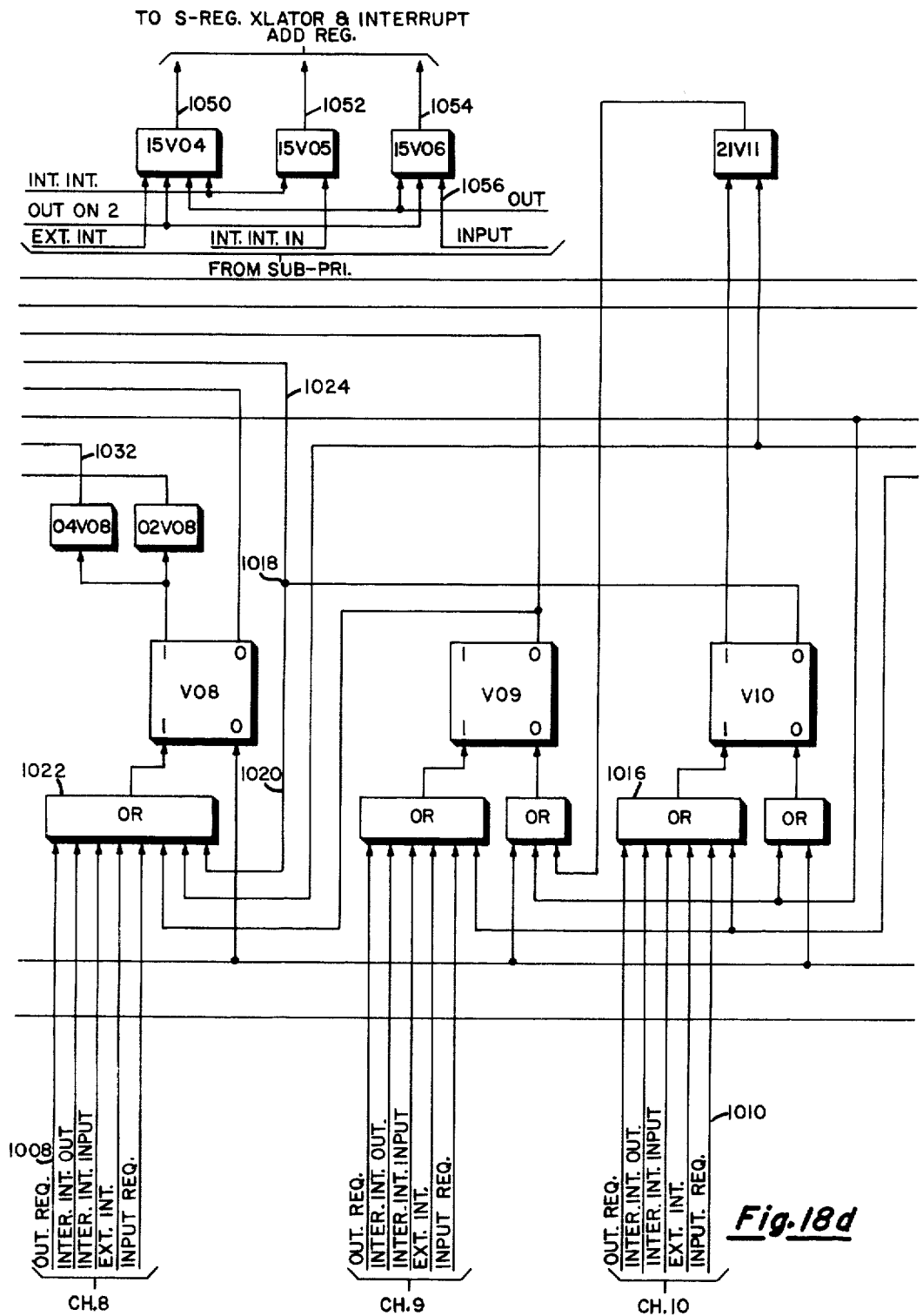

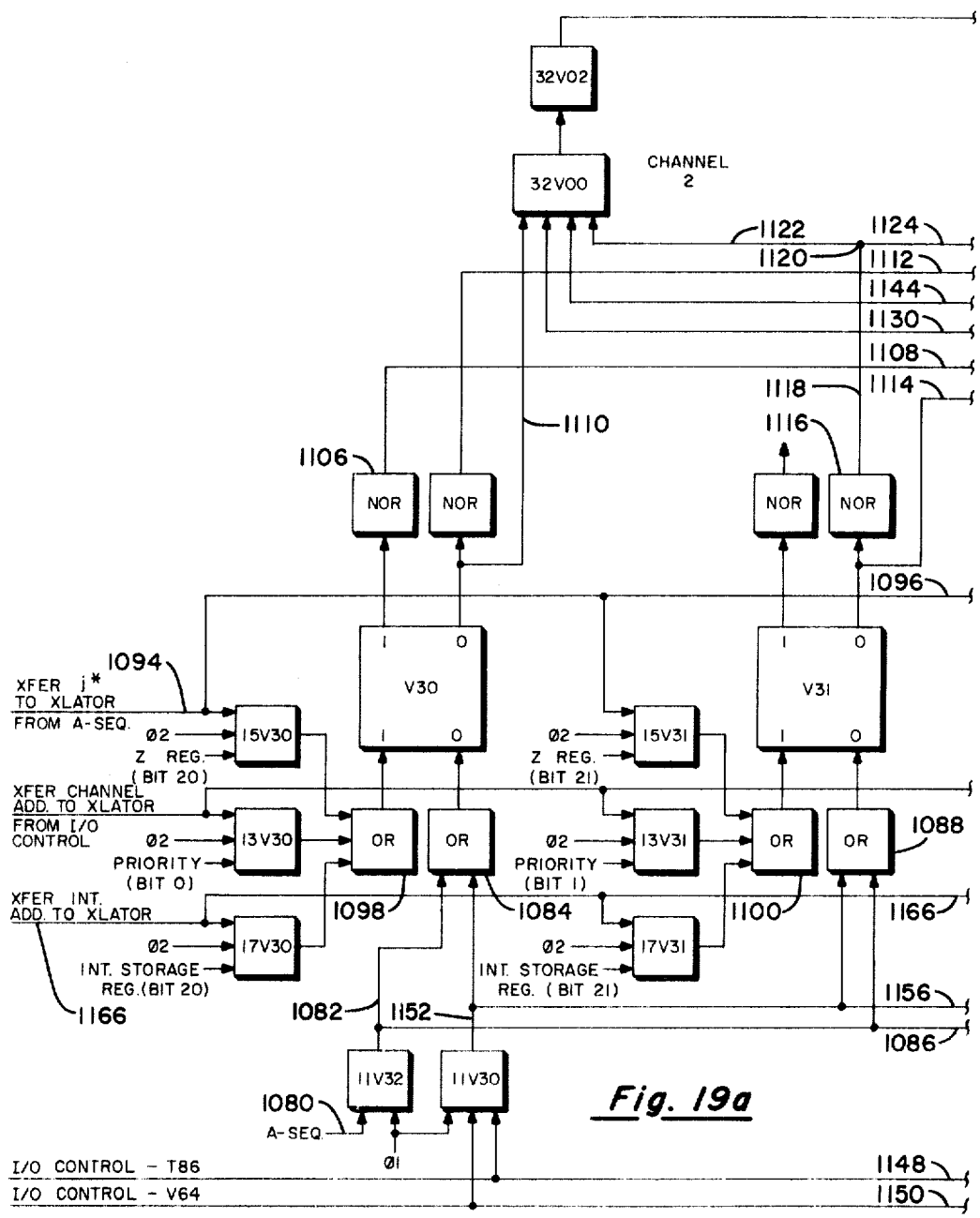

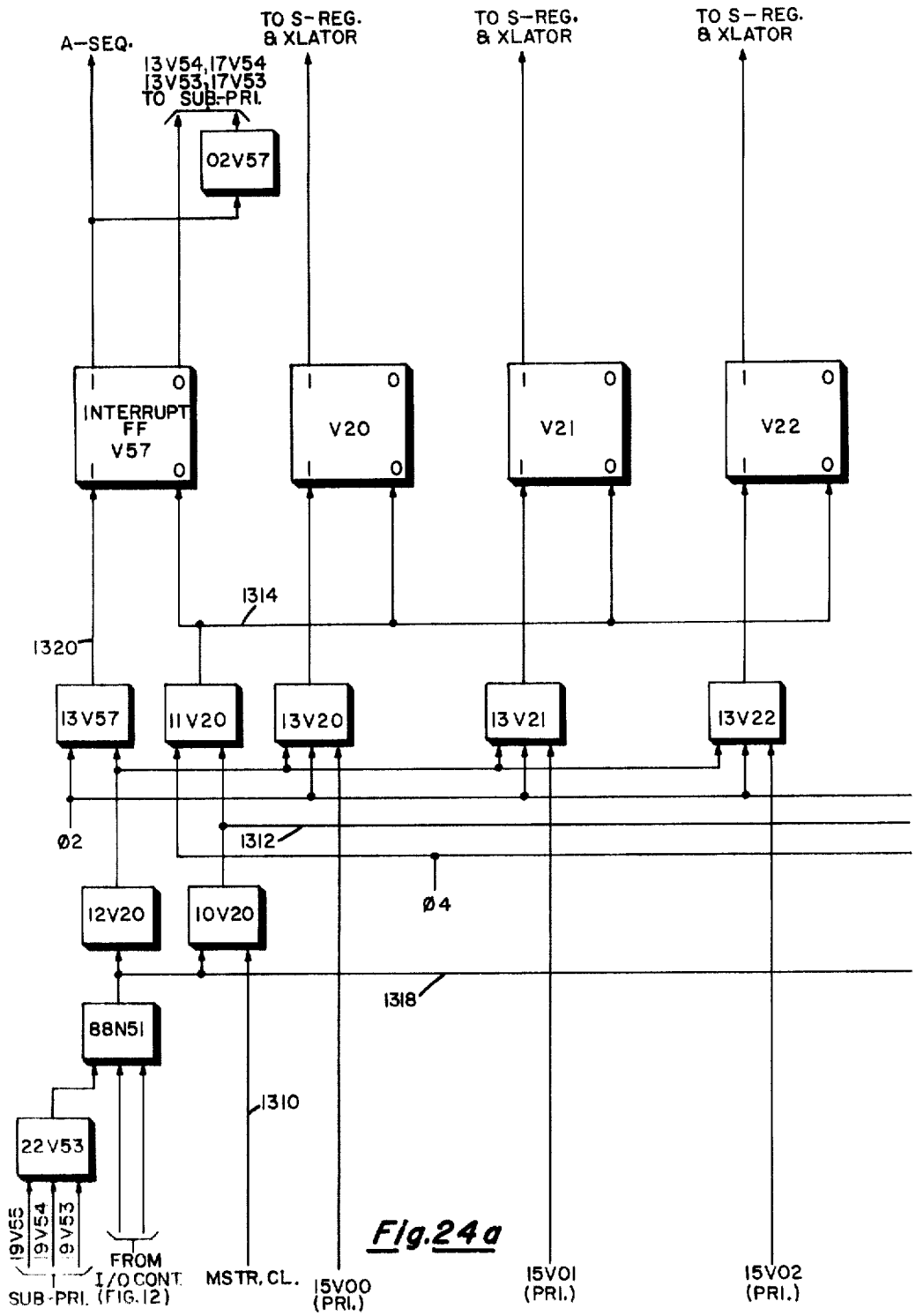

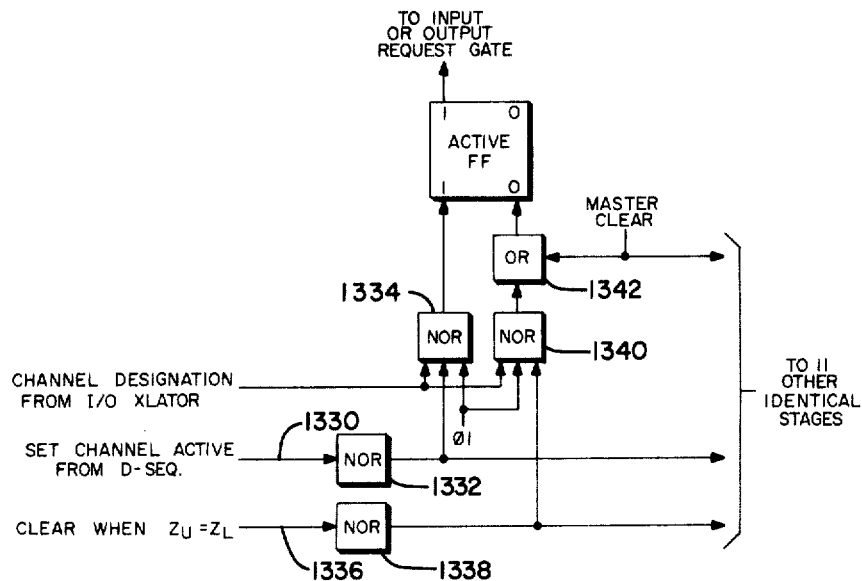
Fig. 25
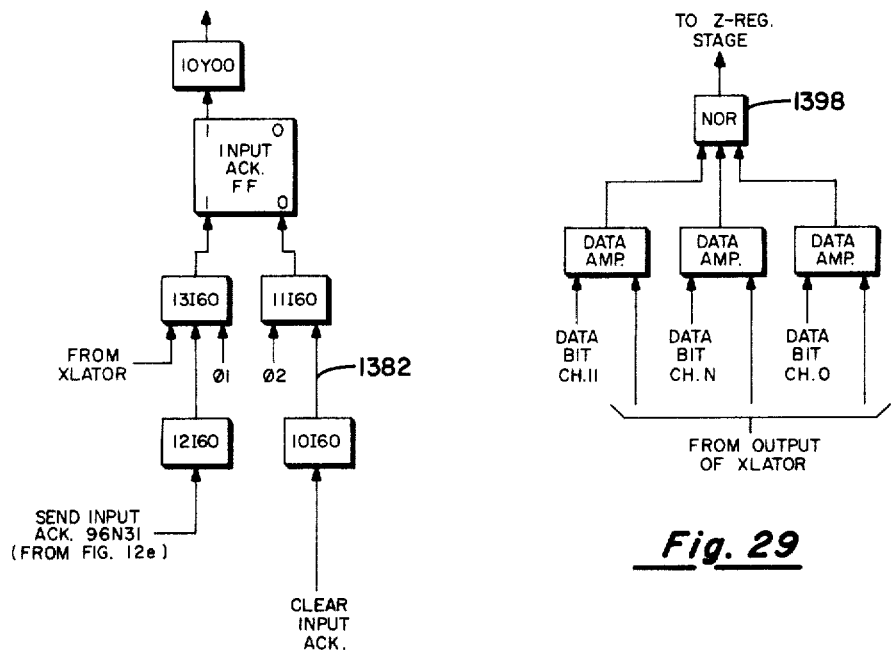
Fig. 27
Fig. 29

@# United States Patent Office 3,251,040
Patented May 10, 1966

3,251,040
COMPUTER INPUT-OUTPUT SYSTEM
Robert L. Burkholder, Minneapolis, Robert J. Gountanis, Mendota Heights, and Herman Osofsky, Roseville, Minn., assignors to Sperry Rand Corporation, New York, N.Y., a corporation of Delaware
Filed Dec. 1, 1961, Ser. No. 156,375
13 Claims. (Cl. 340—172.5)

The present invention relates generally to digital data processing equipment, and more specifically to an improved arrangement for transferring information between a digital computer and its associated peripheral equipment and/or between two or more digital computers.

In real time communication systems employing digital data processing equipment, a computer is utilized to perform operations on the digital data which may be supplied to it from a plurality of stations. Located at each of these stations is equipment capable of feeding the digital data into the computer and of receiving the data from the computer after it has performed its operations on the data. Included among the plurality of external devices with which the central computer may communicate are devices operating at comparatively slow speeds as well as devices operating at relatively high speeds. Included in the slow-speed class are devices which require mechanical operations, such as paper tape punches and readers, typewriters, magnetic tape units, magnetic drum units, etc. An example of a relatively high speed device is another computer, which may be considered as a peripheral device in a multi-computer complex as far as a central computer is concerned.

Since present day computers are able to perform operations in a few millionths of a second, while certain types of peripheral equipment generally function at a much slower rate (i.e. several thousandths of a second), it would be inefficient to tie up the computer's computation process merely to allow it to communicate with the external equipment.

It is accordingly an object of the present invention to provide a system whereby communication between a high speed computer and remotely located external devices of relatively low speed can be interleaved with the normal high speed computational and data processing operations of a digital computer.

It should not be inferred from the foregoing paragraph that all peripheral devices which may be employed with the computer of this invention can operate only at a speed which is slow as compared with the computational speed of the computer. In fact, one of the features of the input-output section of this invention is that it can accept data from both low and high speed devices and still carry out computational processes.

In general, each of the external devices is able to maintain two basic types of communication with a central computer; input communication, in which information is fed into the computer, and output communication, in which data is transmitted from the computer to the external devices.

By definition, the two basic types of communication, input and output, are considered as being in reference to the central computer, the term "input" meaning that information is being fed into the computer and the term "output" meaning that data is being transmitted from the central computer to the remote stations. Since all of the external devices (which may include other computers) are adapted to communicate with the single central computer, it is the job of the central computer to tell the external devices which of the two basic types of communication is to be accepted.

Consequently, another object of this invention is to provide a system wherein a central computer establishes the basic type of communication, input or output, between it and an external device.

The comparatively low speed operation of the external devices mentioned above makes it more efficient to interleave the communication with them. For example, assume that the central computer enters into communication with an external device and the device is capable of sending input information to the computer at the rate of one word of data every 100 milliseconds. After having transmitted one word of data and getting ready to transmit the next, the computer can establish communication with external devices at other locations. In this way, there is a time-sharing or interleaving between the computer and the slower speed external devices.

Hence, another object of the present invention is to provide a system wherein the communication with a central computer is time-shared among a plurality of external devices, one or more of which may be another computer.

Next consider a real time communication system. This is a system in which the processing of data takes place substantially in synchronism with a physical process in such a fashion that the results of the data processing become immediately useful to the physical operation. Because some information coming from various remote locations may be considered more important than that coming from other remote stations, the system should provide some means of establishing priority between the various connected remote systems.

It is a further object of the present invention to provide a real time communication system wherein the communication between a central computer and a plurality of remotely located external devices is, in part, controlled by a priority system.

Relative to the above priority system, it is a possibility that one of the external devices may wish to take precedence over all of the others. It may want to direct the computer to establish communication with it rather than to wait for the central computer to determine when to establish the communication. In this case, means must be provided whereby the external device may interrupt the normal computer operation and claim priority over all of the other external devices, thereby causing the computer to establish communication with the interrupting external device.

Still another object of this invention is to provide a real time communication system wherein the external devices may interrupt the normal computer operations to establish communication with the central computer.

Once the computer has established communication with an external device, there is no longer a need for the computer to maintain rigid control of this communication. The computer should be free to perform its high speed operation on data that had previously been received and stored in the computer memory. The computer need only be required to note when the external device has finished transmitting data to or receiving data from the computer. Once the information has been completely received or completely transmitted, the communication should be capable of being automatically terminated.

Thus, still another object of this invention is to provide a communication system wherein the communication between the central computer and the peripheral device is self-running and self-terminating.

In the prior art there are described communication systems in which data may be transferred between the computer memory and a plurality of remote devices. However, in these prior art arrangements the computer memories generally only communicate with as many discrete external devices as the number of input and output channels provided with the computer. Another limitation is that the computer program in question has to contain a special reference to this channel each time a data transfer is to take place. The present invention removes these restrictions. The computer employed in the preferred embodiment of the present invention has a plurality of input and output channels to be used for communications between the computer memory and mass storage units, tape handlers, card readers, punches and other standard peripheral equipment at the computer site. Further input and output channels are also provided to permit a transfer of information between two or more high speed digital data processors. Also, any number of these input and output channels may be used for multiplexing data to and from discrete remote data handling devices provided that suitable synchronizing equipment is present at the remote site.

In the communication system of the present invention, the digital computer empolyed is designed to operate in what may be termed an "Internally Specified Index" mode. In this mode there is associated with each of the input and output channels, words in the memory section of the computer termed index or buffer control words. These words are used to designate where the data is to be placed in storage in the case of an input transfer; or where the output data is to be taken from, in the case of an output data transfer.

For example, the index word for output channel number 6 may be kept at the storage location 00126 (octal) in the memory. Two addresses are stored at this location. The lower half of the index word may contain the address of the next word of data to be sent out on channel six. The upper half of this index word contains the address of the final word of data which the computer desires to send out on channel six. Whenever the peripheral device on this channel requests a word of data from the computer, the input-output logic of the computer automatically references the index word at location 00126 to find where to get the next word of data for the peripheral device. The remaining output channels may be made to operate similarly, each using its own unique index word.

When the index word is referenced to obtain the address of or for the data, the address stored in the lower part of the index word is incremented by one, as the index word is restored to core memory. The next time a data transfer is requested by the peripheral equipment located on the same channel, the address in the lower half of the index word will be incremented again and replaced in the same storage location. This process of incrementing causes successive data words arriving at a given input channel to be placed in sequential memory locations. It can be seen, then, that in the system forming the preferred embodiment of this invention, the computer program need only reference a particular channel once in order to set up the limits for the data transfer. After this has been done no further program references need be made and the communication may take place at a rate determined by the peripheral equipment.

Accordingly, one of the primary objects of the present invention is to provide a means whereby both data handling devices and other computers may assume communications with the memory section of a given computer along one of a plurality of input-output channels at a rate determined primarily by the peripheral units connected thereto.

When the terminating and present address of the index word are equal, means are provided for advising the computer that the buffer transfer is complete. Without this indication the computer itself does not realize that the communication has been terminated. In many cases it is advantageous to inform the central computer when the communication has been terminated so that the central computer is able immediately to process the data that has been received from the peripheral device or to immediately place more information or more data for transmission to the peripheral device. The signal indicating the termination of communication with a particular channel is referred to herein as an Internal Interrupt signal, and occurs upon the equalization of the present address and the terminal address. The Internal Interrupt signal can then be utilized by the central computer to effect a program jump into a new routine, that is, a new program planned to perform subsequent operations.

There are differences between the intercomputer communications and communictions between the computer and normal peripheral devices. One reason for the difference is due to the fact that the computers have compatible operating speeds, and hence, could be transmitting and receiving information from each other and processing same at such high rates that any slow speed peripheral devices would be unable to establish communication with the computers. The more important reason for the difference lies in the function of a computer as compared to the function of peripheral devices. Peripheral devices serve solely as sources of information for the central computer or destinations for receiving data from the central computer. That is, they can be considered more or less slave units to the central computer and their sole purpose is to either change data from one form to another or to provide large capacity storage for information that will be, or has been, operated on by the central computer. Where a data processing system includes more than one computer, each of the computers is in its own entity. Each computer will have its own associated peripheral devices and will perform its own operations on data. In other words, a computer does not necessarily serve solely as an auxiliary device for another computer. Each of the computers performs its own separate function, but allowance must still be made for transmitting information between the computers. Therefore, each computer does not just wait for demands from another computer as do the normal peripheral devices. It is apparent, then, that each computer must be self-operating and must also have some control over communication with the other computer. For example, assuming that computer A wishes to transmit information to computer B, computer B must also provide some control over the transmission of data in case computer B is not in a condition to receive the information from computer A at the time in question. Because of the foregoing differences between intercomputer communication and computer-peripheral device communication, the intercomputer communication is handled in a somewhat different manner than the computer-peripheral equipment communication.

Other objects of the invention will be pointed out in the following description and claims and illustrated in the accompanying drawings, which disclose, by way of example, the principles of the invention and the best mode, which has been contemplated, of applying these principles.

In the drawings:

FIGS. 4a–4e illustrate diagrammatically the chief components or circuits of the input-output section of the computer;

FIG. 6 shows the symbol used to represent a NOR circuit, the basic building block of the present invention;

FIG. 7 illustrates a truth table for a NOR logic block;

FIG. 8 illustrates the schematic diagram of an electronic circuit which may be used to implement NOR type logic;

FIG. 9 shows the manner in which two of the NOR circuits of FIG. 6 may be interconnected to obtain a bi-stable device or flip-flop;

FIG. 10 illustrates the symbol employed herein for representing a flip-flop;

Figure 2:
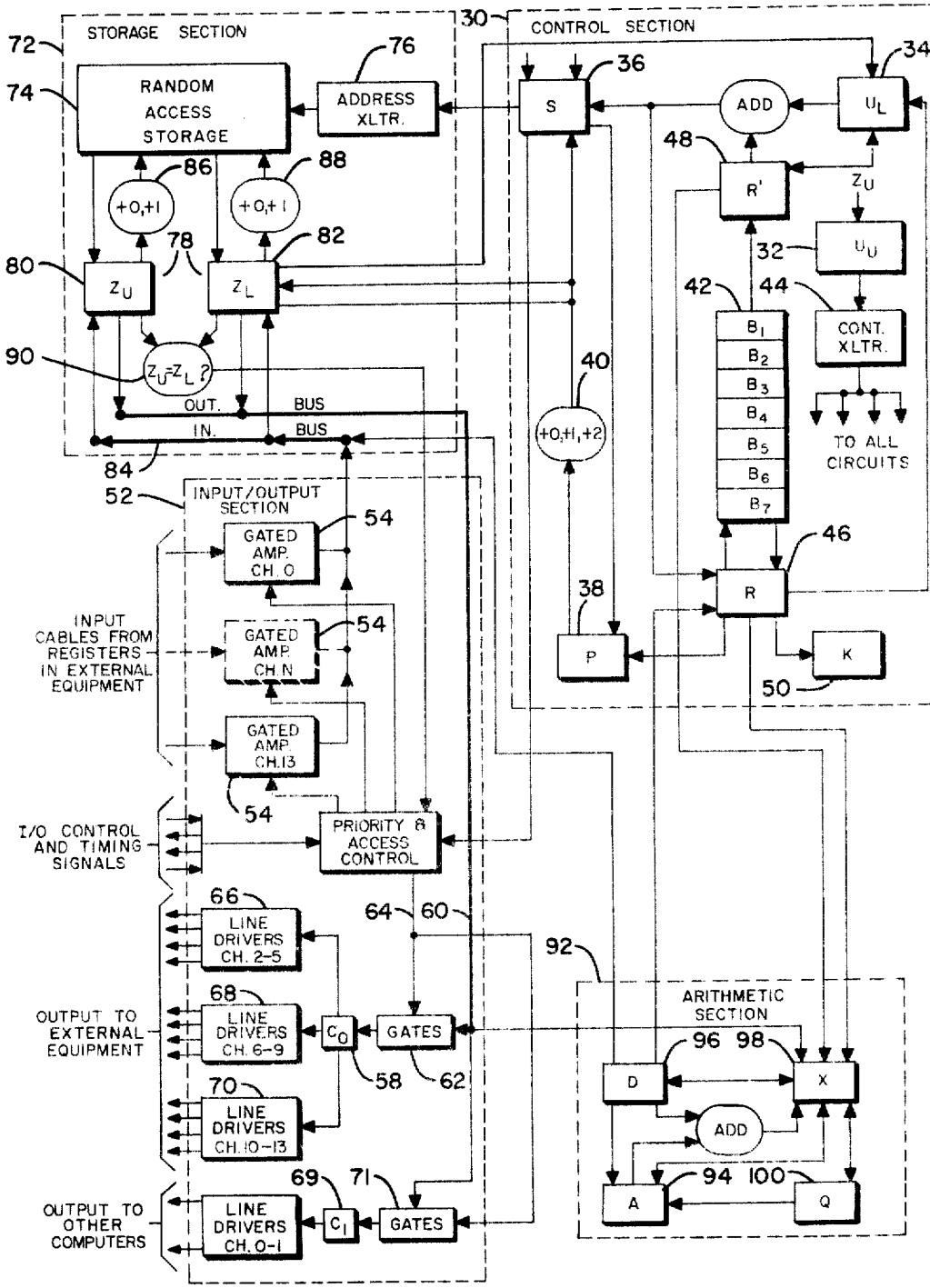
FIG. 2 is a block diagram illustrating the main sections of the computer of the present invention.
Figure 12A:
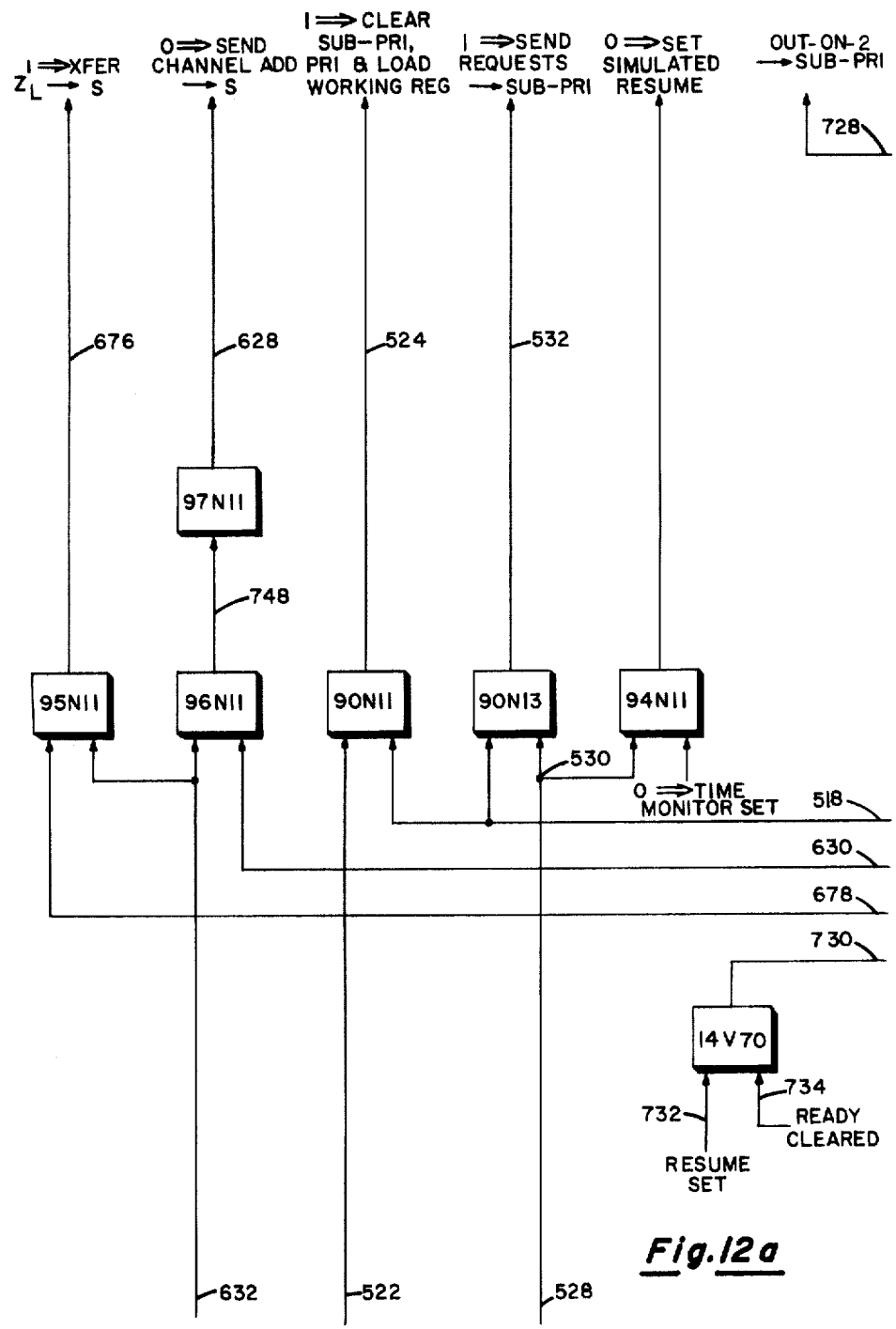
Figure 12B:
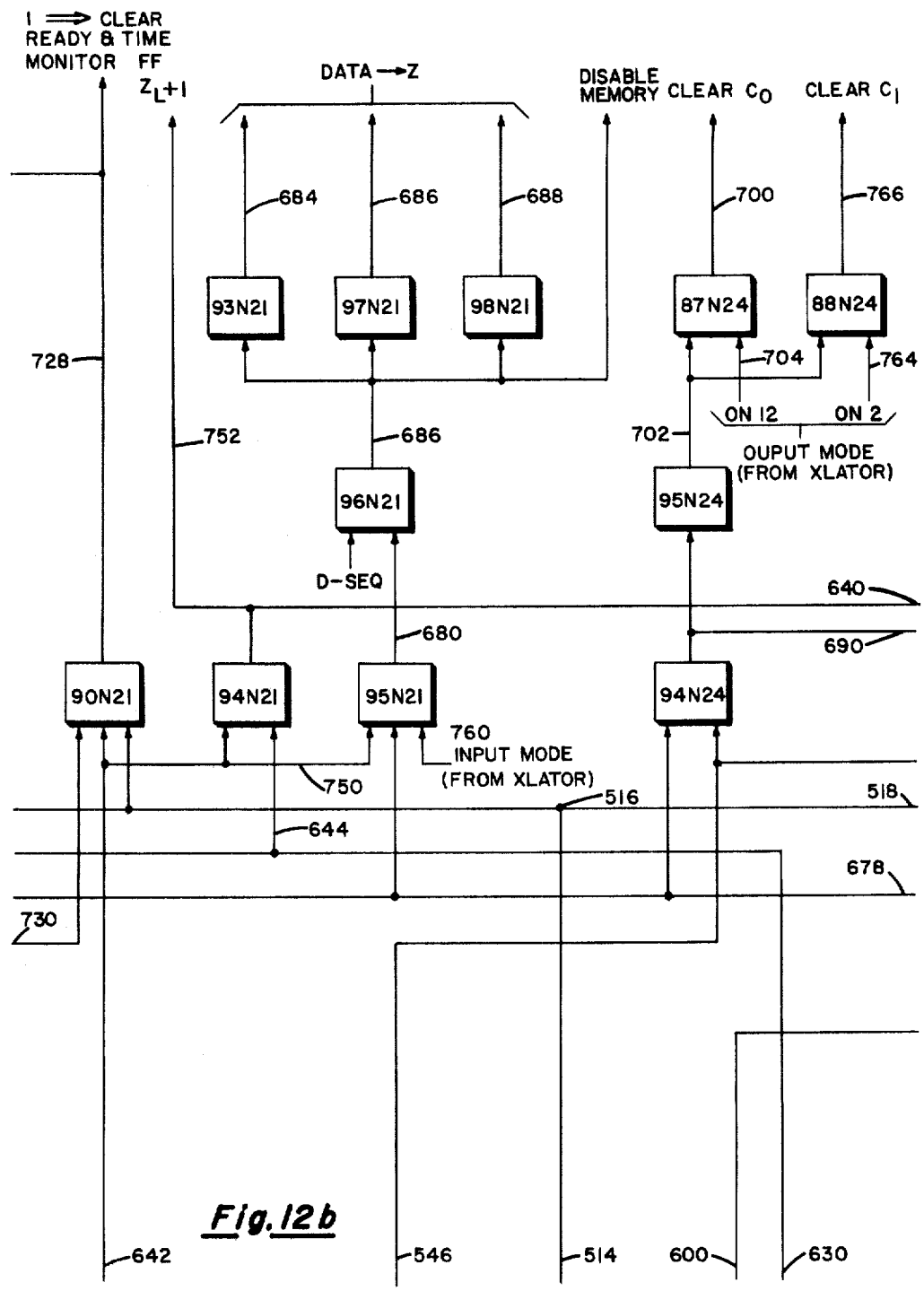
Figure 12D:
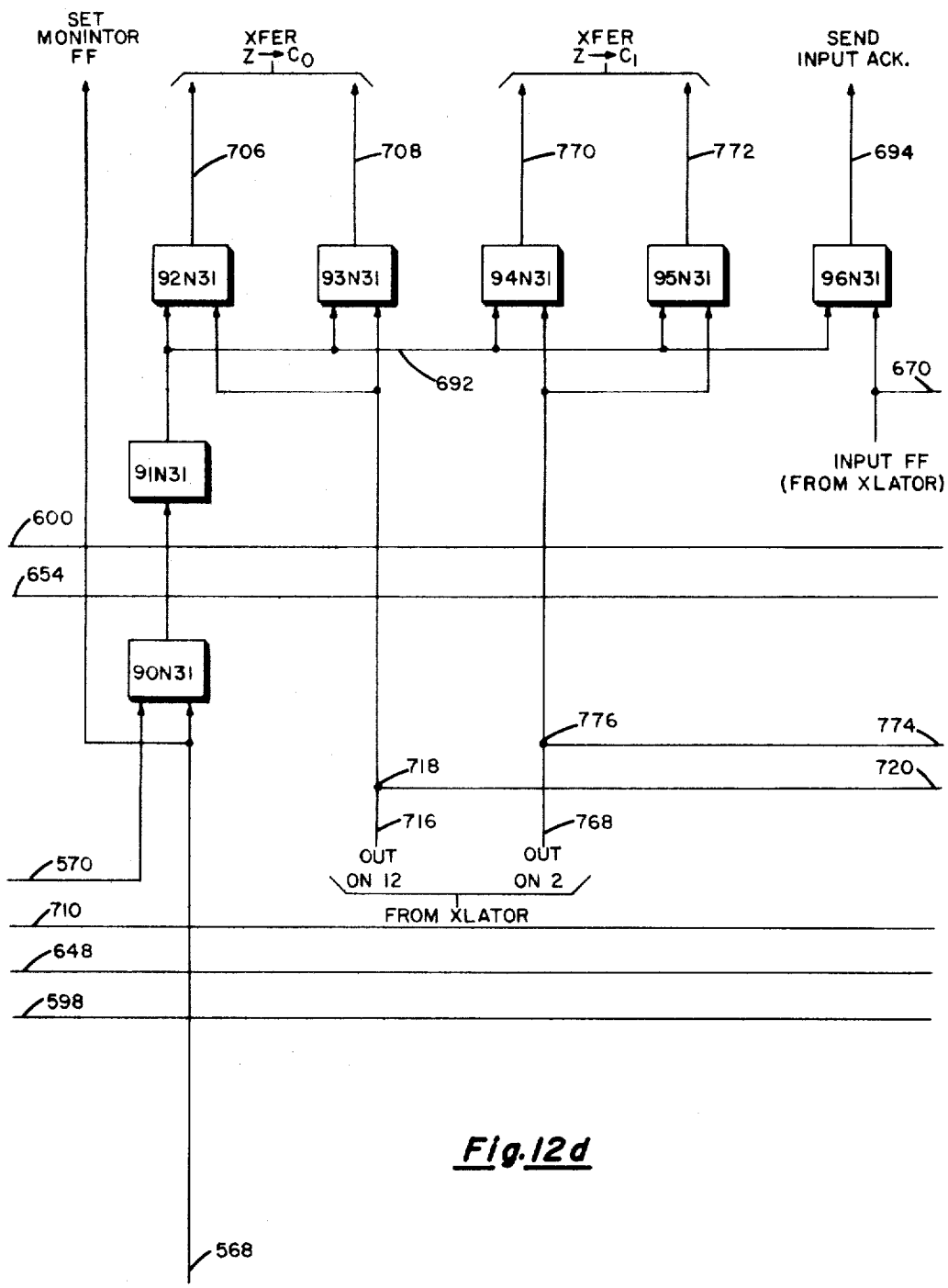
Figure 12E:
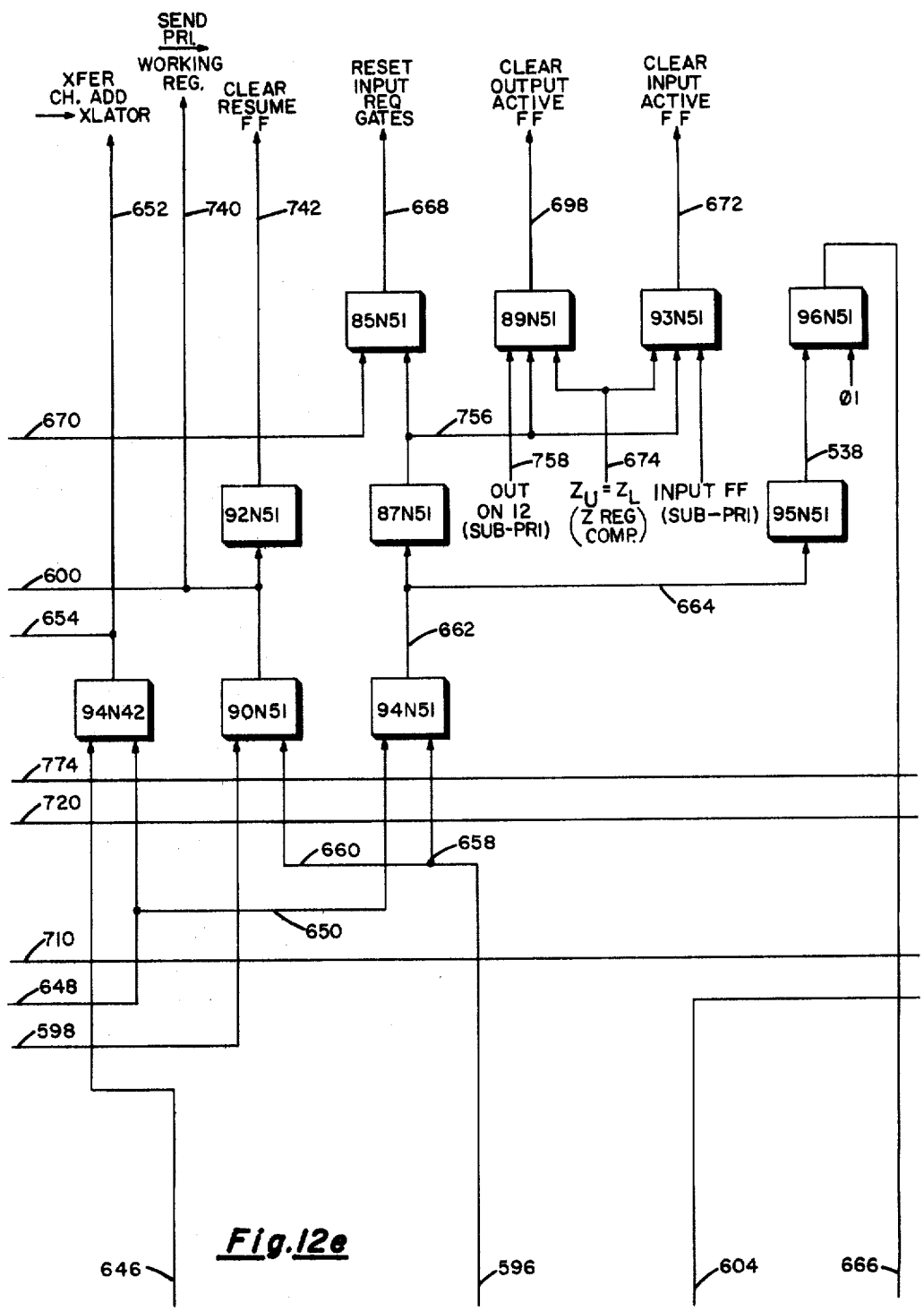
Figure 12F:
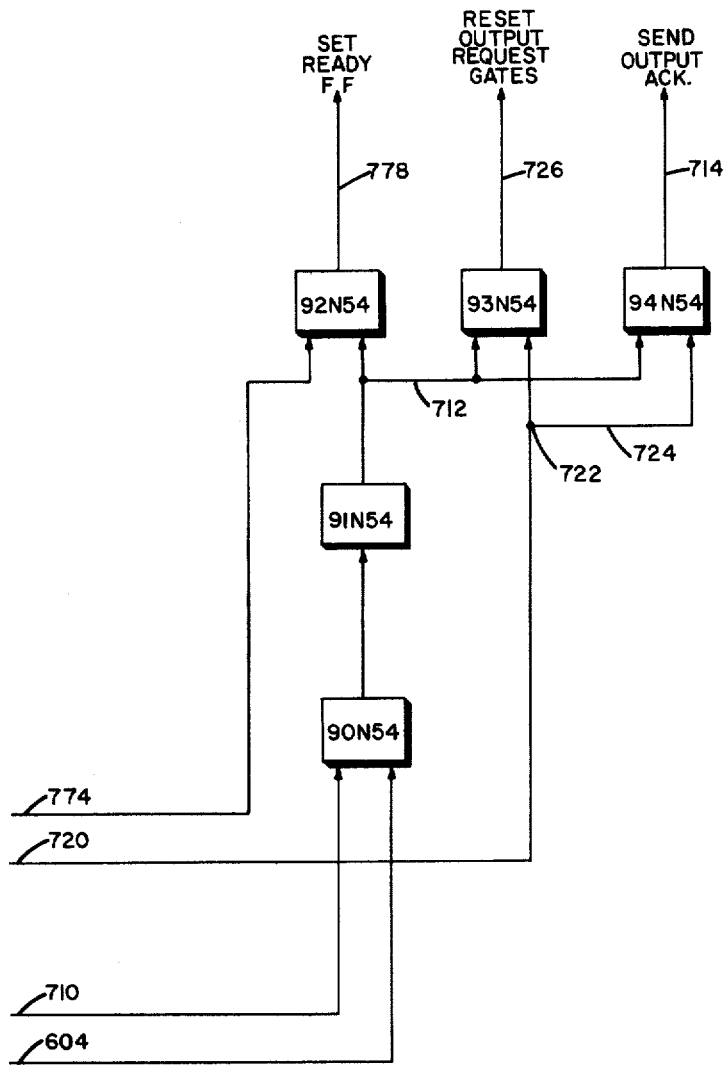
Figure 12H:
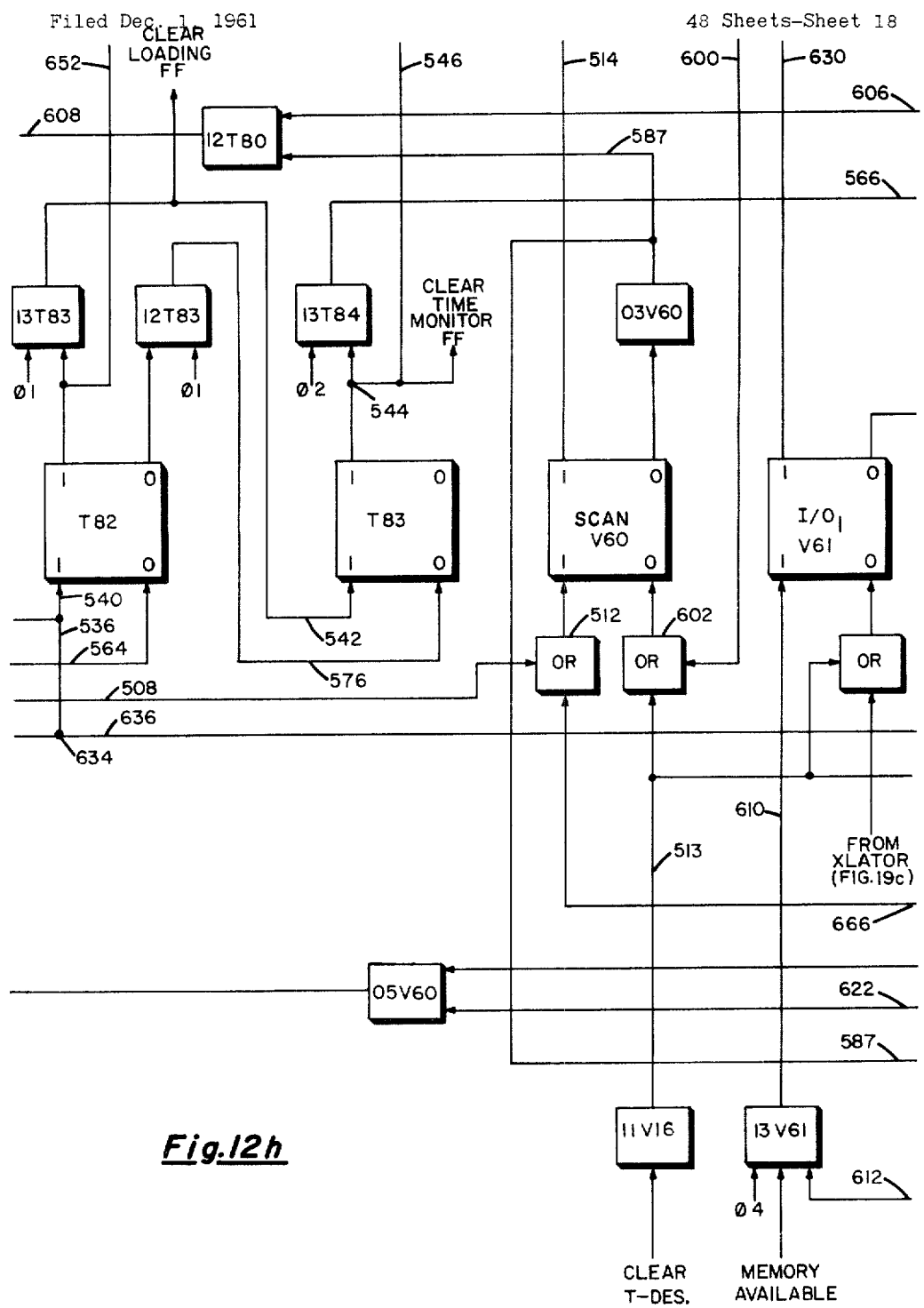
Figure 121:
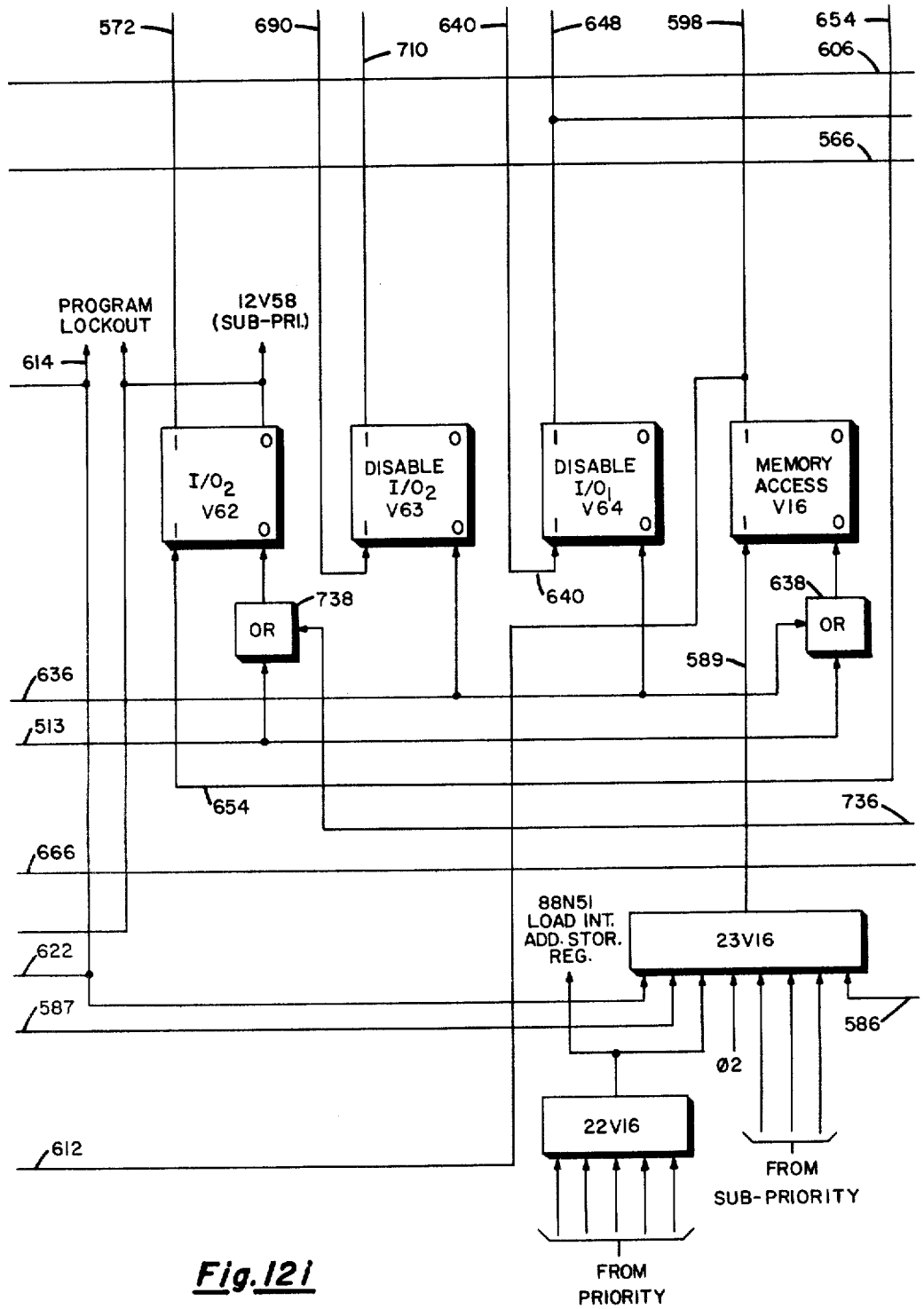
Figure 12J:
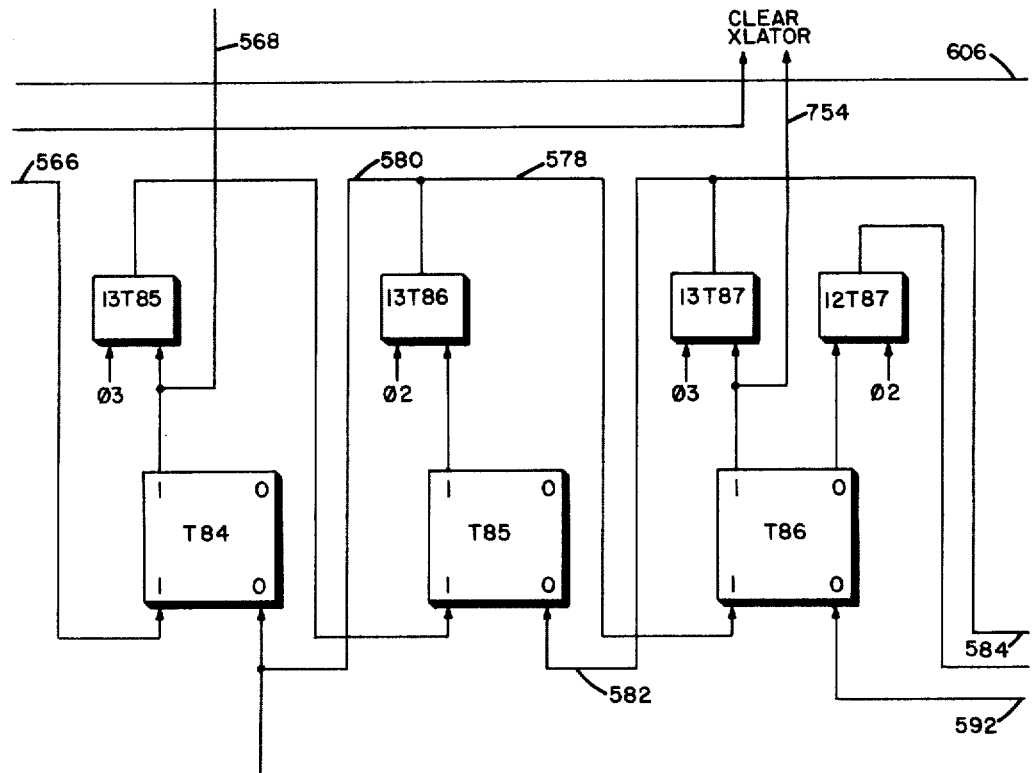
Figure 12K:
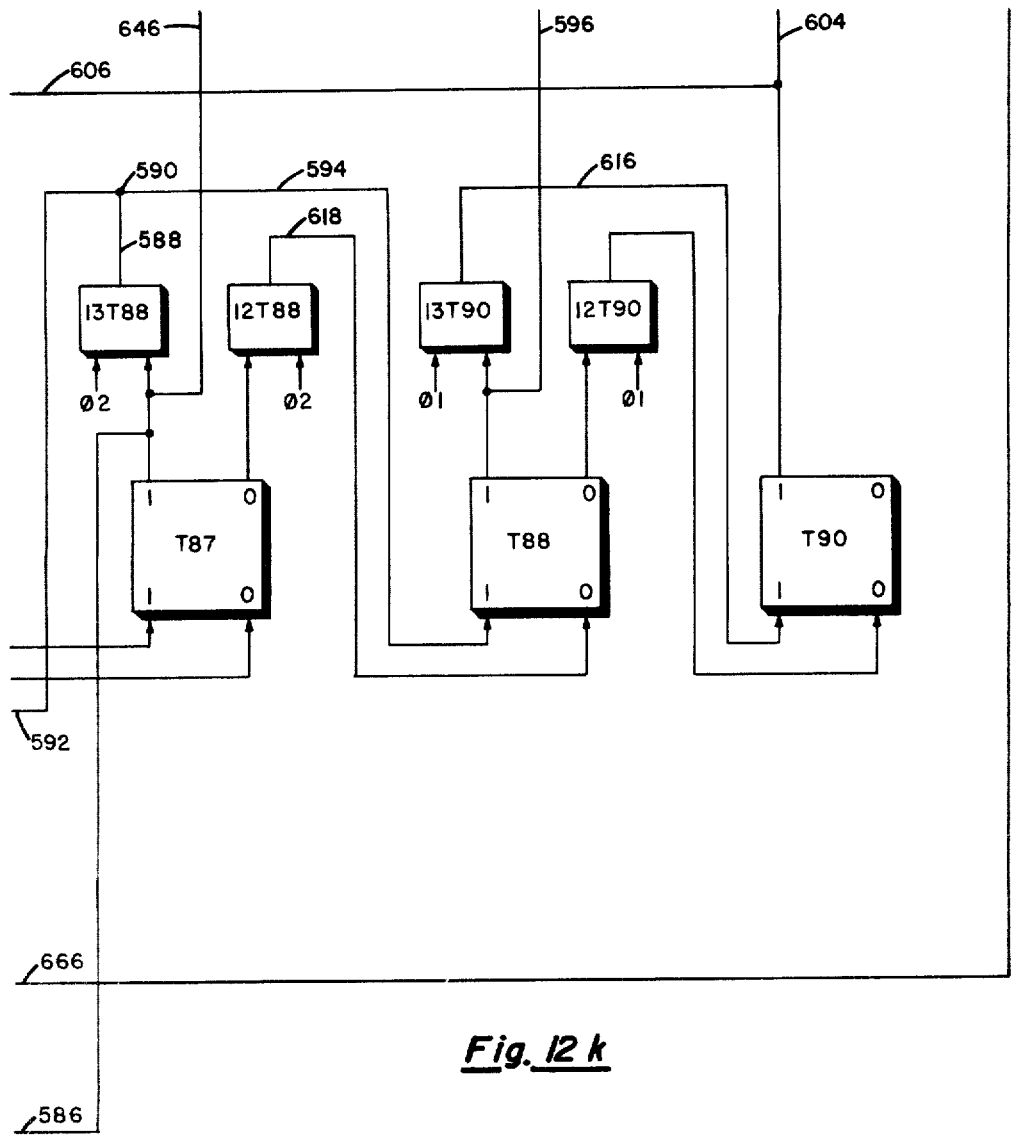
Figures 13, 22:
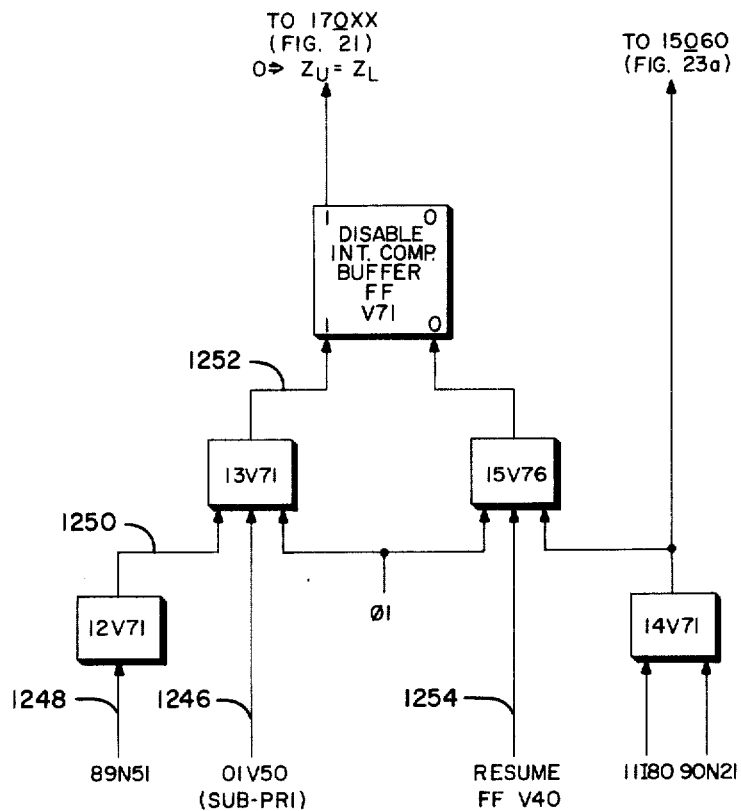
Figure 14A:
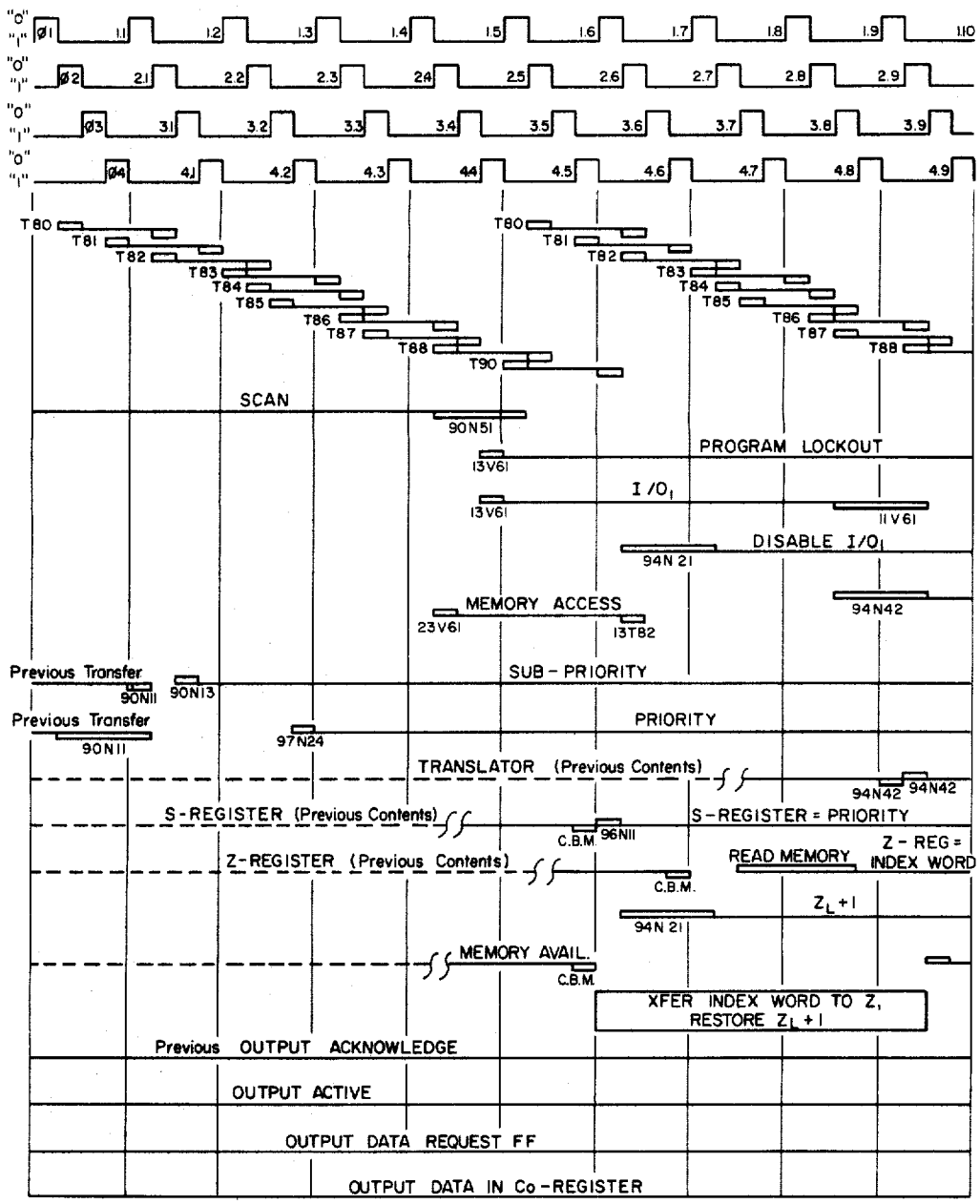
Figure 14B:
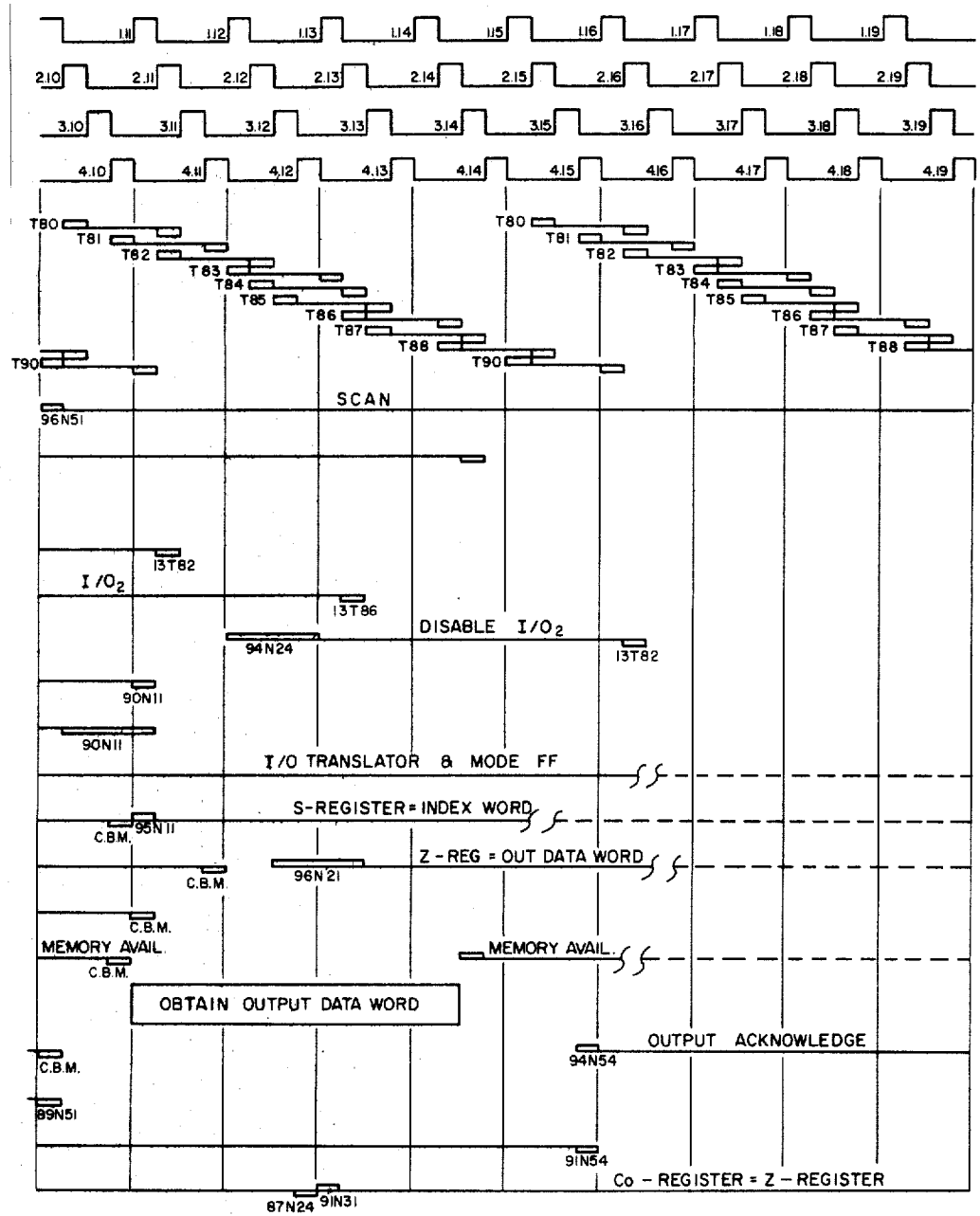
Figure 15A:
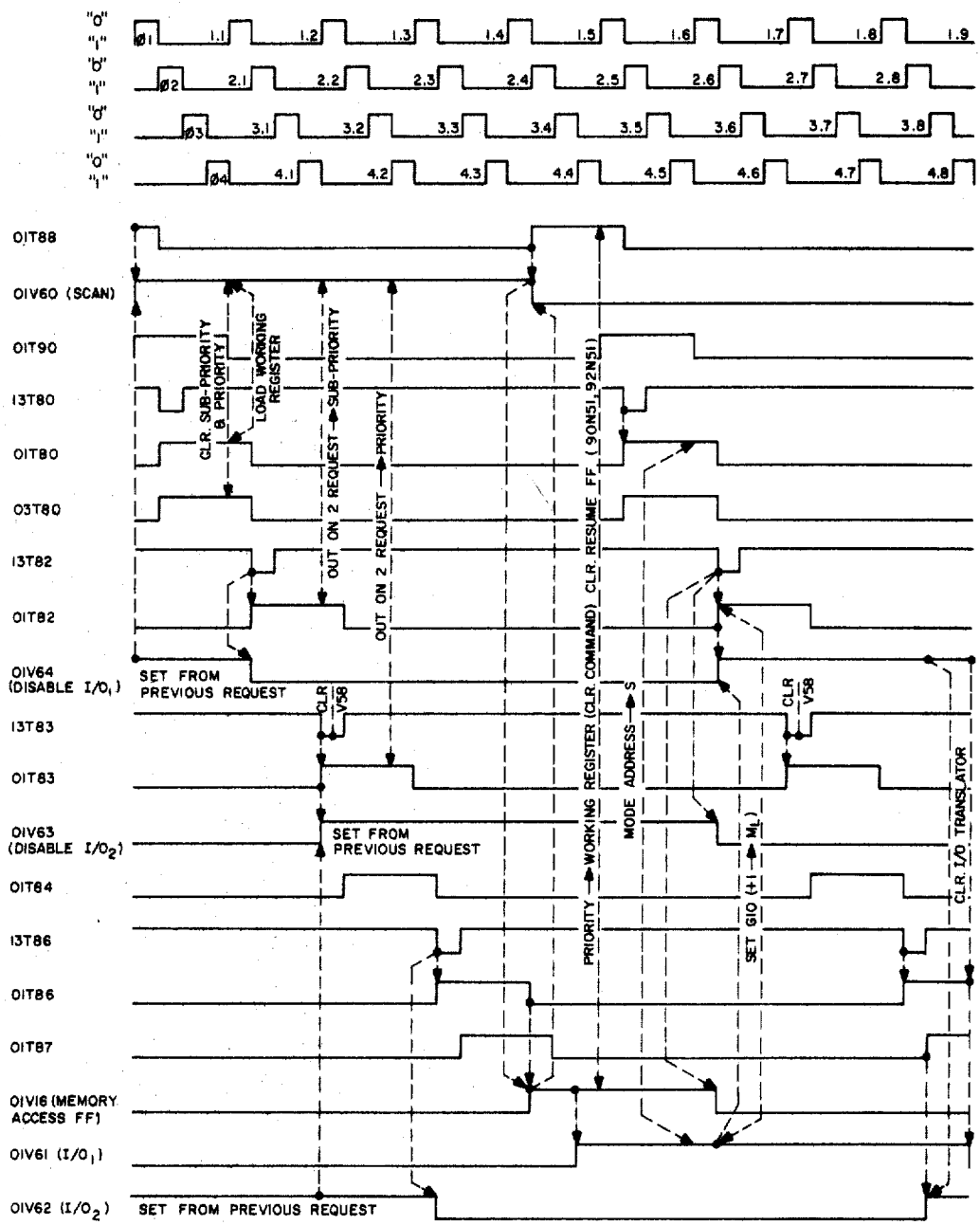
Figure 15B:
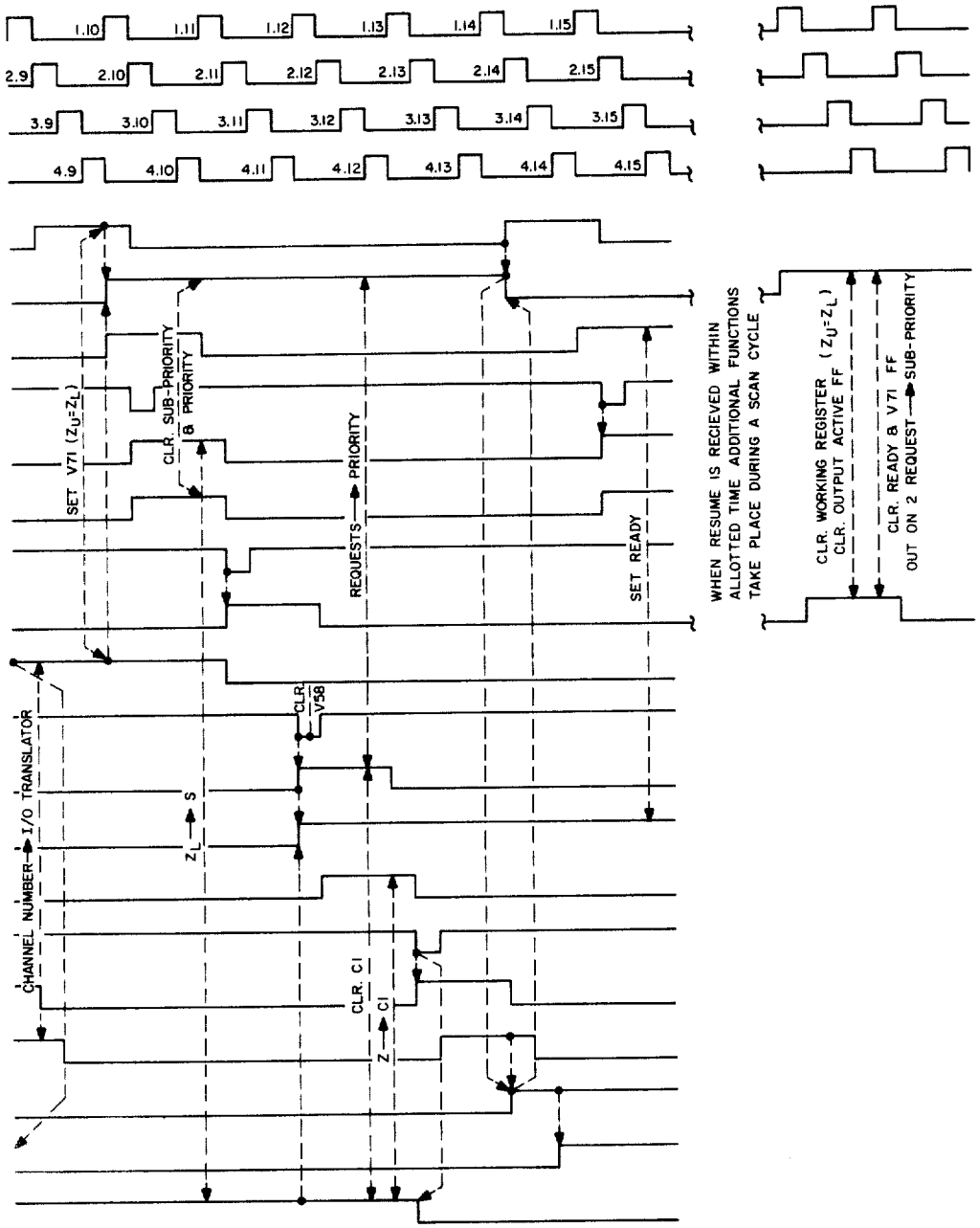
Figure 16:
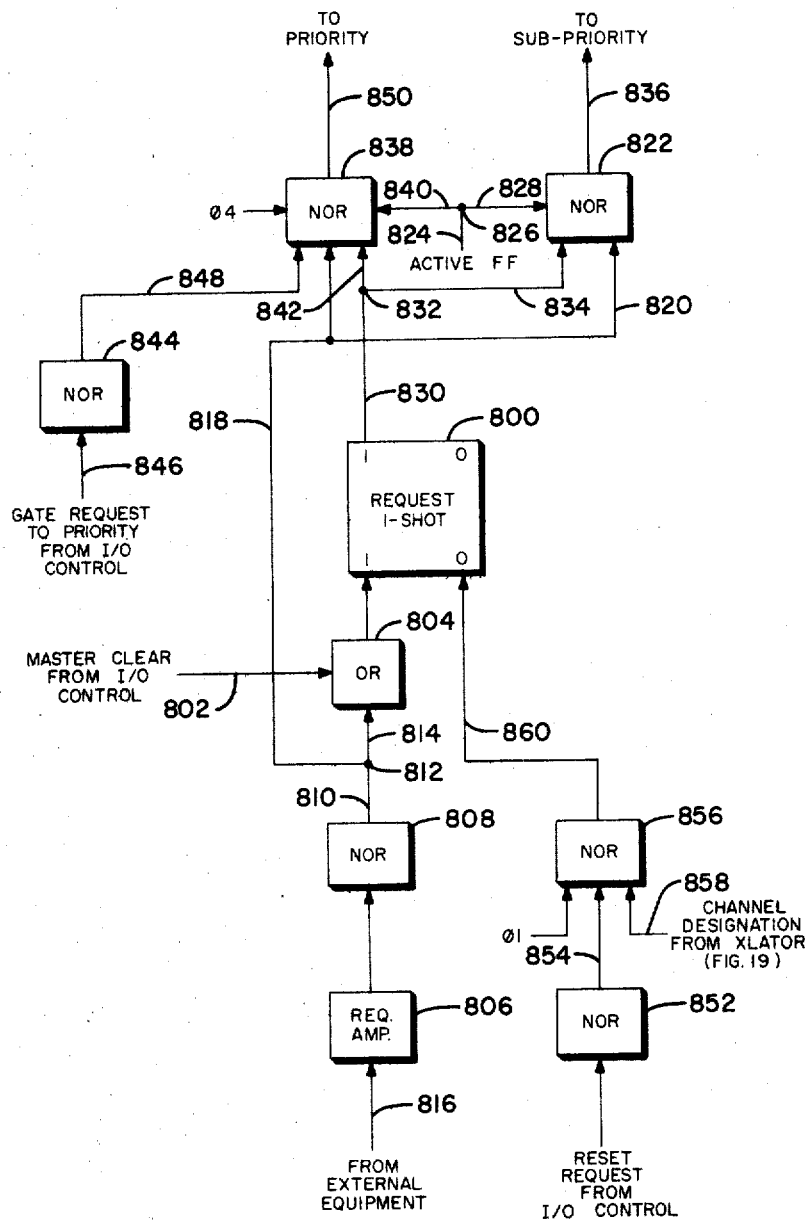
Figure 17B:
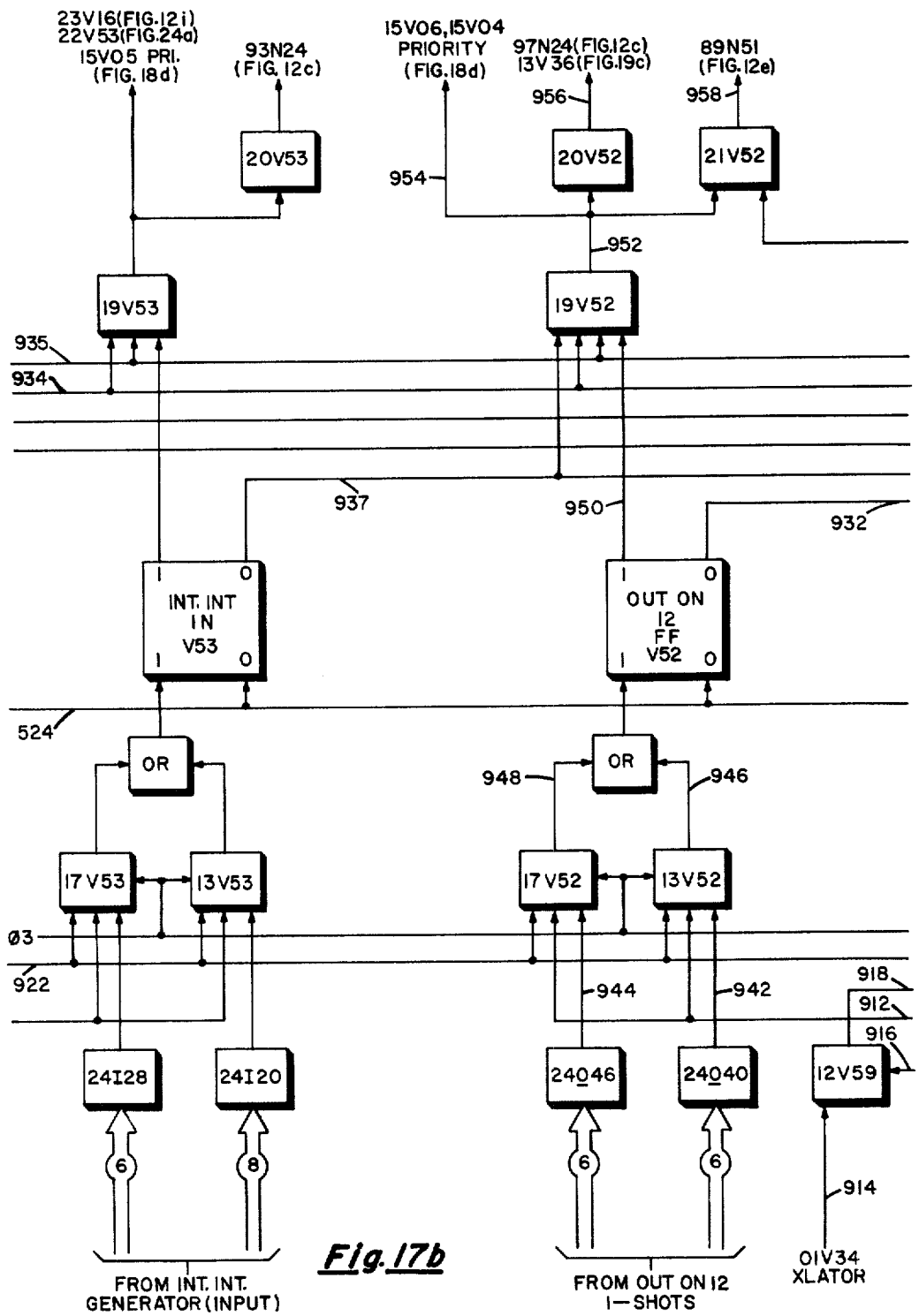
Figure 17C:
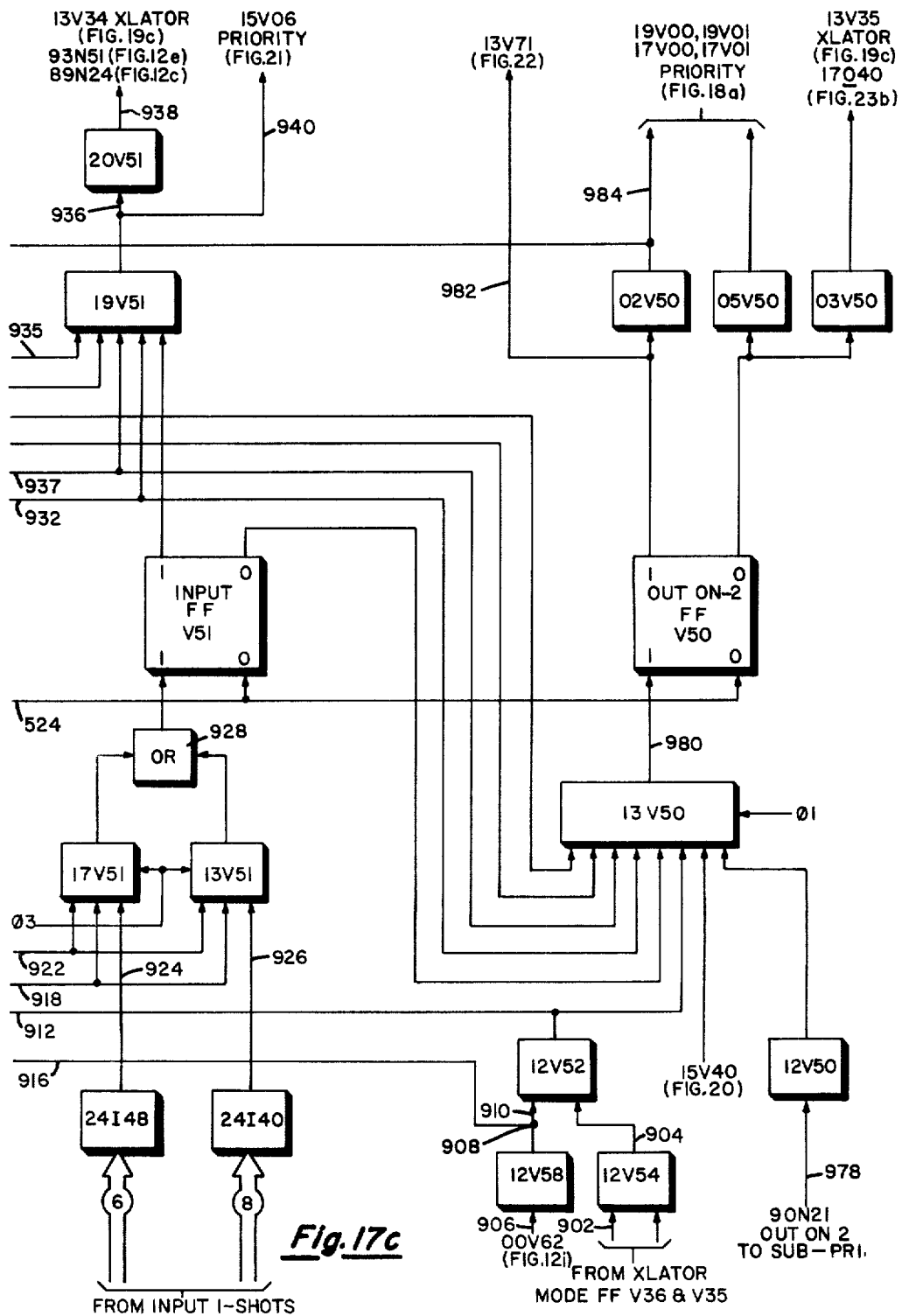
Figure 19B:
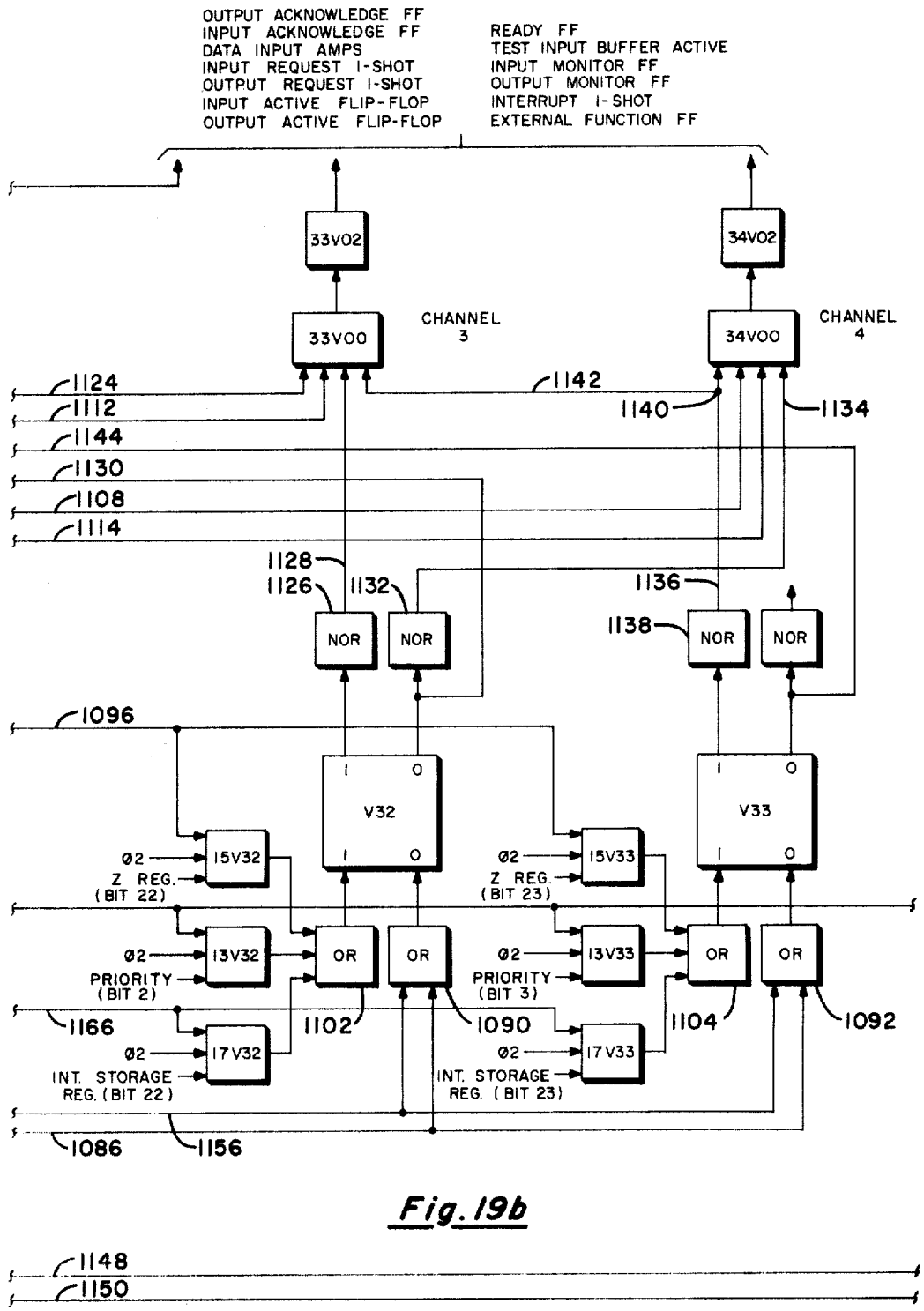
Figure 19C:
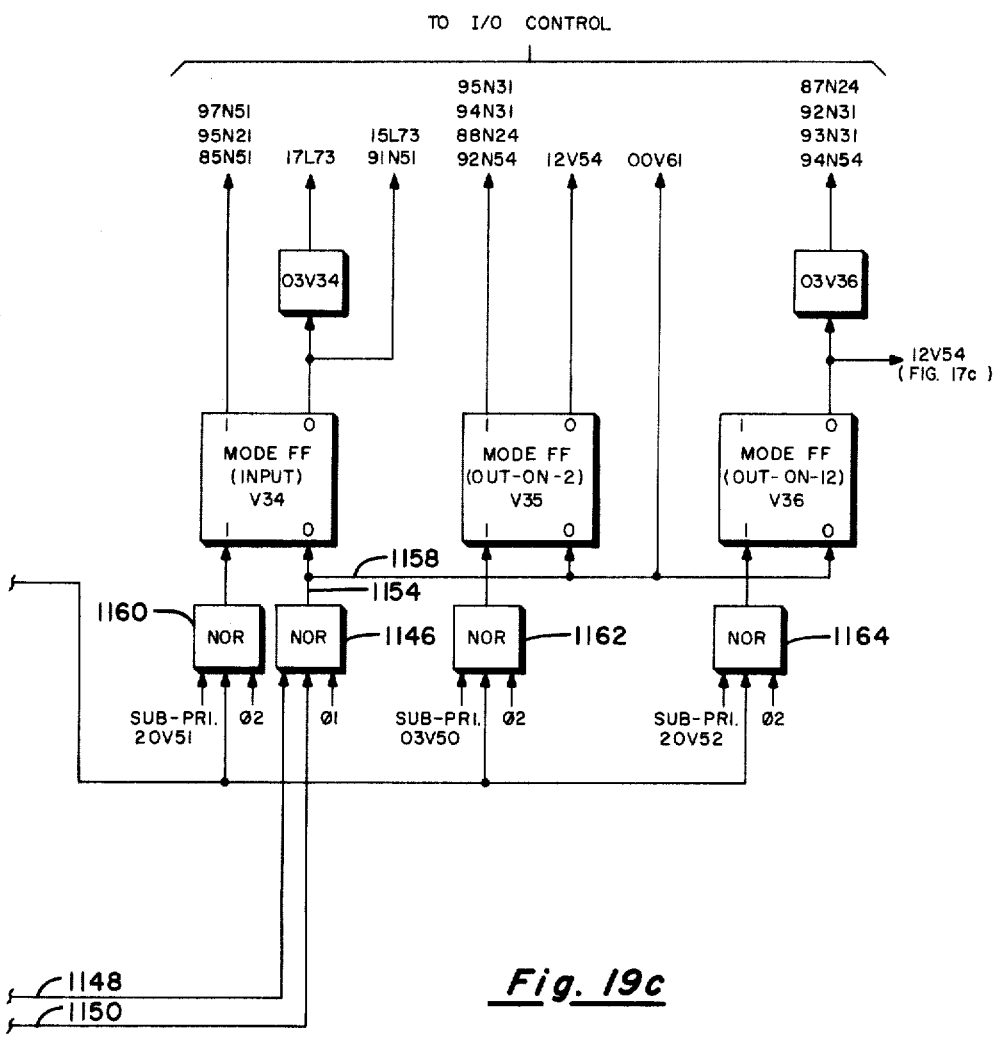
Figure 20:
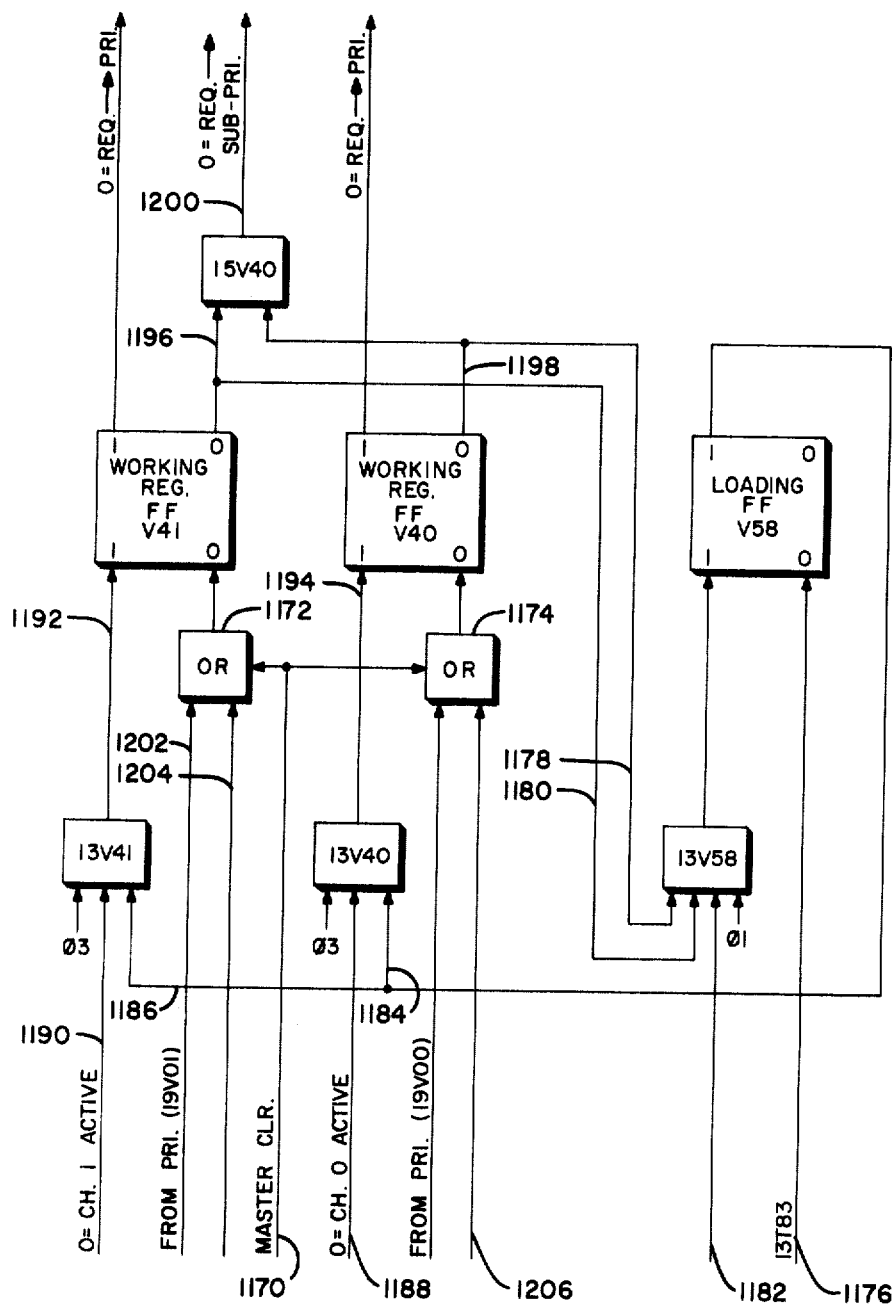
Figure 21:
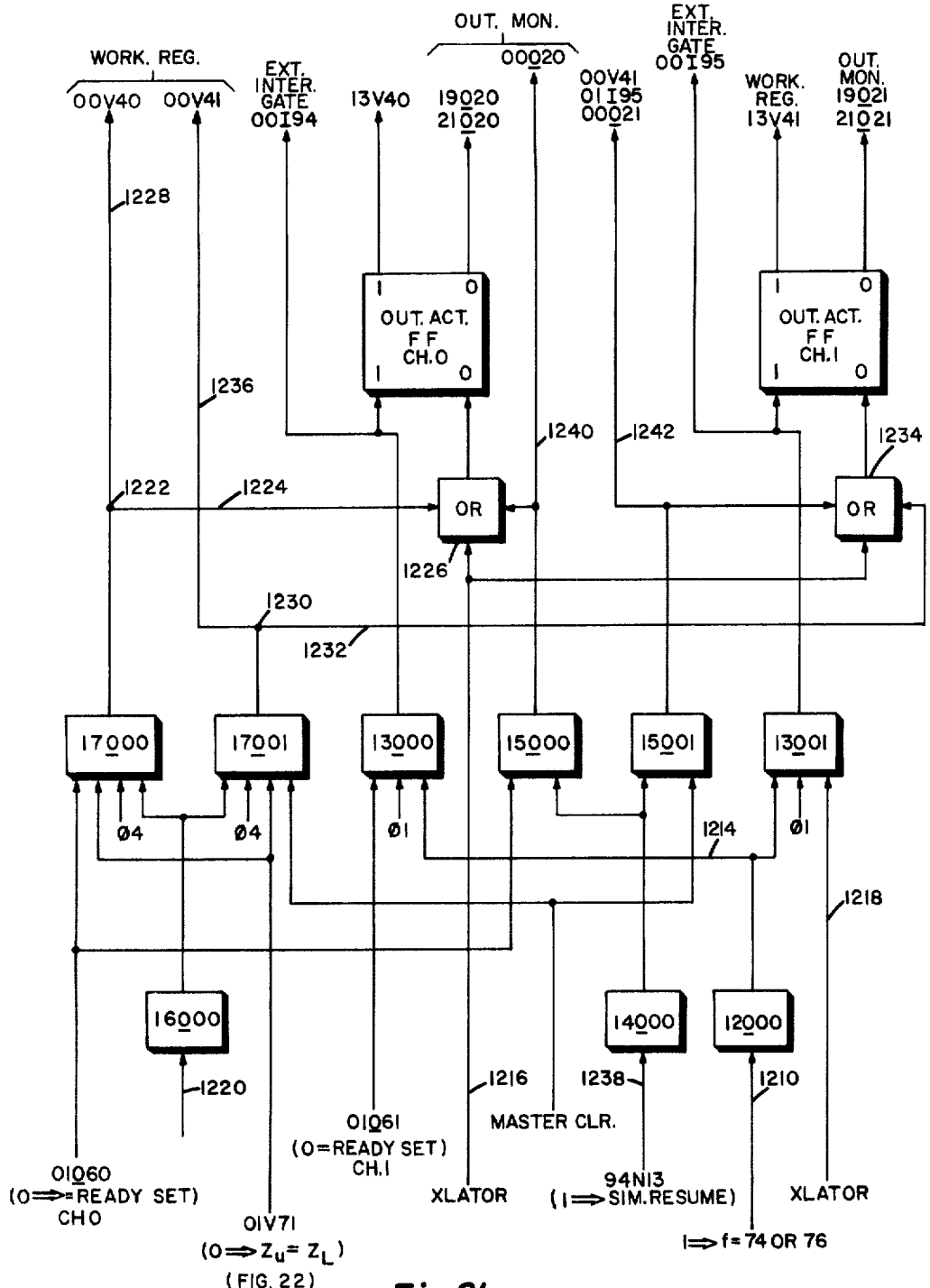
Figure 23A:
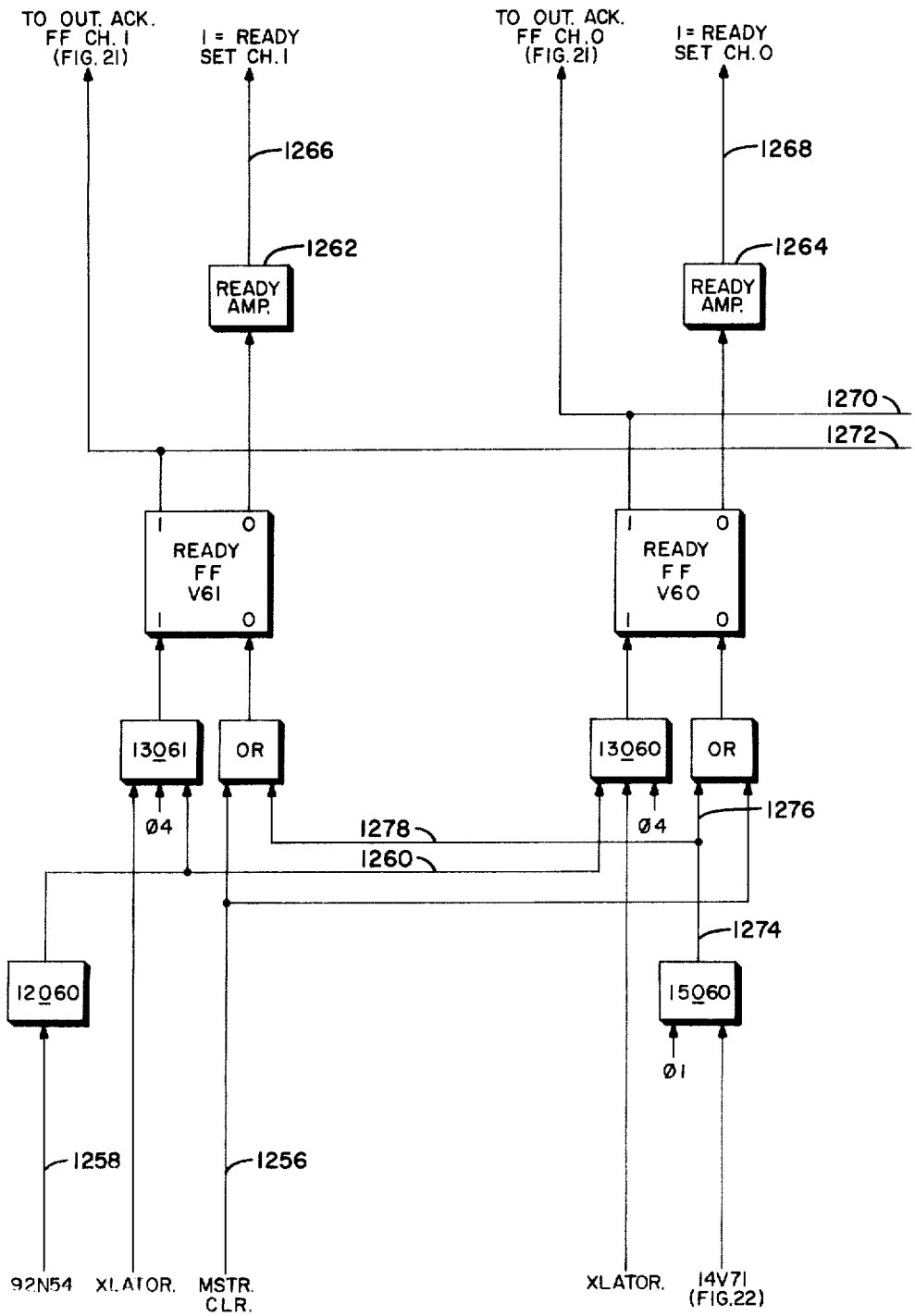
Figure 23B:
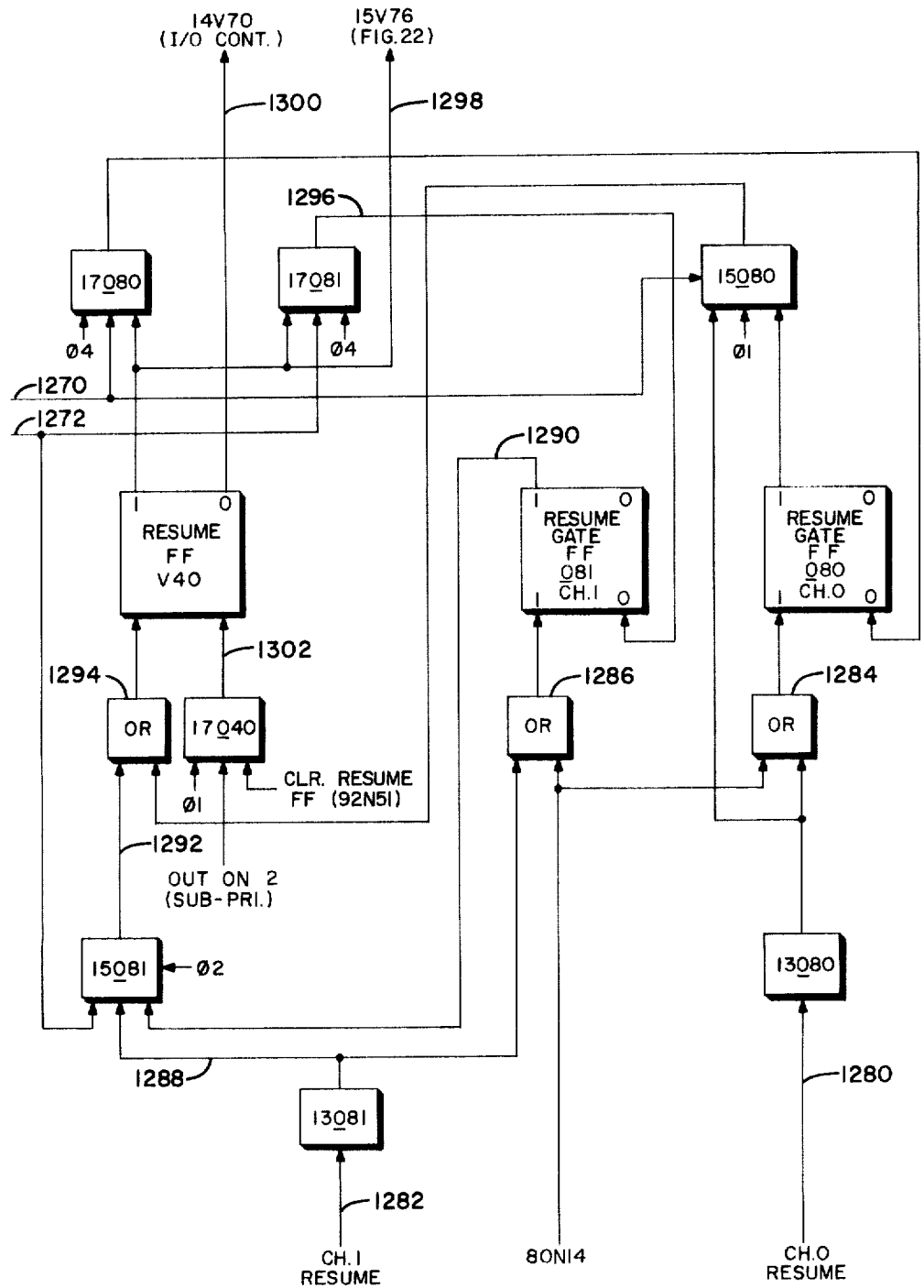
Figure 24B:
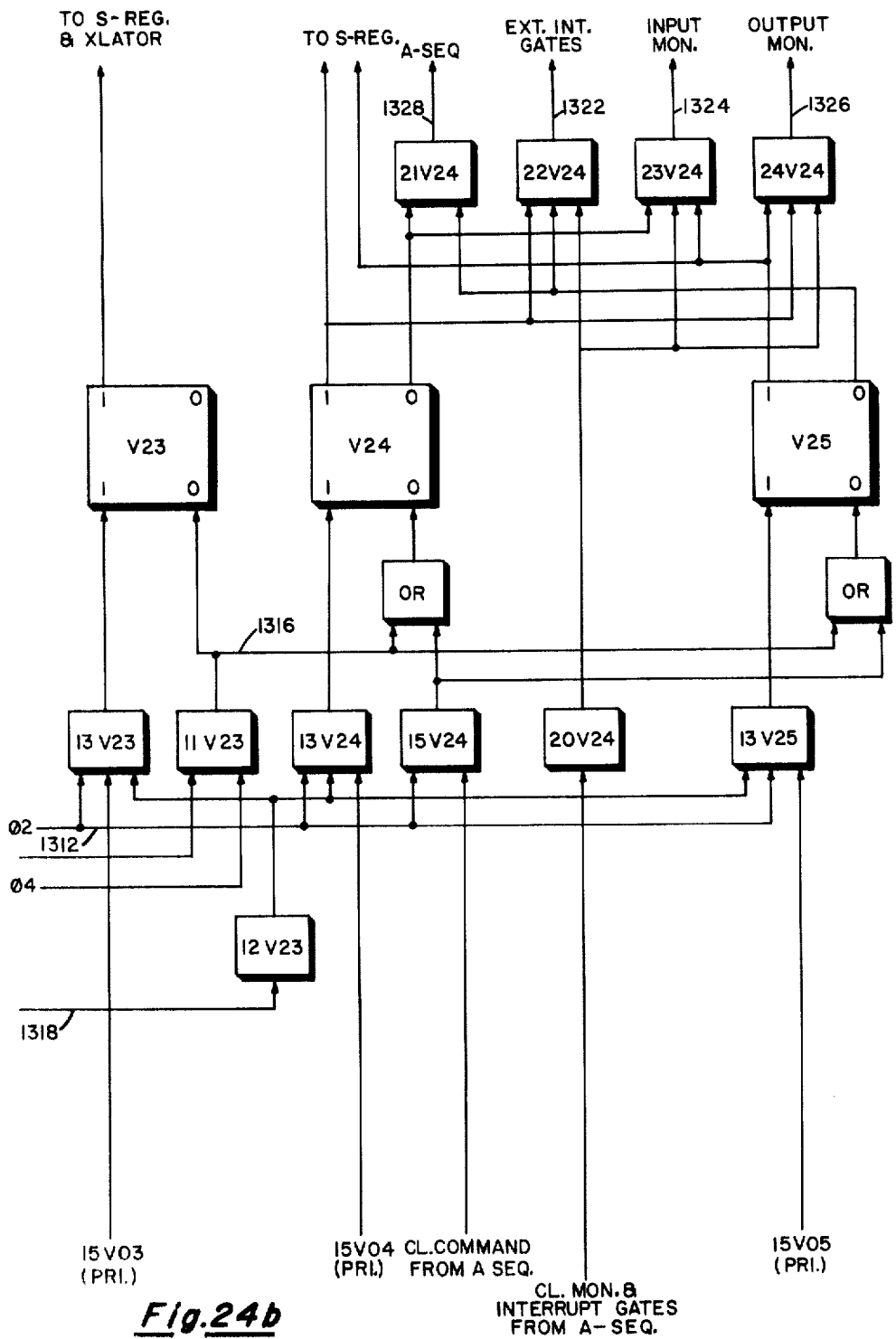
Figure 26:
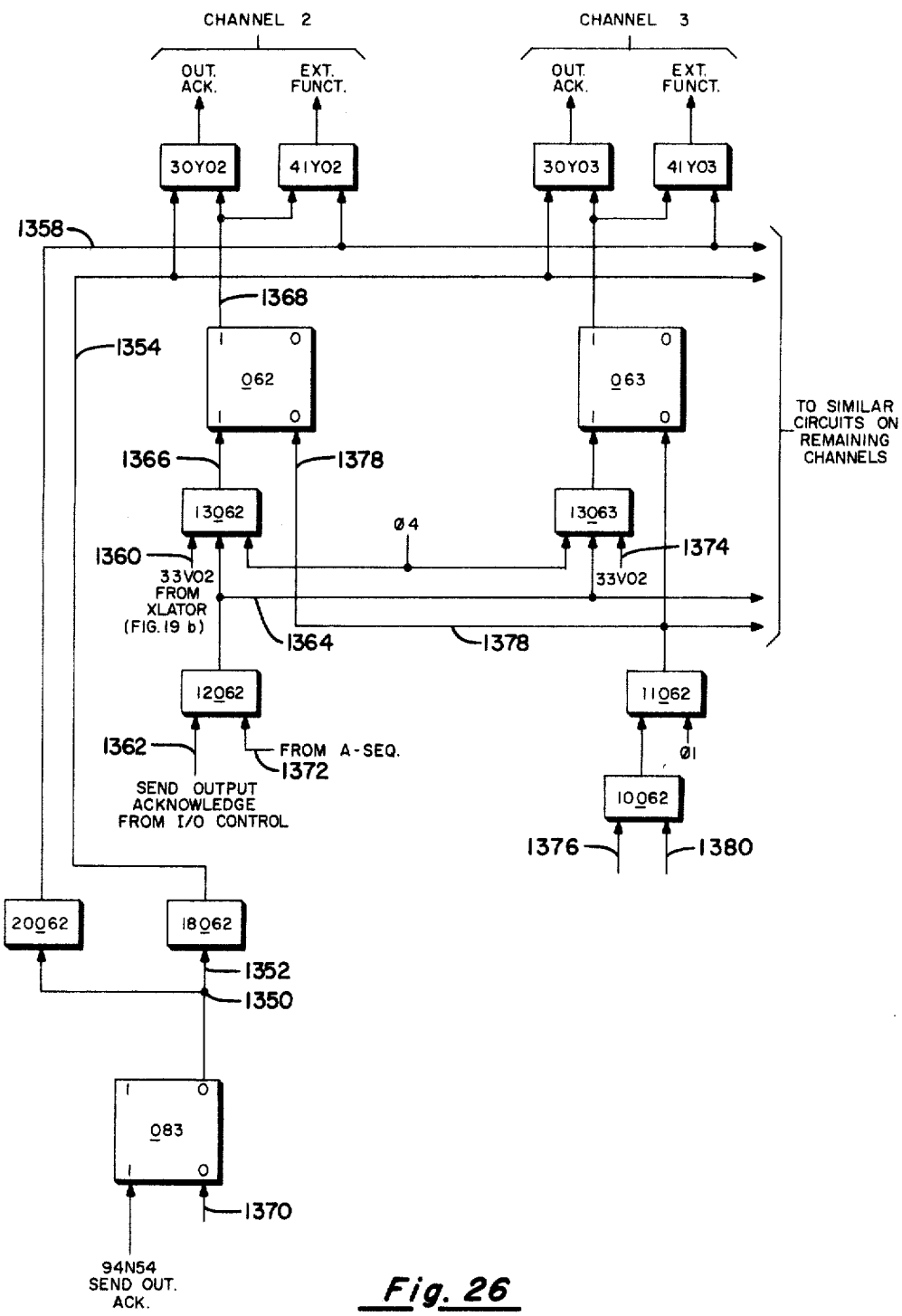
Figure 28:
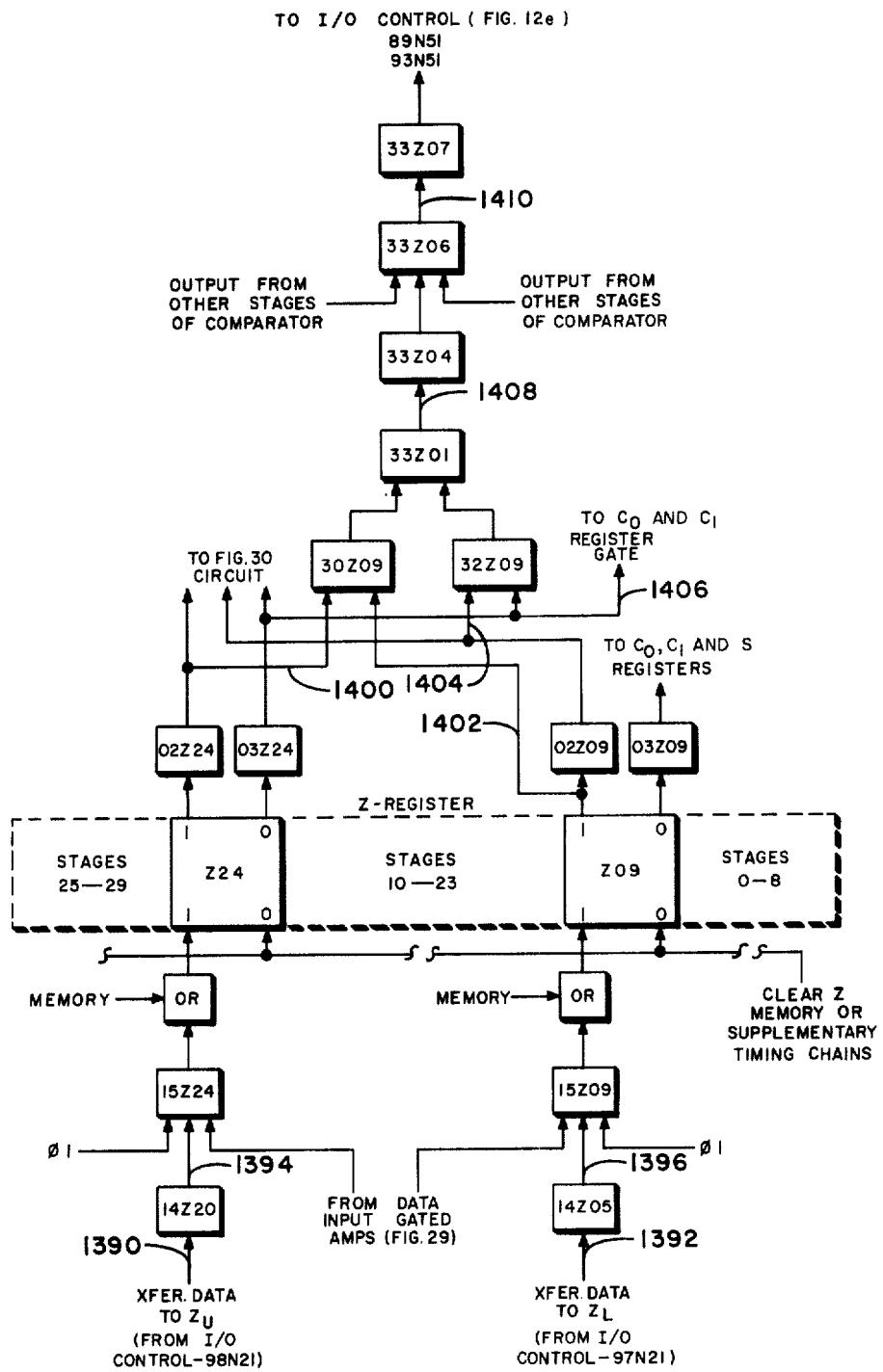
Figure 30:
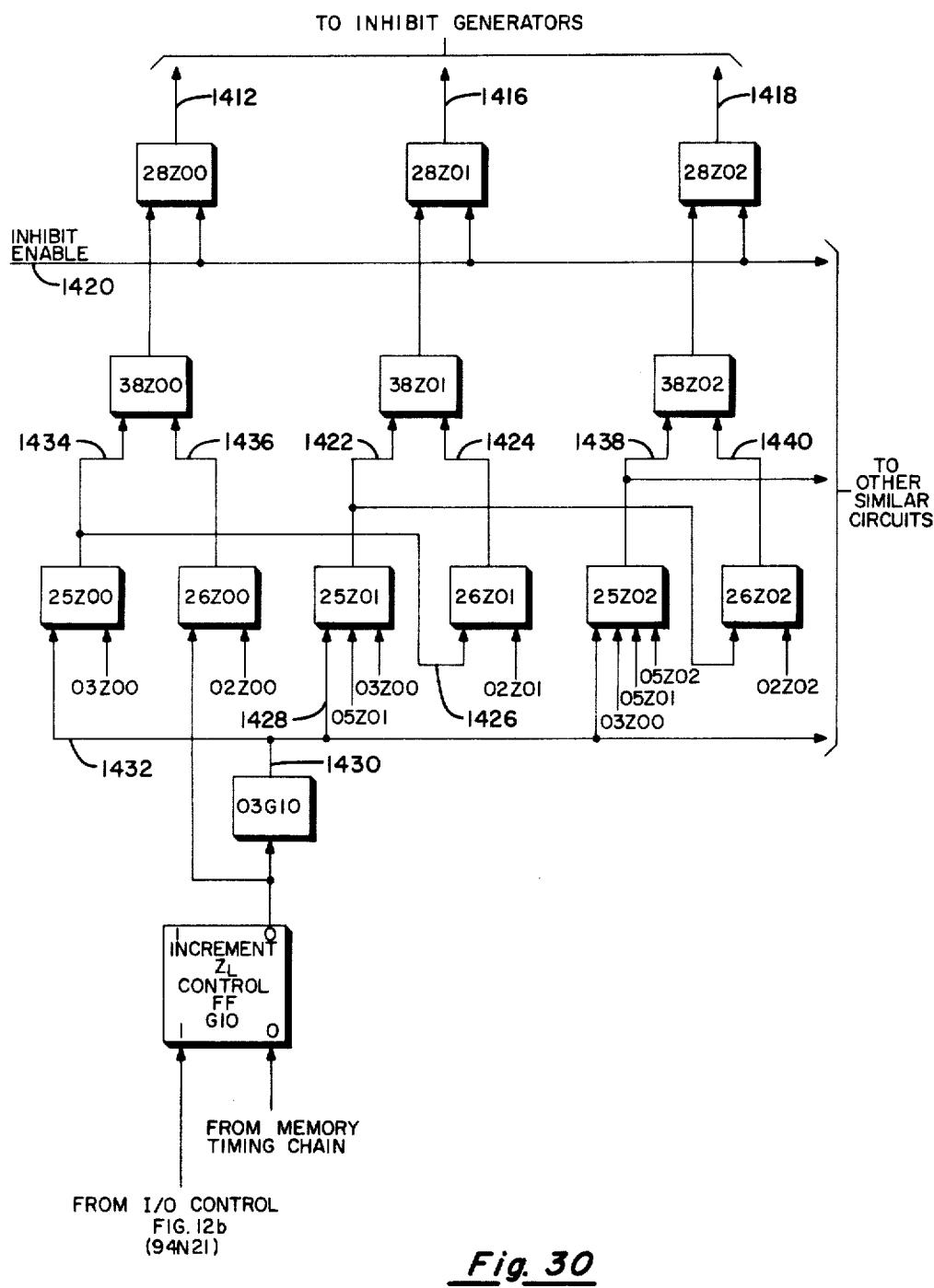

FIGS. 12a–12k when arranged in the manner shown in FIG. 13 illustrate in logical block diagram form the input-output control circuits of a computer;

FIG. 13 shows the manner in which the views of FIGS. 12a–12k should be arranged to present a composite picture;

FIGS. 14a and 14b illustrate the timing diagrams when the system is operating in the normal output mode;

FIGS. 15a and 15b are timing diagrams for the system when a first computer is transmitting data on one of its two special channels to a second computer;

FIG. 16 illustrates in logical block diagram form a typical circuit for handling incoming request signals from the peripheral equipment;

FIGS. 17a, 17b and 17c when placed side by side present in logical block diagram form the Sub-Priority Network;

FIGS. 18a–18e when placed side by side show a composite view of the logical block diagram of the Priority Network utilized in the Input-Output section of the computer;

FIGS. 19a–19c show the arrangement of logical blocks for implementing the input-output Translator;

FIG. 20 shows the circuits comprising the Working Register;

FIG. 21 shows the logic circuits making up the Output Active flip-flops for the special intercomputer channels;

FIG. 22 illustrates the circuits for disabling an intercomputer buffer transfer upon the occurrence of certain conditions;

FIGS. 23a and 23b illustrate by means of a logical block diagram the circuits employed for transmitting the READY signals to and for receiving the RESUME signals from an external computer;

FIGS. 24a and 24b illustrate the Interrupt Address Storage Register and associated circuits;

FIG. 25 shows by means of logical blocks the manner in which the Active flip-flops, either input or output, for the 12 normal channels are implemented;

FIG. 26 illustrates the manner in which the basic logical blocks may be interconnected to implement the Output Acknowledge and External Function flip-flop circuits;

FIG. 27 is a logical block diagram of the Input Acknowledge circuit;

FIG. 28 illustrates in block diagram form a simplified logical schematic of the Z-register and Z-register comparator employed in the computer of the present invention;

FIG. 29 is a logical block diagram of the Data Bit Gated Amplifiers shown as block 54 in FIG. 2; and FIG. 30 illustrates the logic circuitry employed for incrementing the contents of the Z-register before it is restored back into the memory of the computer.

INTRODUCTION

Figure 1A:
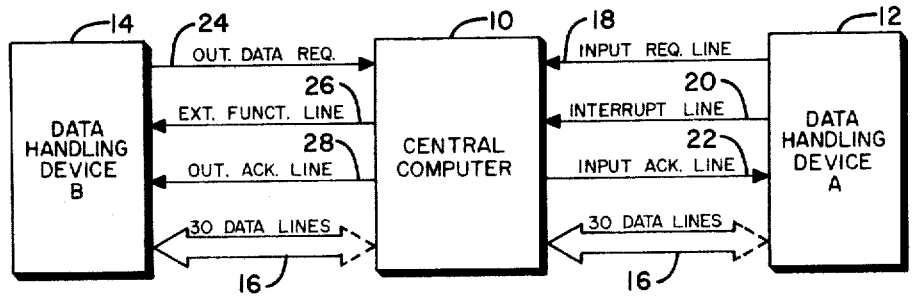
FIG. 1a is a simplified schematic block diagram of a communication system constructed in accordance with the principles of this invention.

FIG. 1a shows in block diagram form a central computer 10 having a first data handling device 12 connected to one of its input channels, and a second data handling device 14 connected to one of its output channels. In the communication system with which this specification is concerned, communication with the central computer 10 is carried on in a 30-bit parallel mode. In other words, information is presented to the computer or transferred from the computer in the form of words which are represented by binary signals appearing simultaneously on 30 data lines. It should be understood, however, that the word size need not necessarily be limited to 30 bits and that either a larger or smaller word size may be employed without departing from the spirit of this invention. The computing system of the preferred embodiment is provided with 14 input channels and 14 output channels. Two channels are set aside for inter-computer communication while the remaining twelve channels are employed for communication with ordinary types of external equipment. Each input and each output channel has its own cable associated with it, and each cable has 30 data lines plus a requisite number of control lines. As shown in FIG. 1, a typical input cable for connecting the data handling device 12 to the central computer has three control lines 18, 20 and 22. Control line 18 is termed the "Input Request" line. When the computer notes the presence of a signal on this line, it is advised that a peripheral device on this channel wishes to transfer information to the computer along its data lines 16. After the computer has responded to this request, accepted the data from the peripheral device 12, and stored it in its memory section, it sends out a signal along control line 22 termed an "Input Acknowledge" signal. This signal advises the data handling device 12 that the computer has accepted the data and that new information can henceforth be placed on the lines 16.

The control of peripheral equipment external to the central computer is carried out with the use of "function words" and "interrupt words." Interrupt words are generated and sent by the peripheral equipment to the computer on the input data line 16. By this means, the external equipment informs the computer of such things as the operating status of the peripheral device or its desire to initiate or terminate a data transfer. An interrupt word is distinguished from a data word by activating the "External Interrupt" control line 20. The activation of this line causes the computer program to jump unconditionally to an address in memory associated with the particular channel in question, where it will begin a sub-routine to analyze the interrupt word and take appropriate action.

When the data handling device 14 connected to the output channel of computer 10 wishes to accept data from the computer, it presents an "Output Data Request" signal to the computer on control line 24. Detecting the presence of this signal, the computer takes the information from the memory and places it on the output data lines 16'. It then generates a signal on the "Output Acknowledge" line 28 to inform the peripheral device that the data on the lines 16' is ready for sampling. The peripheral equipment then detects this Output Acknowledge and samples the data lines to accept the data word. After acceptance, the peripheral device 14 drops the Output Data Request signal from line 24 which, in turn, causes the computer to drop the "Output Acknowledge" signal and the data signals from the lines 28 and 16' respectively.

As mentioned previously, the control of the peripheral equipment is carried out with the use of Function words and Interrupt words. Function words sent to the peripheral equipment on the output data lines 16, are the means by which the computer program controls its peripheral equipment. A function word is distinguished from data words by activating the External Function control line 26. The function word is translated into a discrete set of actions by the peripheral device. The use of program generated function words rather than computer instructions to control the peripheral equipment makes the computer logic independent of the characteristics of any input-output device.

The manner in which the computer 10 and the peripheral devices 12 and 14 are effective to establish communication with one another will be described fully hereinbelow. The foregoing functional description has been included at this point merely for the purpose of defining terms which will be used throughout the specification.

A typical transfer, either into or out of the computer, is started by two programmed commands, one to the external equipment, the other to the computer's Input/Output section. The first places a signal (External Function) on a control line to the peripheral control equipment along with a word on the Output Data Lines coded to tell it exactly what is to be done. The other instruction defines the core storage buffer area in the buffer control register, and specifies if an interrupt is to occur upon completion of the transfer.

There now follows a description of the sequence of events which occurs when data is transferred into the computer from a system with both input and output lines, such as a paper tape system including both a punch and a reader. This can serve as an example of how the Input/Output system functions when communicating with a peripheral device on one of its 12 normal channels.

(1) The computer executes an instruction that puts into its Input Buffer Control Register the beginning and ending core memory addresses for the data to be transferred. It also specifies whether an Internal Interrupt is to occur upon completion.

(2) The computer executes an instruction setting a control word on the output data lines. This control word specifies the function to be performed by the equipment (accept input data in this case). It also sets a signal on one of the control lines that tells the equipment to sample the control word.

(3) Upon being informed that an input transfer is required, the external equipment assembles and places a word on the input data lines. When ready, it signals that a word is available by placing a Request signal on one of the control lines.

(4) The computer, finding a Request signal present on the control line coming from the external device, examines the Buffer Control Register to see where the data is to be placed in the memory. During this memory cycle the lower address in the Buffer Control Register is automatically incremented by one in preparation for the next word to be transferred.

(5) The data is taken from the input data lines and placed in the memory location specified by the contents of the Buffer Control Register.

(6) The computer then outputs a signal on a control line (Acknowledge line) telling the external equipment it is ready to accept another word.

Steps 3 through 6 are repeated at a speed governed by the speed of the external equipment until the lower address in the Buffer Control Register is equal to the upper address, which shows that the transfer is complete. The input channel is deactivated until the program operates step 1 again.

After steps 1 and 2 have been completed, the program and the Input/Output system work independently, with only an interrupt of some kind or a special program interrogation bringing them back into synchronization. Block transfers may be occurring on any or all channels at one time, because normal peripheral equipment employed can generally handle data only at rates much slower than the basic memory cycle of the computer. If words are presented to the computer at exactly the same time on more than one channel, the higher numbered channel must wait its turn for two memory cycles before it can transfer the word into memory.

Figure 1B:
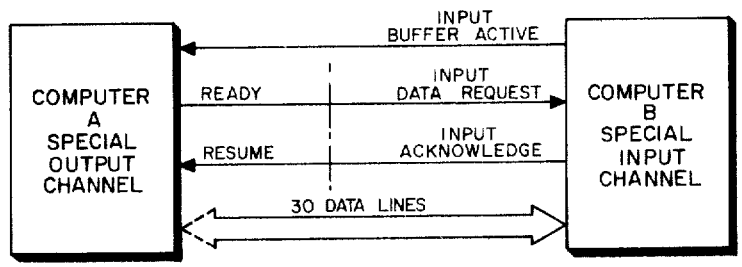
FIG. 1b is a block diagram of a communication system wherein data is being transferred between two computers.

FIG. 1b shows in block diagram form the connections required for the transmission of data from a first computer (computer A) to a second computer (computer B). The transmission of data and control signals between computers presents problems not encountered in the normal transmissions between a computer and other external equipment such as magnetic tape units. As was stated earlier, the system forming the preferred embodiment of this invention has 12 normal input and output channels and 2 special input and output channels. These two special channels are equipped with special circuits for handling the transmission of data between two computers. Also, in inter-computer communications different terminology is used in regard to the various control signals. As was described in connection with FIG. 1a, dealing with communication between a computer and normal external equipment, the Acknowledge signal is always sent from the computer to the peripheral unit, and the Request signal is always sent from the peripheral unit to the computer. In order to distinguish these control signals, when describing inter-computer information transfers, the signal sent to the external computer will be termed the READY signal and the one sent from the external computer to the central computer will be termed the RESUME signal. It can be seen, then, that the READY signal enters the receiving computer as an Input Request while the Input Acknowledge enters the transmitting computer as a RESUME signal. When the sending computer has finished placing the data it wishes to transmit in its output register it sends the READY signal on the designated channel. The receiving computer is thus advised that data is available to it and responds by first sampling this data and then returning a RESUME signal to the transmitting computer.

Another line in the special input cable of FIG. 1b is the so-called Input Buffer Active control line. A signal on this line is the means by which the external computer (computer B) informs the main computer (computer A) that it is in condition to receive data. In other words, when the transmitting computer A receives a signal on this line it knows that the receiving computer B is in an active status and capable of receiving information.

FIG. 2 illustrates in block diagram form the main sections of the central computer employed in the communication system of the present invention. As is well known in the art, a digital computer can generally be broken down into four major sections, namely, the Control section, the Input-Output section, the Storage or Memory section, and the Arithmetic section.

The Control section of the computer in FIG. 2 is enclosed by the dashed line 30 and consists of those registers and circuits necessary to procure, modify and execute instructions of the program. The main register of the Control section is the instruction register termed the U-register. Since the basic word size employed by the computer of this invention is 30 bits, the complete U-register is also 30 bits. For reasons which will become apparent, the U-register is divided into two sections namely, an upper half 32 and a lower half 34, each 15 bits in length. Instruction words are obtained from the Storage Section of the computer under control of the Storage Address Register or S-register 36 and are loaded into the instruction register, where they are retained during the execution of an operation.

This invention is concerned with a computing device of the stored program type and hence, once the program is written and coded in acceptable form, it is entered into the storage section of the computer. From this point on, the computer, upon proper initiation will execute the series of instructions making up the program. The instructions of the program are generally stored in the memory in a sequential manner, so that the computer will first execute the instruction whose address has initially been set up in the Program Address Counter or P-register 38. It then proceeds in a step-by-step manner to the highest address. The modifier box 40 is included to indicate that as each instruction is executed, the address of the current instruction is incremented by "0" in the case of a repeat, by "1" in cases where the execution of instructions is to take place in sequential order, and by "2" in the case where a skip condition is satisfied.

Figure 3:
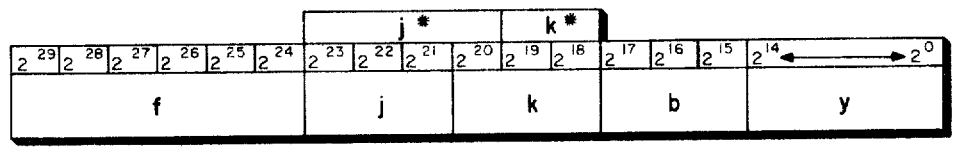
FIG. 3 is a diagram illustrating the bit assignments of a typical instruction word employed by the computer of the present invention.

In FIG. 3 there is shown the format of the instruction word employed with the apparatus of the present invention. The term "instruction" as used herein signifies a predetermined sequence of events to be performed by a computer. Instructions may either be of the variable or invariable type. In either case, each is represented originally by what is commonly termed an "instruction word," meaning a predetermined set of electrical signals included to represent either variable or invariable instructions as set forth in the binary number system. An instruction word is the first or primary indication to the computer of an instruction. An instruction word when operated on by the electronic and electrical hardware in the computer causes a succession of signals termed "commands" or "command enables" to be developed to cause an execution of the instruction by the computer. The term "program" refers to a predetermined set of instructions arranged in a particular manner to solve a desired problem or to execute a given action.

As can be seen from FIG. 3, the instruction word is comprised of five sections termed "designators," namely, the $f$, $j$, $k$, $b$, and $y$ designators. The $f$-designator, which is normally 6 bits in length, indicates the particular instruction to be executed such as Add, Subtract, etc., and is commonly termed the operation or OP code. The $j$, $k$, $b$ and $y$ designators allow modification of the basic instruction specified by the $f$-designator. For most instructions, the length of the $j$-designator is 3 bits and is used in the majority of the instruction for JUMP, and SKIP determination, for instruction operand modification selection, and for REPEAT status interpretations. However, when the computer is executing an Input-Output type instruction, the $j$-designator is denoted by the symbol $j^*$ and is 4 bits in length rather than 3, borrowing one bit from the $k$-designator. The 4 bits of the $j^*$-designator are sufficient to uniquely identify the particular one of a plurality of communication channels over which the input or output information transfer is to be made. The $k$ (or $k^*$ in the case of Input-Output instructions) designator controls the interpretation of the operand. The $b$-designator appears in bit positions 17, 16 and 15 of the instruction word and specifies which one of registers 42, labeled B–1 through B–7, will be used to modify the operand designator $y$.

In the preferred embodiment of the computer described in the present specification there are 4 instructions employed to effect a transfer of data between the computer and a plurality of data handling devices and/or another computer associated therewith. The first instruction to be considered is termed an $f=73$ instruction since its $f$-designator or OP code in the octal number system is 73. This instruction establishes an input buffer via the input buffer channel designated by $j^*$ to the magnetic core memory with an initial storage address defined by the $y$-designator in the instruction word. Subsequent to the execution of this instruction, individual transfers from or to the memory will be executed at a rate determined by the external device located on the channel specified by $j^*$. The storage address initially established by this instruction will be advanced by unity preceding each individual transfer. The current next address will be maintained through the buffer process in the lower-order 15 bits of the magnetic core storage address $00100+j^*$ (octal). This mode of communication will continue unless it is superseded by a subsequent initiation or termination of an input buffer via the same input channel or until the higher order half and the lower-order half of the storage address $00100+j^*$ contain equal quantities, whichever occurs first.

The next instruction to be considered has an $f$-designator equal to 74 (octal). This instruction estiblishes an output buffer via the output channel designated by $j^*$ from the initial storage address in magnetic core storage defined by the $y$-designator of the instruction word. Subsequent of this instruction, the individual transfers will be executed at a rate determined by the external device communicating therewith. The storage address initially established by this instruction will be advanced by one preceding each individual transfer. The current next address is maintained throughout the buffer process in the lower-order 15 bits of the magnetic core storage address $00120+j^*$. This mode of communication continues until it is superseded by a subsequent initiation or termination of an output buffer on the same output channel or until the higher order half and the lower order half of the storage address $00120+j^*$ contain equal quantities, whichever occurs first.

The third instruction to be considered has an arbitrarily assigned $f$-designator of 75 and is termed an Input Buffer with Monitor instruction. This instruction like the $f=73$ instruction establishes an input buffer to the magnetic core memory via the input channel specified by the $j^*$ designator of the instruction word. Again, the initial address is determined by the $y$-designator of the instruction word. Subsequent to this instruction, the individual data transfers will be executed at a rate determined by the external device connected to this channel. The storage address initially established by the instruction will be advanced by one preceding each individual data transfer. The current next address to be used will be the magnetic core storage address $00100+j^*$. This mode of data transfer continues until it is superseded by a subsequent initiation or termination of an input buffer on the same input channel or until the higher order half and the lower order half of the storage address $00100+j^*$ contain equal quantities, whichever occurs first. The initiation of this input buffer selects the input channel $j^*$ and establishes a "buffer monitor" on this channel. The hardware employed to monitor the data transfer on this channel is effective upon detection of equality of the upper and lower halves of the buffer control word to generate an Internal Interrupt signal. As will be described more fully later on in the specification, this interrupt signal causes the computer to take its next instruction from a predetermined storage register, rather than taking the next instruction word in the normal program sequence.

The final instruction to be considered has an arbitrarily assigned $f$-designator of 76 and is termed an Output Buffer with Monitor instruction. This instruction establishes an output buffer transfer of data by way of the channel specified by $j^*$ in the instruction word from an initial storage address specified by the $y$-designator. Subsequent to this instruction, the individual data transfers will be executed at a rate determined by the external device connected to the channel specified by $j^*$. The storage address initially established by the instruction will be advanced by one preceding each individual transfer. The current next address is maintained throughout the buffer process in the lower-order 15 bit of the magnetic core storage address $00120+j^*$. This mode continues until it is superseded by subsequent initiation or termination of an output buffer on the same channel or until the higher order half and the lower order half of storage address $00120+j^*$ contain equal quantities, whichever occurs first. The initiation of this output buffer selects the output channel $j^*$ and establishes a buffer monitor on this channel. Again, when equality is detected between the upper and the lower halves of the storage address $00120+j^*$ the monitoring circuits generate an Internal Interrupt signal which forces the computer to take its next instruction from a predetermined address rather than to accept the next instruction from a normal sequence.

As can be seen from FIGS. 2 and 3, the upper half of the instruction register 32 will contain the $f$, $j$ or $j^*$, $k$ or $k^*$ and $b$-designators whereas the lower half of the instruction register 34 will contain the operand $y$. The control translator 44 is connected to the output of the upper half of the U-register 32. It examines both the function code designator, $f$, and the various execution modifiers to produce the proper command enable signal to execute the particular instruction as modified.

As mentioned previously, the registers labeled B–1 through B–7 are address modification registers. If address modification is required before the instruction is executed, the contents of a predetermined one of the B-registers as specified by the *b*-designator is added to the contents of the lower order 15 bits of the U-register 34 before execution. The registers 46 and 48, labeled R and R' respectively, are each 15 bits in length and function as a communication register for all internal transmissions to and from the B-registers 42.

The K-register 50 is 6 bits in length and functions as a shift counter for all arithmetic operations which involve shifting. The S-register 36 is the Storage Address Register which holds the storage address during memory references. At the beginning of a storage access period, the address is transferred to the S-register 36. The contents of this register are then translated by the address translator contained in the storage section of the computer, the resulting signals being used to activate the appropriate memory read and write circuits in a conventional manner.

Not shown in the Control section 30 of FIG. 2 are the various circuits required for the timing and execution of the instructions. However, the overall instruction execution is accomplished in steps, called "sequences." The major steps of the execution are: the A-sequence, during which the next instruction to be executed is read out from memory; the B-sequence, during which the necessary data to facilitate the execution of an instruction is located and transmitted to a register in the arithmetic section of the computer; the C-sequence, during which the arithmetic computations are performed; and the D-sequence, during which the results of the arithmetic computations or the data from another source are stored or read back into memory.

The Input-Output section—enclosed by the dashed line 52—shows those data paths and control circuits used by the computer for communicating with peripheral equipment and other computers. It includes sets of gated amplifiers 54, there being one set for each of the 14 input channels to the computer. Each set 54 includes a number of gated amplifiers equal to the number of data lines in the input cable for the particular channel. As already mentioned, in the preferred embodiment of this invention the basic word size is 30 bits, so that there is provided 30 data lines per input cable. Hence, each channel is provided with a set of 30 gated amplifiers.

Also included in the Input-Output section 52 of the computer are priority and access control circuits indicated by the block labeled 56. The gated amplifiers are controlled by these priority and access circuits such that when two or more external devices or separate channels are simultaneously requesting a data transfer, the channel having the highest number is given priority. In addition, the priority and access control circuits function to generate, accept, and transmit the control and timing signals which must be exchanged between the computer and peripheral equipment with which it communicates. Also included in this network are means for testing the various channels to determine whether they are busy. This feature prevents the computer from attempting to communicate over a channel already in use. Furthermore, the main memory addresses referenced during a particular input or output transfer are determined by a special input-output control word. One such word is assigned to each channel. It is sufficient at this point to note that a signal dependent upon the status of the input-output control word is used by the priority and access circuits to de-activate the channel after the proper number of words has been transferred.

The Input-Output section of the computer also includes an output register 58, termed herein the $C_0$-register. This register is used for transmission to all external devices. As is illustrated in FIG. 2, the register 58 receives its input signals from the output bus 60, which is connected to an output of the Z-register located in the storage section of the computer via gates 62. The data read out from the memory is initially placed in the Z-register and subsequently gated to the $C_0$-register 58 when the gates 62 are enabled by control pulses coming from a priority and access control circuit 56 via the control line 64.

Three sets of 30 amplifiers 66, 68 and 70 called Data Line Drivers, branch from the output of the $C_0$-register 58 and each set drives 4 output channels. Although the data signals are presented to all the channels simultaneously, gated registers located in the external devices determine which channel is to be active during any particular transmission.

In order to transmit information to another computer a separate output register $C_1$, identified by the numeral 69, is provided. The $C_1$ register receives data signals from the Z-register via the gating circuits 71 which is also under the control of the Priority and Access Circuits 56.

The storage section of the computer is enclosed by the dashed line 72 in FIG. 2. It includes as its chief components a random access memory 74, used to store both data and instructions to be executed, an address translator 76, and the associated address, transfer, control and timing circuits commonly utilized in digital data processing equipment. While other types of storage may be employed, the memory 74 is preferably constructed from modular arrays of magnetic cores making up a plurality of 30 bit words. The cores of the memory may be coincidentally driven, and may be addressed in a well known manner by means of the address translator 76. The contents of the referenced address are read out into the 30 bit Z-register 78, commonly known as the Memory Communications Register. Because in certain applications it is desirable that words 15 bits in length be used, the Z-register 78 is spilt into two sections 80 and 82, each 15 bits in length. The section 80 is termed "Z-upper" ($Z_U$) and the section 82 is termed "Z-lower" ($Z_L$). It can be seen from FIG. 2 that all information coming from the peripheral equipment to be stored in the memory 74 of the computer passes along the input bus 84 to the Z-register 78. Similarly, all information from the memory section of the computer to be transmitted to the peripheral equipment passes along the output bus 60 from the Z-register 78.

During the restore portion of the memory cycle, the contents of $Z_U$ or $Z_L$ may be incremented by "1" as indicated by the +0, +1 modifier boxes 86 and 88. This provision allows for automatically increasing the index or buffer control words, with the result that addresses referenced during a block transfer of data are automatically advanced. A comparator 90 is employed to detect the coincidence between the upper and lower halves of the index word, such that when coincidence occurs a signal is generated to terminate the data transfer by deactivating the channel involved.

The Arithmetic section of the computer enclosed by a dashed line 92 is that part of the computer which performs numeric and logical calculations. Though greatly simplified, FIG. 2 shows the important components of the arithmetic section of the computer, namely, the A-register 94, the D-register 96, the X-register 98, and the Q-register 100. Since this invention is concerned primarily with the Input Output section of the computer and with the method of communication between the computer and its associated peripheral devices, it is felt that a further discussion of the Arithmetic section of the computer is unwarranted since this section does not enter into the input-output operation.

Figure 5:
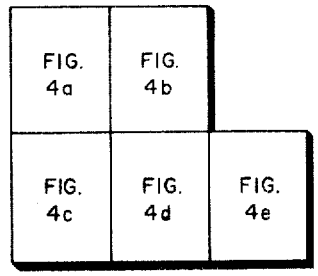
FIG. 5 illustrates the manner in which the drawings of FIGS. 4a–4e should be arranged to form a composite circuit.
Figure 4A:
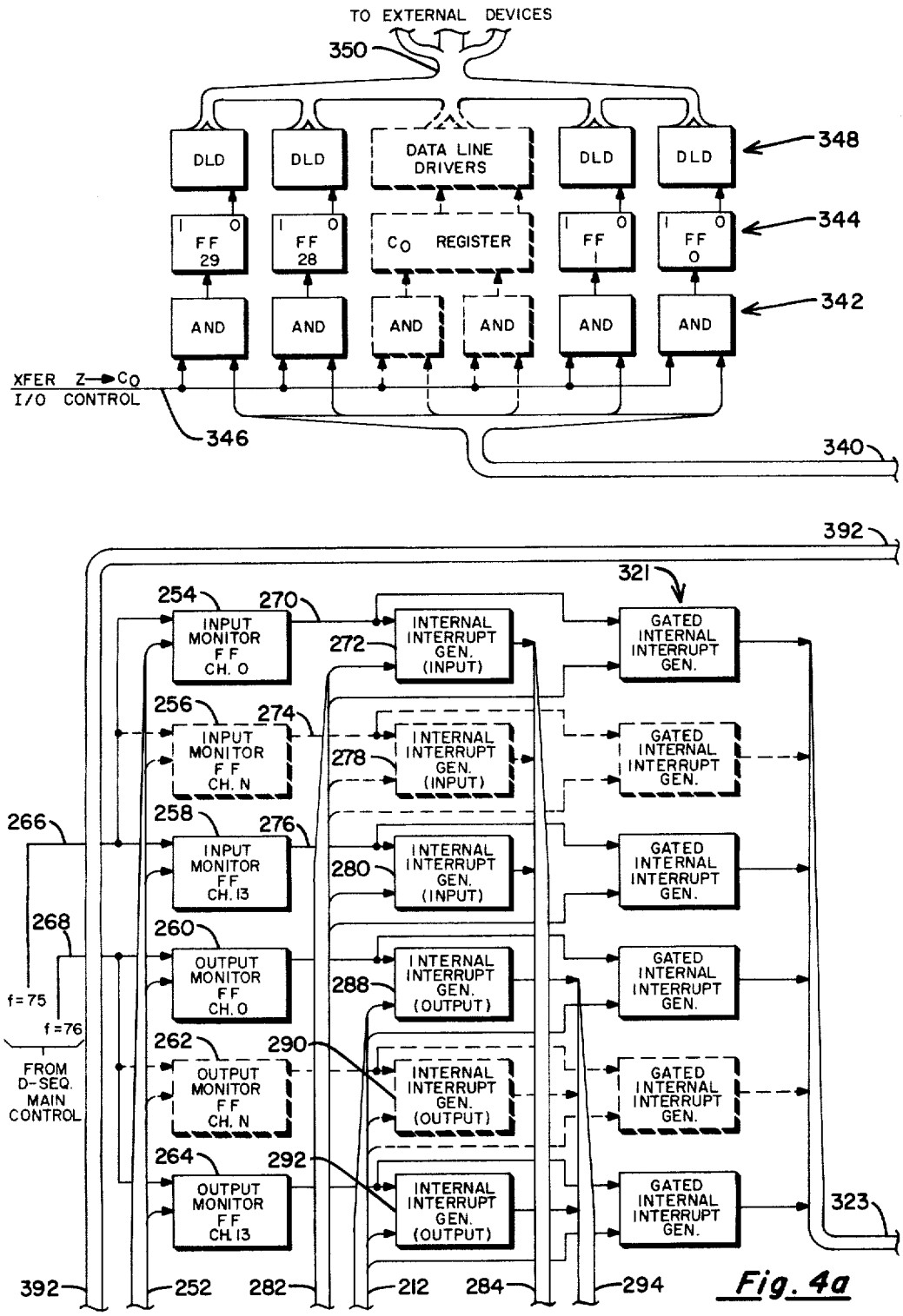
Figure 4C:
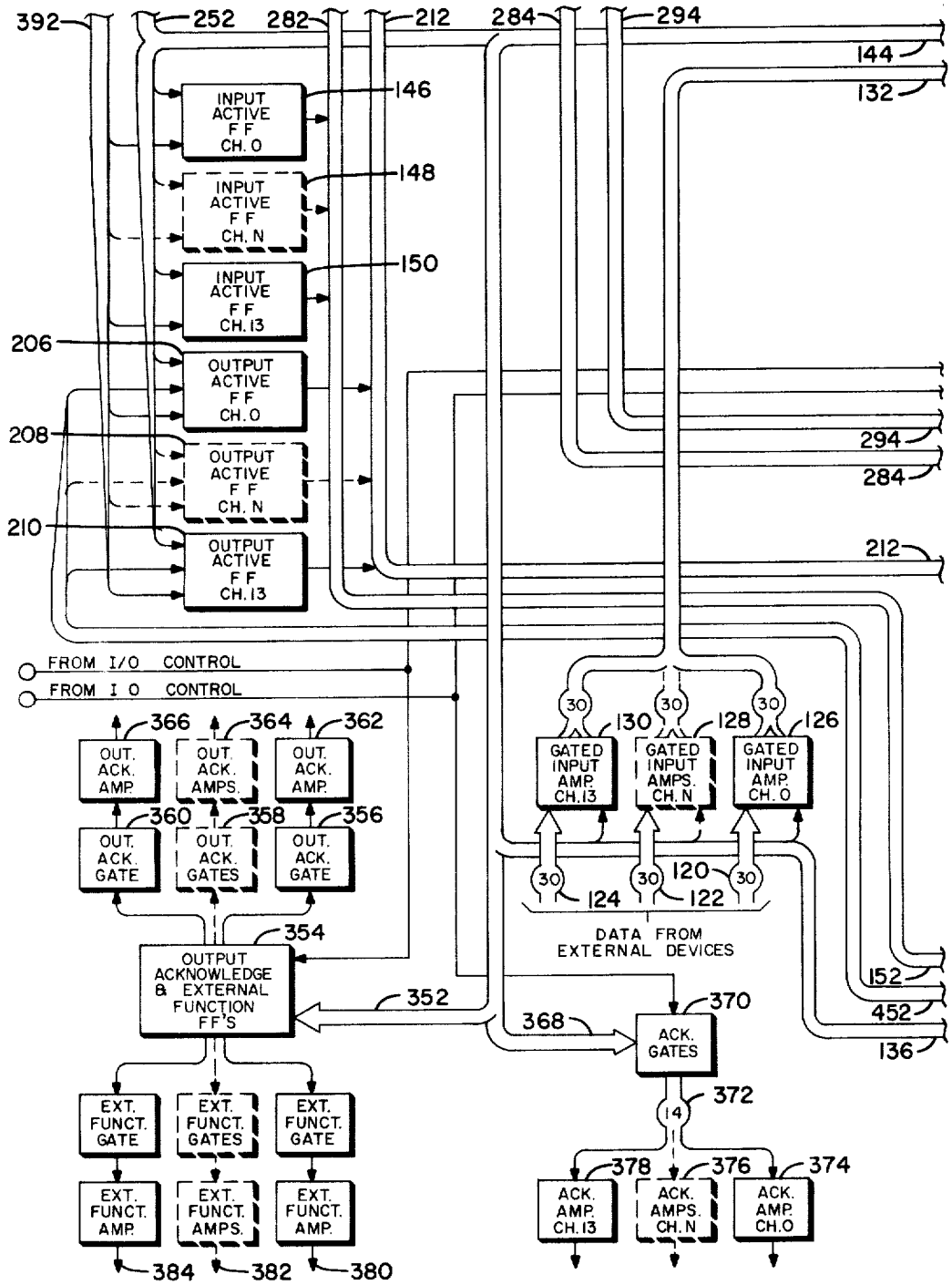

Now that the preferred embodiment of the digital computer of this invention has been described in general terms, greater attention will now be directed toward the Input-Output section of the computer by reference to FIGS. 4a through 4c which show in greater detail, but still in block diagram form, the various circuits and connections employed to implement the present invention. FIG. 5 illustrates the manner in which the views of FIGS. 4a through 4c may be arranged to present a composite drawing.

GENERAL ARRANGEMENT

The transfer of data to and from the computer is accomplished by the Input-Output section which utilizes 14 separate input and output channels. Data is received from and transmitted to the normal external equipment by way of twelve of these channels in a 30-bit parallel mode whereas intercomputer communications takes place over the other two channels. As such, each of the input channels has its own cable which contains 30 data lines as well as a number of control lines. While the computing machine which is described in the present specification has 14 input and 14 output channels, it should be understood that a greater or lesser number may be employed without departing from the spirit of the invention. However, for the sake of clarity, FIGS. 4a through 4e illustrate schematically the apparatus required to implement the transmission of information between two computers, but to the normal external equipment over only three channels.

As was mentioned in the introductory portion of the specification, the Input-Output section of the computer operates in an index mode. That is, the address of a buffer control word is internally provided.

For a better understanding of the operation of the Input-Output section, the buffer control word or index word will now be described. A buffer control word is a 30-bit word that is stored in the memory section of the computer and is made up of two parts, each consisting of 15 binary digits or bits. The upper half of this word determines the address of the last word to be stored or read out, whereas the lower 15 bits give the address of the first or next word to be stored or read out. For an input buffer, the lower 15 bits of the buffer control word determine the address where the input data is to be stored. If the mode is for an output buffer, the lower 15-bits of the index word serve as an address from which the data word will be read out.

After the initial conditions are met, depending on the mode of operation, the computer extracts the index word from core memory, increments the lower half of the word by one and restores it to the memory at the original address. The incrementing operation does not destroy the upper 15 bits of the original index word and it is the address where the data word will be stored. For each word that is stored in the memory, the lower half of the index word will be incremented by one. This process continues until the upper and lower half of the index word are equal, at which time a signal is generated to terminate the information transfer.

The output buffer, which also uses the index word, performs the same function as the input buffer. Each time the computer data word is transferred out of a core memory at the address specified by the lower half of the index word, the word is replaced in storage after the lower half has been incremented by one. This process continues until the data word at the address specified by the upper half of the index word is transferred out.

Referring now to FIGS. 4a through 4e, cables which are used to transfer data or control signals are shown in the drawings as two parallel lines with arrowheads at one end thereof, and at some point intermediate the ends of these cables the two parallel lines are widened to form a circle and numbers appear within the circle. This number indicates the number of conductors within the cable while the arrowheads indicate the direction in which the data or control signals are flowing in the cables. Cables bearing the numeral 14 in general are control signal cables for the 14 input-output channels while cables bearing the numeral 30 are cables through which data-representing signals are carried. Some channels are employed solely for communication with normal peripheral equipment and, hence, contain only twelve lines.

Data signals from the peripheral equipment or an external computer enter the Input-Output section of the computer by way of of the input cables 120, 122 and 124 (FIG. 4c) where they tie into separate sets of Gated Input Amplifiers 126, 128 and 130. The set of Gated Amplifiers labeled 128 in FIG. 4c is represented by a block outlined by dashed lines which contains the notation "Ch.N." This is intended to indicate that while only three channels for communication are actually shown, additional identical circuits are provided for other channels which, for the sake of clarity in the drawings, are not shown.

In general, the Gated Input Amplifiers perform two functions. First of all, the voltage level of the signals used between the external devices and the computer may be incompatible with the circuitry employed in the computer itself. The Input Amplifiers are therefore designed to alter the voltage level of the input signals to a value compatible for use in the computer. Secondly, since data can be transmitted to the memory section of the computer from only a single channel at a time, the Input Amplifiers 126 through 130 are designed such that the data on a particular channel may be selectively gated into the Memory Communications Register. The details of the construction of the Gated Input Amplifiers will be described in detail later on in this specification in connection with FIG. 29, but for now it may be assumed that there is provided within these blocks, circuitry which is capable of selectively permitting a predetermined number of data signals (bits) to be passed by way of a cable 132 to the Memory Communications Register (Z-register) indicated generally by the numeral 134. The Z-register 134 is preferably designed to hold 30 bits of data and therefore one data line from each of the plurality of input channels is connected to each of the 30 separate stages of the Z-register. The manner in which the control signals for gating the data signals through the input amplifier to the Z-register are developed within the computer will be described more fully hereinbelow, but for now it is sufficient to say that they are applied to the Gated Input Amplifiers by way of the cable branch 136.

Before the Input-Output section of the computer can accept a word of data from a specific piece of peripheral equipment on one or more of the input channels, two conditions must be satisfied. First of all, the channel over which a communication is to take place must be rendered active and, secondly, the peripheral device must present a control signal termed an Input Request to the computer. In order to render a particular input channel active, the computer must execute an Input Buffer Instruction. Referring again to FIG. 3, the $j^*$ designator of the instruction word will specify the particular channel over which the communication is to take place and the operand ($y$) portion of the instruction word is the address of a memory location where an index word is stored. As mentioned previously, this index word is made up of two 15-bit sections which specify an area in the memory where the input data is to be stored. A typical Input Buffer Instruction causes this buffer control word to be transferred to the buffer control register associated with the channel specified by $j^*$. This entire action takes place under control of the main computer program during the A, B, C, and D sequences. In addition to placing the index word in the buffer control register the 4 bits making up the $j^*$ designator pass from bit positions 20 through 23 of the Z-register through the cable 138 (FIG. 4b) and through an OR gate 140 to a Translator 142. The translator decodes the 4 bits of $j^*$ in a conventional manner to produce a signal on only one of the 14 lines contained in a cable 144. In other words, the Translator 142 is effective to uniquely select one line on which to emit control signals and this line leads to the control circuits for the channel specified by $j^*$ of the instruction word. For example, if the value of $j^*$ in the instruction word is 0100 (binary) the Translator 142 will examine these 4 bits and produce an output signal on the line in cable 144 corresponding to input channel No. 4 (decimal). This signal passes through the cable 144 and is effective to set the particular one of the Input Active flip-flops 146, 148 or 150 associated with this particular channel to its "1" state. The "1" side of the Input Active flip-flops are electrically connected through a cable 152 to the input terminals of corresponding Input One-Shot circuits 154, 156, and 158. The setting of one or more of the Input Active flip-flops by the execution of one or more Input Buffer Instructions renders the input channels specified by the particular value of $j^*$ in these instructions active.

As mentioned previously, two conditions must be satisfied before an input buffer can take place. The second condition is that the peripheral device associated with the channel over which the data transfer is to take place must present an Input Request control signal to the computer.

Peripheral equipment on one or more channels, as well as an external computer on either channel 0 or channel 1, may simultaneously present Input Request signals to the computer. These signals enter the Input-Output section on the control lines 160, 162 and 164 (FIG. 4a) and are applied as an input signal to a set of Input Request Amplifiers 166, 168 and 170, there being one such amplifier for each input channel. These amplifiers, like the Gated Input Amplifiers discussed previously, function to transform the signal level employed between the external devices and the computer to a signal level utilized in the computer itself. However, unlike the previously mentioned gated amplifiers, amplifiers 166, 168 and 170 perform no gating function. The amplified Input Request signals pass through cable 172 and fan out to respective ones of the Input One-Shot circuits 154, 156 and 158. When the Input Request signal is dropped from the line and a signal from an Input Active flip-flop is applied to one or more of the Input One-Shot circuits, the one-shot circuit is set to its arbitrarily defined "1" state and the resulting output signal is applied over one or more of the lines 174, 176 and 178 to a first input terminal of the Input Request Gates, 180, 182 and 184. The one-shot circuit is set to its "1" state by the absence of the Input Request signal, to insure that this signal is actually dropped and restored subsequent to the preceding data transfer.

In order to properly describe the operation of the Sub-Priority and Priority circuits of the Input-Output section of the computer, it becomes necessary at this point to back-track and assume that other types of requests are being presented to the computer. As will be described more fully later on, the Sub-Priority Network is effective to honor various types of request signals on a fixed priority basis. Similarly, the Priority Network is utilized to establish priority among the various channels that may simultaneously be presenting the same request to the computer.

In accordance with the foregoing statements, assume that a peripheral device such as a magnetic tape unit on one or more of the 12 normal channels 2 through 14 presents an Output Request control signal to the Input-Output section of the computer, to thereby request that the computer read a word of data out of its memory section into the peripheral device. These Output Request control signals are applied to one or more of the control lines 186, 188 or 190 (FIG. 4d) which are connected to the input terminals of respective ones of the Output Request Amplifiers 192, 194 and 196, there being one such amplifier for each output channel. As in the case of the Input Request Amplifiers, the Output Request Amplifiers are effective to transform the signal level employed between the external devices and the computer to the signal level utilized in the computer. These signals, in turn, pass through a cable 198 and fan out to corresponding Output Request One-Shot circuits 200, 202, and 204. Before the Output Request One-Shot circuit can be set so as to produce a signal on its output line, it is necessary that its associated Output Active flip-flop 206, 208 or 210 (FIG. 4c) be rendered active by being set to its binary "1" state.

In order for this condition to be satisfied, the computer must first execute one or more Output Buffer Instructions. The buffer control word is a 30-bit word that has been previously stored in the memory of the computer. During the execution of the Output Buffer Instruction, the operand portion, y, is the address of the index word and during the next memory reference this index word, which was contained at address y, is stored at a predetermined address in the magnetic core memory termed the "Buffer Control Register." By way of example, the address of this register for an output buffer may be 00120+$j^*$ (octal) in memory.

Also, at this time the 4 bits comprising the $j^*$ designator are transmitted to the Translator 142 by way of the cable 138 and the OR gates 140, where the 4 bits are decoded so as to select a single line which is contained in the cable 144 and which is effective to set the Output Active flip-flop corresponding to the channel specified by $j^*$. It is, of course, possible to execute a series of Output Buffer Instructions for various channels to thereby set more than one of the Output Active flip-flops 206, 208 or 210.

The output signals appearing at the "1" side of the Output Active flip-flops are conveyed through the cable 212 and applied to corresponding ones of the Output Request One-Shot circuits 200, 202 and 204. For example, the output from the Output Active flip-flop associated with channel 7 is conected by a line in cable 212 to the Output Request One-Shot circuit associated with channel 7. When both a signal from an Output Active flip-flop and an Output Request signal are simultaneously applied to one or more of the Output Request One-Shot circuits and the Output Request signal is subsequently dropped, one or more of the One-Shot circuits are set, causing a first signal to be applied to one input terminal of its associated Output Request Gate 214, 216 or 218.

In the same way that apparatus is provided for accepting Input and Output Request signals from the external equipment, apparatus is also provided for accepting other types of requests. For example, a peripheral unit connected to any one of the 12 normal input channels may interrupt the main computer program at any time by sending an "External Interrupt" control signal to the computer. The peripheral unit may simultaneously with this action, convey the reason for the interrupt to the computer by way of the Input Data Lines 120, 122 and 124 for the channel on which it gave the interrupt control signal. The program logic of the computer is made aware of the External Interrupt signal by being forced to take the next instruction from a specified location in memory. The action which follows the External Interrupt is therefore programmable. For example, the tape unit on one of the channels may have failed because of a tape break so that corrective action must be taken before this unit will be able to continue operation. The External Interrupt signal will break the normal operational program of the control section and process the information associated with the interrupt. The particular sub-routine that the computer will jump to should result in corrective programming for the external equipment, generating the interrupt or, in the alternative, cause a monitoring typewriter to type out the physical corrections to be made.

When the External Interrupt is generated, the external equipment places on the data lines for this channel a 30-bit word explaining the reason for the interrupt. The Input-Output section of the computer then generates a special address location in memory which is unique to the particular channel in question. Generally a return jump instruction is stored at this location and causes the computer to process a sub-routine which performs the corrective action.

Figure 4D:
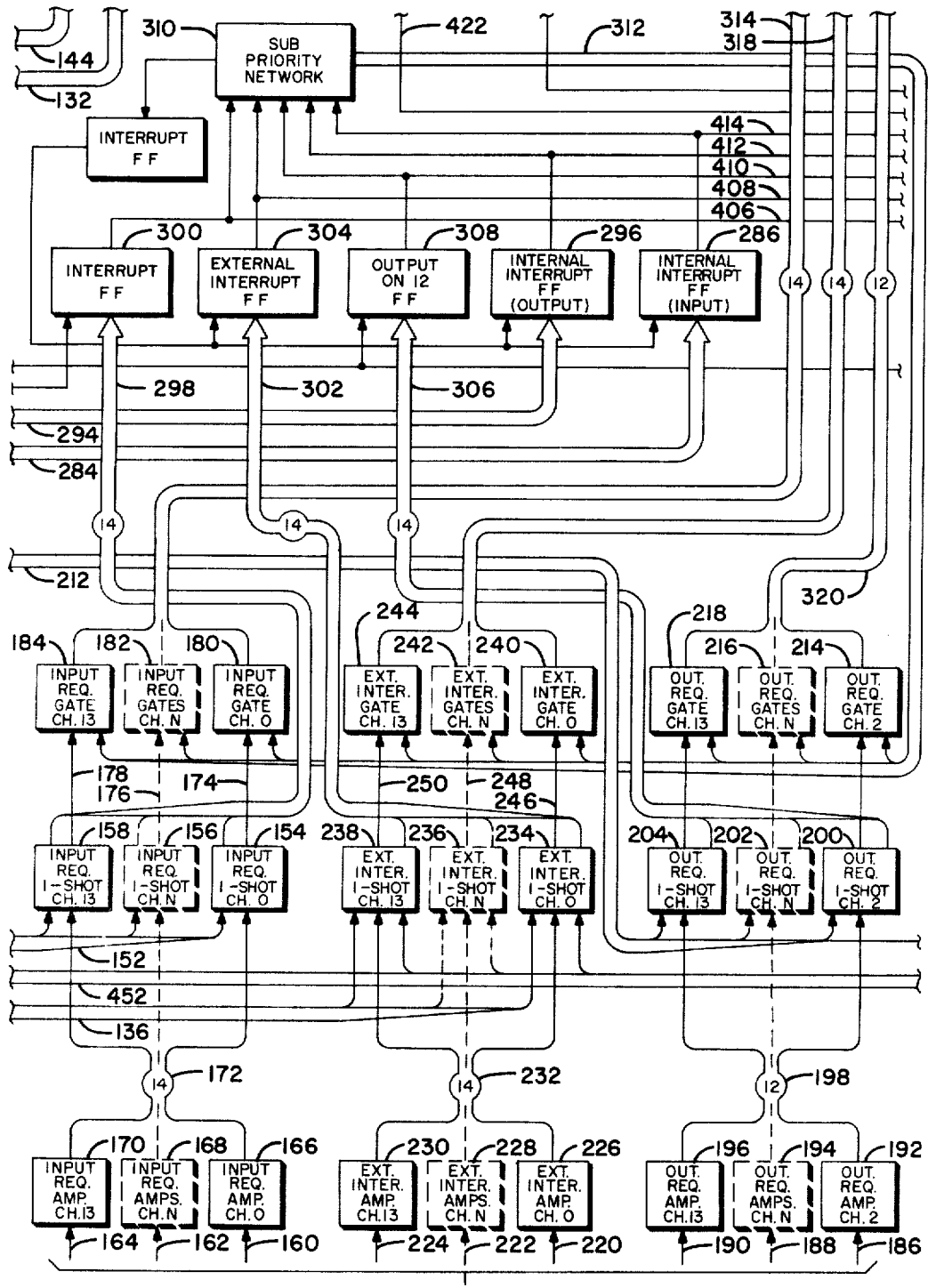
Figure 4E:
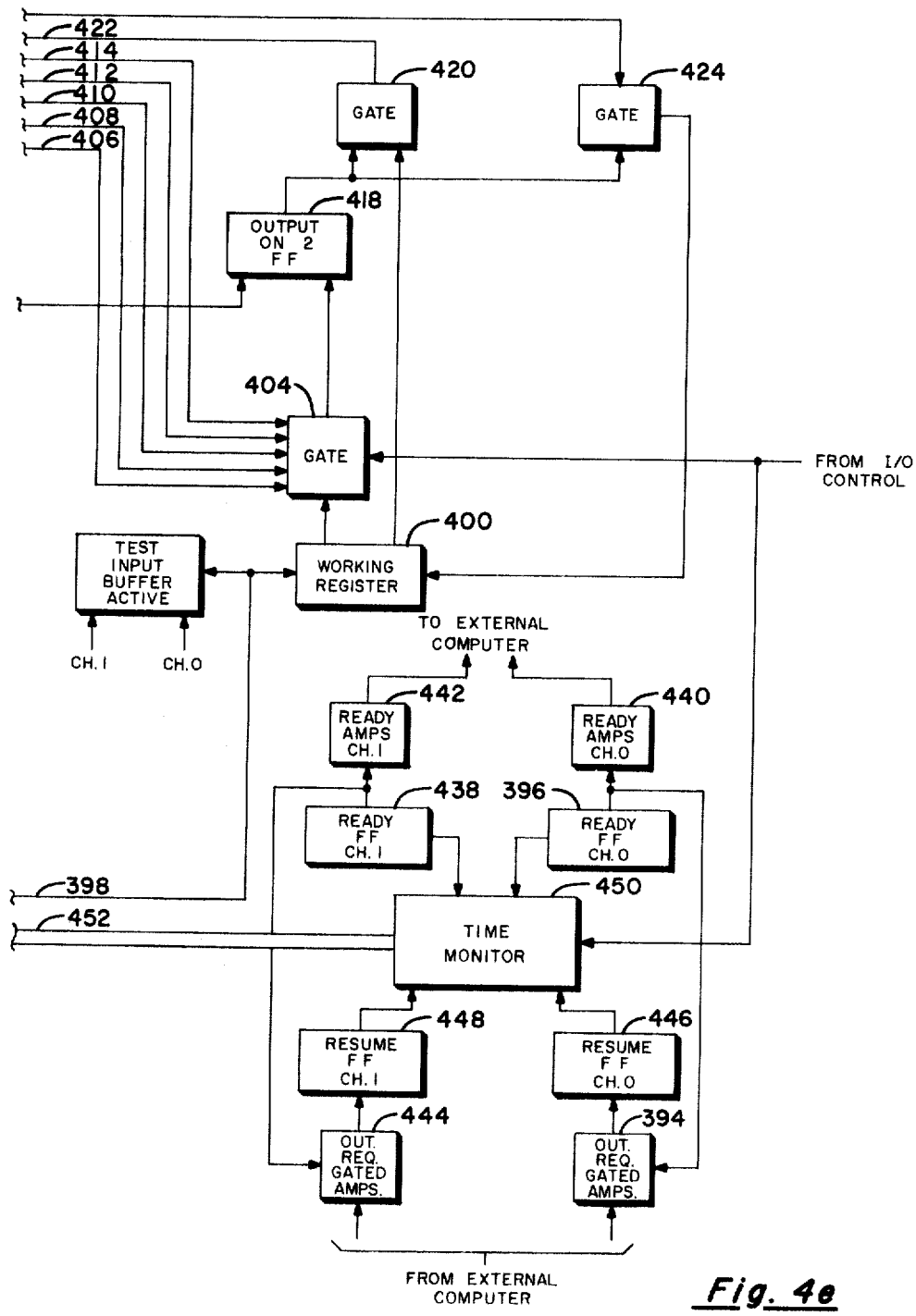

These External Interrupt control signals from the peripheral equipment are brought into the Input-Output section of the computer by way of control lines 220, 222, or 224 (FIG. 4d). As in the case of the Input Request and the Output Request signals, suitable amplifiers 226, 228 and 230 are preferably included to adapt the signal level on the communications channel to the signal level utilized in the computer. Interrupt signals, when presented, are amplified by these devices and the resulting signals appearing at the output of the amplifiers pass through a cable 232 and fan out to a first input terminal of a set of Interrupt One-Shot circuits 234, 236 and 238. Since the External Interrupt is a special type of signal which allows the peripheral device to break into the computer program, there is no need to provide active flip-flops for the interrupt circuits since the interrupt is independent of the computer program. Hence, the application of an External Interrupt is sufficient to set an Interrupt One-Shot circuit. When an Interrupt One-Shot circuit is in its set condition, it provides a first output signal which is applied as an input to a set of corresponding Interrupt Gates 240, 242 and 244 by way of the conductors 246, 248 and 250 respectively.

In addition to the ability of the computer of this invention to be interrupted by the peripheral equipment with which it communicates, means are also provided to allow the computer itself to generate interrupt signals upon the occurrence of certain events. For example, in many applications it is desirable that the computational and data handling processes of the computer be interrupted and thereby advised of the fact that a buffer transfer has been completed on a certain channel.

It has been mentioned that the buffer control word is comprised of two parts, each 15 bits in length. The lower 15 bits determine where the first word of data is to be stored or read out, whereas the upper 15 bits determine the location in memory where the last word is to be placed or read out. As each word of data is transferred to or from the memory, the lower half of the buffer control word is incremented and a comparison is made to determine whether the lower half is equal to the upper half. When equality is detected an indication is given that all data words defined by the input buffer have been transmitted. This indication can be used as an interrupt signal.

To distinguish an interrupt signal generated by a peripheral device from an interrupt signal generated by the computer itself, the former is termed an "External Interrupt" and the latter is termed an "Internal Interrupt." Furthermore, the Internal Interrupt which may be generated some time subsequent to the execution of an $f=75$ (Input Buffer with Monitor) instruction is termed an Input Internal Interrupt to distinguish it from the Internal Interrupt signal developed upon the completion of an Output Buffer with Monitor Instruction ($f=76$).

An important advantage of the system of the present invention resides in the fact that whether or not an Internal Interrupt will be generated upon the completion of a buffer transfer is under the control of the programmer. He has the choice, then, whether or not a predetermined sub-routine or group of instructions should be executed out of the sequence established in the main program, or whether the next instruction of the main program should be taken in turn. This increases the programming flexibility of the machine.

The hardware employed to generate the Internal Interrupt signal will now be described. Referring to FIGS. 4a through 4d and initially to 4b, when an instruction calling for the execution of a buffer transfer with monitor ($f=75$ or $f=76$) is read out from memory to the instruction register (U-register) it is temporarily placed in the Z-register 134. While located therein the Translator 142 examines the 4 bits comprising the $j^*$ designator and causes a signal to be developed on a line in the cable 144 associated with the channel specified by $j^*$. As has already been mentioned, this signal is effective to set a particular one of either the Input Active flip-flops 146, 148 and 150 or the Output Active flip-flops 206, 208 and 210. The signal from the Translater also passes through the cable branch 252 to one of the Input Monitor flip-flops 254, 256 and 258 and to one of the Output Monitor flip-flops 260, 262 and 264. If it is an Input Buffer with Monitor instruction ($f=75$) that is being executed, during the D-sequence, a signal is developed by the D-sequence timing chain (not shown) which is applied by way of a conductor 266 to a second input terminal of the Input Monitor flip-flops. Since, in order to set the Input Monitor flip-flop, it is required that a signal be present from both the Translator and the D-sequence timing chain, it can be seen that only one such flip-flop will be set during the execution of the instruction, and it is the particular one specified by the $j^*$ designator. Likewise, during the execution of an output buffer instruction ($f=76$) the D-sequence timing chain generates a signal which passes by way of a conductor 268 to an input terminal of all the Output Monitor flip-flops. If an Output Buffer with Monitor instruction is currently being executed only one of the Output Monitor flip-flops 260, 262 and 264 will be set. The particular one to be set is again determined by the translation of the $j^*$ designator of the instruction word.

One output from each of the Input Monitor flip-flops is connected to an associated Input Internal Interrupt Generator. For example, the Input Monitor flip-flop 254 for channel 0 is connected by means of a conductor 270 to a first input terminal of an Input Internal Interrupt Generator 272. Similarly, Input Monitor flip-flops 256 and 258 are respectively connected by means of conductors 274 and 276 to the Input Internal Interrupt Generators 278 and 280. A second input to the Internal Interrupt Generators comes from the output of the Input Active flip-flops by way of a cable 282. More specifically, an output signal from the Input Active flip-flop 146 associated with channel 0 passes through cable 282 and is connected to a second input of the Input Internal Interrupt Generator 272. The outputs from the other Input Active flip-flops are similarly connected to respective Input Internal Interrupt Generators. The Input Active flip-flops and Input Monitor flip-flops for the various channels are connected to the Input Internal Interrupt Generator in such a manner that when the active flip-flop changes from its active to its inactive state, the Internal Interrupt Generators will transmit output signals by way of a cable 284 to an Internal Interrupt flip-flop 286 in the Sub-Priority Network (FIG. 4d).

In order to generate an Internal Interrupt upon the completion of an Output Buffer with Monitor instruction, at least one of the Output Active flip-flops 206, 208 and 210 must have been previously set and also the Output Monitor flip-flop for this same channel must be set. Under these conditions, when the Active flip-flop changes from its active to its inactive condition, the Output Internal Interrupt Generator 288, 290 or 292 will be in a condition to generate signals which pass through the cable 294 to the Output Internal Interrupt flip-flop 296 of FIG. 4d. Both the Input Internal Interrupt and the Output Internal Interrupt signals are treated by the computer like any other type of request signal previously mentioned.

Now that it has been shown that the Input-Output section of the computer is capable of receiving more than one type of request from peripheral devices connected to different channels and that more than one peripheral device connected to separate channels can simultaneously be presenting the same type of request, circuits employed to honor both the type of request and the channels presenting the same request on a priority basis will now be described.

In addition to the conductor going to a first input of the request gate circuits, the one-shot circuits for each of the control lines in each channel provides a second output conductor which connects the one-shots to separate flip-flop circuits. For example, the Input One-Shot circuits 154, 156 and 158 (FIG. 4a) each provide a second output line and these lines are combined in the cable 298 which, in turn, is connected to the set terminal of an Input flip-flop circuit 300. The second set of output lines from the Interrupt One-Shots 234, 236 and 238 are combined in the cable 302 which connects these Interrupt One-Shot circuits to the input terminal of the External Interrupt flip-flop 304. Finally, each of the Output Request One-Shot circuits 200, 202 and 204 provides a second output line which is combined in the cable 306 so as to connect said Output Request One-Shots to the input terminal of the Output flip-flop 308.

Each of the flip-flops 286, 296, 300, 304 and 308 provides an input connection to a circuit termed the Sub-Priority Network which is indicated by the block numbered 310. As will be described more fully hereinbelow, the function of the Sub-Priority Network 310 to to determine the order in which the various types of requests will be honored. For example, if it is assumed that peripheral devices on three separate channels are respectively presenting an Input Request, an Interrupt Request, and an Output Request at the same time and that an Input Internal Interrupt Generator 272, 278 or 280 and an Output Internal Interrupt Generator 288, 290 or 292 is set, it becomes necessary for the computer to honor these requests in some predetermined order because it is unable to process them simultaneously. The Sub-Priority Network 310 combines the output signals from the Input flip-flop 300, the External Interrupt flip-flop 304, the Output flip-flop 308 and the two Internal Interrupt flip-flops 286 and 296 in such a manner that an External Interrupt Request will be honored first, an Output Internal Interrupt Request will be honored second, an Input Internal Interrupt Request will be honored third, followed by an Output Request and an Input Request, in that order. It is of course, possible that the Sub-Priority circuitry is arranged such that the request is honored in some other order so that limitation to this particular order is not intended.

After the Sub-Priority Network has determined the request to be honored first, it emits an output signal on the lines in the cable 312 which lead to a second input terminal on the gates associated with this request. For example, if the Sub-Priority Network determines that an Input Request is to be honored, a signal is emitted along the lines in cable 312 which are connected to the second input terminals of the Input Request Gates 180, 182 and 184. The signals on these last mentioned lines enable the gates to permit the request control signals to pass through the cable 314 to the Priority Network represented by the block labeled 316. Similiarly, since the External Interrupt is honored ahead of either an Input Request, or an Output Request if an External Interrupt request signal were present on one or more of the input lines 220, 222 and 224, then the Sub-Priority Network will develop signals on the lines in the cable 312 leading to the second input terminal of the External Interrupt Gates 240, 242 and 244. The signals on these lines enable the gates to permit the External Interrupt Requests to pass through them and through a cable 318 to the Priority network 316. Finally, if the Sub-Priority Network determines that an Output Request is to be honored, a signal is emitted along the lines in the cable 312 which are connected to the second input terminals of the Output Request Gates 214, 216 and 218. The signals on these last mentioned lines enable the Output Request Gates to operate in such manner that the Output Request control signals are able to pass through the cable 320 to the Priority network 316.

The function of the Priority Network is to determine which one of two or more channels simultaneously presenting the same type of request will be honored. To exemplify the operation of the Priority structure, assume that an External Interrupt is present on input channel 6, and Output Requests are present on channels 4 and 11. The Sub-Priority logic first examines the input-output processes and determines that an External Interrupt is present. Because its presence has priority over an output operation, the External Interrupt request will be honored first. The priority Network 316 then determines the highest numbered channel with an External Interrupt present, namely channel 6. After the Input-Output logic has informed the main program control logic of the computer of the impending program interrupt, the Priority logic will then examine the input-output processes and determine that the Output Request is present. The Priority Network then determines the highest numbered channel on which the request is present, namely channel 11. The buffer transfer logic then completes the data transfer and the Sub-Priority logic again takes over the re-examine the input-output processes to determine if any new requests are present. In the event that several Input and Output Requests are present simultaneously, the input and output word transfers are interlaced by a time-share circuit—the output word transfer on the highest numbered channel being taken first.

Under control of the Input-Output timing and control circuits (which are described in detail later in this specification) a command is generated to load the Priority Network 316. This enable is applied to the Gated Internal Interrupt Generators indicated generally by the numeral 321 (FIG. 4a). Provided that an Input Active flip-flop connected to the Gated Internal Interrupt Generator changes from its active to its inactive state and that the particular Monitor flip-flop associated with the Gated Internal Interrupt Generator under consideration is set, the occurrence of the command enable to load the Priority Network causes a signal to be sent along a line in the cable 323 to set the associated Channel Designator flip-flop in the Priority Network.

In addition to determining the channel priority, the Priority Network 316 also sets up a special address for a particular mode of operation. As will be detailed more fully when the various functional blocks of FIG. 4 are described, the Priority Network utilizes a plurality of bistable flip-flop stages interconnected in such a manner as to designate a specific channel number from 0 to 13. Since the higher numbered channels have priority over the lower, the network specifies a particular channel for which selected flip-flops are set. Signals representing the address of the channel having the highest priority (as determined by the priority logic) are conveyed over the cable 322 and through the OR gates 324 to the S-register 326 which, as mentioned previously, is the Storage Address Register. When the memory is initiated the contents of the memory address now contained in the S-register are read out and transmitted to the Z-register via memory 386. As was mentioned before, the execution of an Input or Output Buffer Instruction is required to set the appropriate Input or Output Active flip-flops so that an incoming Input and/or Output Request could be processed by the Sub-Priority and Priority Networks. It should be recalled that the execution of these types of instruction is also effective to read out the word located at the address in memory specified by the operand portion, $y$ of this instruction and in storing it at either the address $00100+j^*$ or at $00120+j^*$, depending on whether it was an Input or an Output Instruction. In other words, at the time of execution of a buffer transfer instruction the index word is read out from memory and then read back into a buffer control register.

Thus, it is the buffer control word which is transmitted to the Z-register when the proper channel address, developed by the Priority Network, is transmitted to the S-register. Under command of the input-output control and timing networks, the contents of the lower half of the Z-register ($Z_L$) is next transmitted to the Storage Address Register 326. During the restore cycle the contents of the lower half of the Z-register is incremented by one and read back into the buffer control register. The modifier box 328 connected between the Z-register and the memory by means of the 15-conductor cables 330 and 332 is intended to illustrate this function. If an Output Instruction is being honored, the data word located at the address now contained in the S-register is read into the Z-register 134 where it is available for transmission out to the particular peripheral device which has had its request signal honored.

If an Input Instruction is being honored by Priority when the index word is in the storage address register 326, the channel address from the Priority Network 316 is conveyed by way of the cable branch 334 and the OR gates 140 to the I/O Translator 142. The Translator operates on the 4 bits of the channel address which specifies the particular channel being honored by Priority, causing an output signal on a line in the cable 144 to be energized. This line will either branch off from the cable 144 or pass through the cable branch 336 (FIG. 4c). In the latter case it connects into the cable branch 136 providing an enabling signal for the Gated Input Amplifiers 126, 128 and 130 for the selected channel. The word of data from the peripheral device then passes through the Gated Input Amplifiers and through the cable 132 to the Z-register 134. The data word is therefore available to be written into the particular memory register specified by the buffer control word contained in the S-register 326. Subsequent to the transmission of the data word to the Z-register the input-output control circuits develop a command enable RESET INPUT RESQUEST ONE-SHOT.

After the Input-Output section of the computer has honored an Output Request and the data to be transmitted to a peripheral device is in the memory communications or Z register 134, the data word signals are conveyed along the cable 338 and the cable branch 340. These signals are applied to a first terminal of a set of AND gates indicated generally by the numeral 342 (FIG. 4a). Since the communication takes place in a 30 bit parallel mode, each stage of the Z-register 134, has an output line in the cables 338 and 340. There are 30 such AND circuits 342. In order to gate the data signals from the Z-Register 134 (FIG. 4b) to the Output Register $C_0$ (FIG. 4a)—indicated generally by the numeral 344—the input-output timing and control circuits, at the proper time, emit a command enable TRANSFER Z TO $C_0$ on the line 346 which opens the gates 342 to permit the data bits to pass through. This sets the stages of the Output Register in accordance with the data being transmitted. The output from the $C_0$ register is capable of driving the output amplifiers on the 12 output channels. The output from the "0" side of each of the 30 stages of the $C_0$ register drives three Data Line Drivers which are indicated in FIG. 4a by the numeral 348. Each of these circuits is capable of driving four input amplifiers in the peripheral equipment, and each functions to adapt the signal level employed in the computer to the signal level transmitted to the peripheral equipment. The data signals from the Line Drivers 348 pass through the cable 350 which leads to the external devices.

When the computer has set the output data lines it follows a fixed time later, as determined by the Input-Output control section, with a control signal. This control signal, termed an Output Acknowledge, informs the external equipment that the data lines are ready to be sampled. Since the data signals are applied to the peripheral devices on all the output channels simultaneously, some means must be provided for advising only the honored peripheral equipment to accept them. Again, the Translator 142 performs this selection function. The selected channel address is translated and the resulting output signal is conveyed through the cable 144, the cable branch 336, and through the branch 352 to the Output Acknowledge and External Function flip-flops indicated in FIG. 4c by a block numbered 354. For the sake of clarity, only one flip-flop is indicated in the drawing, but it should be understood that there is one such flip-flop for each of the output channels. The particular flip-flop selected by the Translator 142 is set and the resulting signal is passed through one of the Output Acknowledge Gates 356, 358 or 360 and one of the Output Acknowledge Amplifiers 362, 364 or 366 to one of the control lines leading to the peripheral device on the selected channel. This signal advises the external device that data are available on the output channels and that it can now be accepted. The peripheral device, having received the information from the $C_0$ register, may then drop the Output Request signal any time after the reception of the Output Acknowledge signal from the computer.

When the computer has honored an Input Request signal and stored the data in memory, it advises the peripheral device, which transmitted this word of information, that it has completed the storage operation by sending a control signal termed an Input Acknowledge. As before, the Translator 142 comes into play, selecting the appropriate channel on which the Input Acknowledge signal is to be sent. The channel address is translated and a signal appears on one of the lines in the cable 144. It passes through the cable branches 336 and 368 to a set of Acknowledge Gates 370. While only one such gate is shown in FIG. 4c, it should be understood that there is one such gate for each of the input channels and hence, the signal from the translator is applied to only one of the gates. As will be described later, the enabling signal for the Acknowledge Gate (SEND INPUT ACKNOWLEDGE) comes from the input-output control and permits this acknowledge signal to be sent out from the gates along the cable 372 and through one of the Acknowledge Amplifiers 374, 376 or 378 to the peripheral device which has transmitted the last word of data to the memory of the computer. Again, the Acknowledge Amplifiers are provided to match the signal level in the computer to the signal level required by the external equipment.

When the computer wishes to notify a particular piece of peripheral equipment on a specified channel that it is ready to receive data or that it wishes to transmit a word of data thereto, it sends out an External Function signal along one of the control lines 380, 382 or 384. This control signal is used as a command between the computer and the peripheral equipment. This signal is initiated by the computer and sent out to the peripheral units by the execution of an External Function instruction ($f=13$). The $j^*$ portion of this instruction word again determines the particular channel on which the External Function signal is to be transmitted. The operand portion $y$ of the instruction word specifies the address of a word in memory which is the command itself. This data-word is sent to the peripheral device via the normal output cables 350 (FIG. 4a). Only the particular channel as designated by $j^*$ receives the External Function control signal and hence is the only peripheral device capable of responding to the word.

Each time that a word on an input buffer is transferred to the random access memory 386 or, on an output buffer, each time a word of data is extracted from the memory, the lower half of the buffer control word is incremented and replaced in the Buffer Control Register for the channel in question in the memory. When the lower half of the control word becomes equal to the upper half, means are provided for terminating the buffer transfer on the channel utilizing the particular index word to prohibit the assigned peripheral device from further communicating with the computer. The means for terminating the buffer transfer is shown diagrammatically in FIG. 4b as the Comparator 388. The cable 390 connects the upper and lower halves of the Z-register 134 to the comparator. When the contents of the upper and lower half of the Z-register are equal, a signal is emitted on the cable 392. Although not shown in FIG. 4b, gating means are provided which receive enabling signals from the Translator 142 and are employed selectively to transmit the signal developed by the Comparator 388 to the particular Input or Output Active flip-flop associated with the channel on which the buffer transfer has taken place. It should be recalled at this point that before an Input or Output Request could be processed by the Sub-Priority and Priority networks of the Input-Output sector of the computer, it was necessary that the channel, over which the request had been transmitted, be active. Since the completion of a buffer transfer causes the Input or Output Active flip-flop to be reset to its "0" state, the channel associated therewith is de-activated and hence further requests on this channel cannot be honored. As previously described, when a Buffer with Monitor Instruction has been used to render the channel active, its subsequent de-activation causes the generation of an Internal Interrupt.

In the case of an External Interrupt request, the channel address generated in the Priority network is transmitted to the Interrupt Address Storage Register 325 (FIG. 4b) by way of the cable branch 322. The address stored therein is held until a time during the normal A-sequence when a command enable is generated by the main control timing chain (not shown) for transferring the interrupt address to the S-register 326. The computer then accesses the jump instruction normally contained at this address and processes the corrective subroutine. From the time that the Gated Internal Interrupt Generator 321 outputs a signal to the Priority Network the computer handles this request like an External Interrupt request.

The foregoing functional description has thus far covered the operation of the Input-Output section of the computer when a data interchange is performed between a computer and a plurality of external devices. The next feature to be considered is the interchange of data between the central computer and one or more external computers connected thereto.

Data transfer between computers presents a very complex timing problem. It is necessary to maintain stringent control over the establishment and termination of intercomputer buffers to insure good communication. The initiation of data transfer is the main key to establishing synchronism between computers, and buffer termination characteristics are defined within this initiation process.

Limits for the input buffer transfer must be defined before this mode of operation can be initiated. Because the receiving computer does not know how many words of data the transmitting computer wishes to send, it can not define the terminal address of the input buffer. It therefore becomes necessary for the transmitting computer to define this terminal address for the receiving computer. In order to prepare itself for the subsequent receipt of data from the transmitting computer, the receiving computer must execute an Input Buffer Instruction such as the $f=75$ instruction previously described. The transmitting computer is able to determine whether or not the receiving computer has executed such an instruction by testing the state of the so-called Input Buffer Status line.

When the receiving computer has conditioned itself for a subsequent receipt of data, the transmitting computer establishes the input buffer control word or index word for the receiving computer. In other words, the first word of output data from the transmitting computer is the input buffer control word for the receiving computer. The lower order 15 bits of this word define the initial address for data storage and the upper order 15 bits define the ending address for data storage. In a similar manner, buffer limits for the output buffer of the transmitting computer must also be defined. Initial and final addresses of the output data are entered into the lower and upper order halves, respectively, of the 30 bit Output Buffer Control Register of the transmitting computer. When the limits are so defined, the output buffer mode can be initiated. This is performed by the execution of an Initiate Output Buffer with Monitor instruction ($f=76$). As soon as this instruction is executed, the first word of output data, i.e. the input buffer control word for the receiving computer, is transmitted to the receiving computer.

When the limits have been thus established, data transfer proceeds under control of the READY and RESUME signals for the transmitting computer and REQUEST and ACKNOWLEDGE signals for the receiving computer. As soon as the entire data transfer is completed, each computer will be interrupted by an internal interrupt generated by the monitor circuits.

As was mentioned earlier, channels 0 and 1 are of the 14 input channels are special channels devoted entirely to intercomputer communication. Since computers can process data at the same rate, channels 0 and 1 and an Out-on-2 request have the lowest priority in the input-output logic structure. This is necessarily true because it is conceivable that intercomputer data transfer could lock out the other external equipment on the remaining 12 channels if channel 0 and 1 were assigned a higher priority. Similarly, in order to prevent one external computer from locking out the other, data transmission can be carried out on a time-share basis. In this way, data transmission is alternated automatically between each of the two external computers. Another timing problem occurs when the computer receiving the data does not respond by sending a RESUME signal because of some malfunction. Under this condition the READY signal would remain on the line, preventing the transmission of data to the other computer. To obviate this difficulty, a time limit is imposed which allows the READY signal to remain on the line for a minimum of 32 seconds up to a maximum of 64 seconds. While the time element involved may seen extremely long in comparison to normal computer operating time, it is not wasted since the external computer may be processing requests on the normal 12 input and output channels.

In summary, the normal sequence of events for a transfer of data from computer A to computer B is listed below:

(1) Computer B sets Input Buffer Active line.
(2) Computer A detects Input Buffer Active signal.
(3) Computer A places data on the 30 data lines.
(4) Computer A sets READY signal which becomes an Input Data request in Computer B.
(5) Computer B detects Input Data request.
(6) Computer B samples the 30 data lines.
(7) Computer B sets the Input Acknowledge line which is returned to Computer A as a RESUME signal.
(8) Computer A senses this RESUME line.
(9) Computer A drops the READY signal from its line.

Steps 3 through 9 of the sequence are repeated for every data word transfer. The Input Buffer Active line remains energized during the transfer of an entire block of words, i.e., until the lower half of the buffer control word becomes equal to the upper half.

The circuits employed in the computer for accepting a word data from an external computer are not significantly different from those employed during a data transfer from an ordinary peripheral device. The transmitting computer tests to see whether the input channel of the receiving computer is active and therefore capable of later accepting data. As will be dsecribed more fully when the details of the operation of the input-output system are described, this test is performed by the transmitting computer's execution of a $f=13$ instruction wherein the $j^*$ designator is equal to 0 or 1. If the $j^*=0$, the test is made on the Input Active flip-flop associated with channel 0 and if $j^*=1$, the test is made on channel 1. After the transmitting computer has determined that the receiving computer is in condition to accept data, it places the information bits on the 30 data lines. More specifically, assuming for example that the transmitting computer is connected to channel 0 of the receiving computer, the information would be placed on the cable 120 (FIG. 4c) leading to the Gated Input Amplifiers 126 for channel 0. Next, the transmitting computer sets its Ready flip-flop 396 (FIG. 4e) so that a READY signal is sent to the receiving computer. This signal becomes an Input Request for channel 0 and hence is applied to the control line 160 in FIG. 4d. The receiving computer operates on this READY signal as if it were an ordinary Input Request. In other words, it is processed by the Sub-Priority network 310 and if, at the time in question, no other requests of higher priority are present, it is presented to the Priority Network 316 where the channel with an Input Request of the highest priority is determined. Provided no other higher numbered channels (higher than 0) have input Requests presented thereto, the Priority Network develops an address for channel 0 which goes to the Translator 142. The Translator examines these address signals and produces a signal on a line in the cable 144 which passes through cable branches 336 and 136 to gate the 30 bits of data through the Gated Amplifier 126 to the Memory Communications Register 134. From register 134 the data is stored in the memory of an address specified by the buffer control word. The receiving computer then sets the Input Acknowledge line for channel 0 and the resulting signal passes through the Acknowledge Amplifier 374 and is, in turn, applied to the Output Request Gated Amplifier 394 of the transmitting computer. The receiving computer senses this RESUME signal and drops the currently existing READY signal by resetting the Ready flip-flop 396.

If the receiving computers on channels 0 and 1 each have their Input Active flip-flops set, the transmitting computer then initiates an output transfer on these channels. For example, it will be considered that Computer A is doing the transmitting, Computer B is connected to channel 1, and a further Computer C is connected to channel 0. The Output Active flip-flop 206 (FIG. 4c) for channel 0 outputs a signal via cable 212 one line 398 of which goes to a Working Register 400 (Fig. 4c).

The Working Register is a two stage register which functions as a time-share circuit for data transmission on channels 0 and 1. If Computers B and C are both active and capable of receiving data, data transmissions from Computer A are automatically alternated between them, under control of the Working Register. Within this register is a Loading flip-flop (not shown) which controls the setting of the register flip-flops themselves. Once the Loading flip-flop is set, enable signals are sent to the gates at the input of the Working Register flip-flops. The other signals applied to these gates come from the active flip-flops by way of cable 212 and line 398. When both signals are present the Working Register can be set. A conductor 402 connects the output of register 400 to a first input of the gate 404. The other inputs to this last mentioned gate come from the outputs of the Input flip-flop 300 by way of conductor 406, the External Interrupt flip-flop 304 by way of conductor 408, the Out-on 12 flip-flop 308 by way of conductor 410, the Output Internal Interrupt flip-flop 296 via conductor 412 and the Input Internal Interrupt flip-flop 286 via conductor 414. Only when all of the signals on these conductors are such as to indicate the absence of requests of higher priority, will gate 404 be fully enabled and permit the passage of a signal along conductor 416 to set the Out-on-2 flip-flop 418 in Sub-Priority. It can be seen then that an Output Request on channels 1 and 0 have the lowest priority of all the types of requests heretofore mentioned.

The gate 420 controls the transfer of an Out-on-2 Request to the Priority Network 316. When both the Working Register and the Out-on-2 flip-flops are set, a signal from the Input-Output control and timing circuits causes the transmission of this request to the Priority Network by way of conductor 422. After the Priority Network generates the channel address for the special channel being honored, the Working Register 400 may be cleared in anticipation of a subsequent request. The gate 424 controls this clearing function.

After the Priority Network generates the special channel address, this address is transmitted in the normal manner to the Storage Address Register 326. The buffer control word is subsequently read out of the Buffer Control Register specified by the channel address and in turn used to access the data word to be transmitted. For an Out-on-2 Request the data word is gated from the Memory Communications Register (Z-register) 134 to the 30 bit $C_1$ register indicated generally by the numeral 426 (FIG. 4b). More specifically, once the data word is read out from the memory to the Z-register, the data signals are applied via cable 338 to a first input of the $C_1$ register AND gates indicated by numeral 428. The timing and control circuits at the appropriate instant generate the command enable TRANSFER Z TO $C_1$ which appears on conductor 430 to fully enable the gates 428, permitting the setting of the $C_1$ register stages in accordance with the data signals in the Z-register. The Data Line Drivers 432 are employed to provide sufficient signal strength to permit the transmission of the data signals over the cable branches 434 and 436 to the external computers on channels 0 and 1. While the data is presented to both external computers, it is only received by the external computer to which the READY signal is sent.

The READY signal is transmitted from the computer to an external computer a predetermined time after the data is transmitted. This time delay is fixed and is provided by the input-output control and timing circuits. The signal remains on the line until its associated Resume flip-flop is set. When the data is initially placed in the $C_1$ register the Ready flip-flops 396 and 438 (FIG. 4c) are a cleared condition. The command enable to send the READY signal is initiated by the input-output timing chain and an output from the Translator 142 determines which of the Ready flip-flops would set. If the output of data is on channel 0, the translator causes the Ready flip-flop 396 to be set. The Ready Amplifiers 440 and 442 serve as control line drivers for providing the requisite signal level for the control lines connecting the transmitting computer to the receiving computer. The READY signal informs the receiving computer that data is available for sampling.

The READY signal remains on its control line until the subsequent receipt of a RESUME signal from the receiving computer. As has already been mentioned the RESUME signal enters the transmitting computer by way of one of the Output Request Gated Amplifiers 394 and 444 depending on which channel the READY signal was transmitted. This RESUME signal is effective to set its associated Resume flip-flop 446 or 448. Once the Resume flip-flops are set, the input-output timing and control circuits effect a clearing of the Ready flip-flops.

The circuit 450 labeled "Time Monitor" is provided to insure that a RESUME signal is returned within a predetermined time after the transmission of the READY signal. This, as already mentioned, insures that the computers will not be tied up in the event of the malfunction preventing the return of the RESUME signal.

If, because of a malfunction, the RESUME signal is not received within the specified time, a signal is sent out along one of the lines in the cable 452 to clear the Output Active flip-flop for the channel involved. This signal also serves as a simulated external interrupt signal which is processed by the input-output section in the normal manner causing the computer to take its next instruction from a predetermined storage location.

Before describing the details of the various circuits for performing the Input-Output operations, the basic logical building blocks employed therein will be presented. Referring to FIG. 6, there is shown in block diagram form the basic building block 460 utilized in the circuitry of the present invention. This block 460 represents an OR INVERTER often referred to in the art as a NOR circuit. The OR INVERTER may have a plurality of input terminals e.g., A, B, and a single output terminal C. The truth table of FIG. 7 indicates that if a logical "1" signal is applied to one or more of the input terminals, the output appearing at the output terminal is a logical "0." Only when all of the inputs are logical "0's" will a logical "1" appear at the output terminal thereof. The notation abZcd contained within the block indicates where the particular circuit is used. The capital letter specifies a large category or register in the computer. For example, "Z" would refer to the Z-register. The "ab" refers to two numerical characters located at the left of the capital letter. These characters describe, in most cases, the function of the inverter circuit. If the circuit is part of a particular register the following combination is used:

00=zero or clear side of bit register
01=one or set side of bit register
02, 04, 06, 08=slaves off one side of bit register
03, 05, 07, 09=slaves off zero side of bit register The remaining valves of ab are employed for gates and other logic circuits associated with that register. The indicators cd are also two numeric characters located to the right of the capital letter, indicating the particular stage of the register in which they are employed. For example, an inverter 03Z05 would be connected to the "0" side of the fifth stage of the Z-register.

In FIG. 8 there is shown a circuit for implementing the OR INVERTER or NOR logic. Since other circuits can be devised for performing this type of logic, the circuit illustrated schematically in FIG. 8 is only typical—limitation thereto is not intended. In the apparatus of the present invention a logical "1" signal is represented by a potential of −3 volts while a logical "0" is represented by a potential of 0 volts. When a logical "0" is present on one or more of the input terminals 462, 464 and 466 and no logical "1's" are present on any of these input terminals, junction 468 in the circuit diagram is maintained slightly positive by means of the voltage source $+V_1$ and the voltage divider comprised of resistors 470, 472 and 474. Since the base of the transistor 476 is positive with respect to its emitter electrode (maintained at ground potential), the emitter junction is biased in the reverse direction and therefore the impedance between its emitter and collector is relatively high. The collector junction is always reverse biased by means of the voltage source $-V_1$, thus current will flow across the collector junction only when the bias is reversed on the emitter junction. For the purpose of this explanation, leakage currents are ignored. The output line 478 is held at −3 volts ($V_2$) representing a logical "1" by the clamping diode 480 connected to the $-V_2$ supply.

If a logical "1" (−3 volt) signal is applied to one or more of the input terminals 462, 464 and 466, the base of the transistor 476 becomes negative with respect to its emitter. Hence a relatively large current can now flow between the emitter and collector, such that the output voltage raises to almost ground or 0 volts representing a logical "0." While only three input terminals are illustrated in the schematic diagram of FIG. 8, it should be understood that a greater or fewer number may be employed. Also, the output of this circuit may be fanned out so as drive the inputs of several other similar NOR circuits.

FIG. 9 indicates the manner in which two NOR circuits of the type described above may be interconnected to obtain a bistable multivibrator or flip-flop. The lower NOR circuit is labeled 00V63 and the upper is labeled 01V63. Normally, logical "0's" are held on the "clear" and "set" lines 482 and 484 respectively. In order to erase the information held in the flip-flop and to introduce new information therein, a "clear" signal is used. "Clear" means to place a "1" on the clear line and "set" means to place a "1" on the set line. After clearing the flip-flop, the output of the 00 side of the flip-flop is at "0" and the alternate output is a "1." The following step-by-step procedure explains how the inverters operate as a flip-flop. Assuming that the flip-flop is originally cleared so that the 00 side is outputting a logic "0" on its output line 486, this output is also applied as a "1" input to the 01 side of the flip-flop. If no signal is applied to the set line 484, the 01 inverter will output a logic "1" on its output line 488. This logic "1" output is fed back by means of conductor 490 and is applied as an input to the 00 inverter. Hence the clear signal may be removed and this input signal appearing on line 490 will hold the flip-flop in the cleared state. If now a logical "1" is applied to the set input terminal, this signal will be inverted by the 01 inverter such that a logic "0" will be applied via line 490 to the 00 inverter. The output of the 00 side of the flip-flop will therefore be a logical "1" which when applied as an input to the 01 inverter holds the flip-flop in the set condition. Thus, the signals which formerly appeared on lines 486 and 488 respectively are reversed. When the flip-flop is set, the one side thereof outputs a logical "0" while the zero side outputs a logical "1." Similarly, when the flip-flop is cleared the zero side outputs a logical "0" while the one side thereof outputs a logical "1." To simplify the drawings, a flip-flop will hereinafter be represented by the symbols shown in FIG. 10 rather than by that shown in FIG. 9. Since the representation is not only conventional but self-explanatory, no further discussion of it is deemed necessary.

INPUT-OUTPUT CONTROL INPUT MODE

Before describing the various circuits of the Input-Output section of the computer shown in FIGS. 4a-4e in detail, the control circuitry for producing the required command enable signals for these circuits will be described.

Figure 11A:
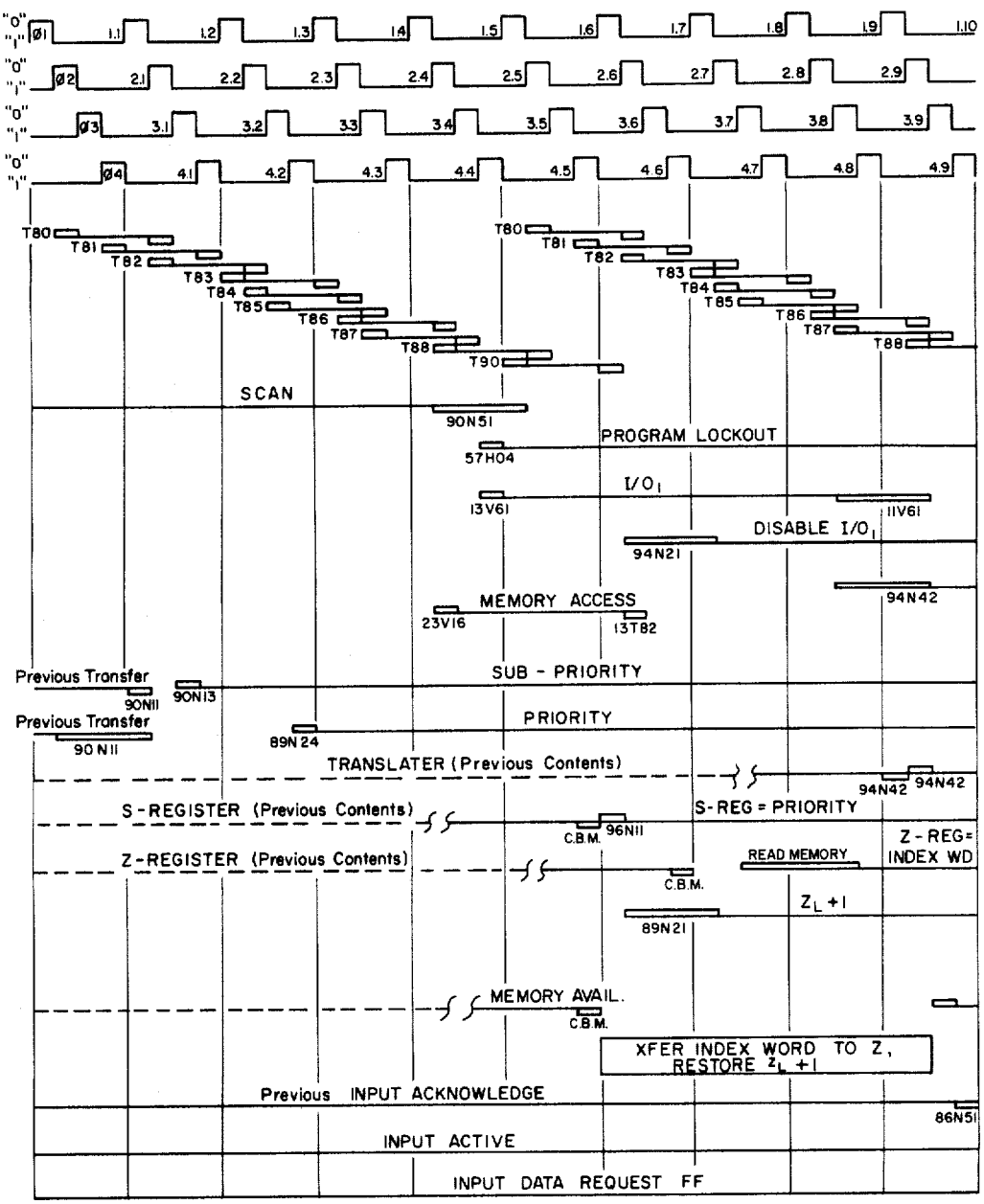
FIGS. 11a and 11b illustrate the timing diagrams for the input-output control circuits when operating in the normal input mode.
Figure 11B:
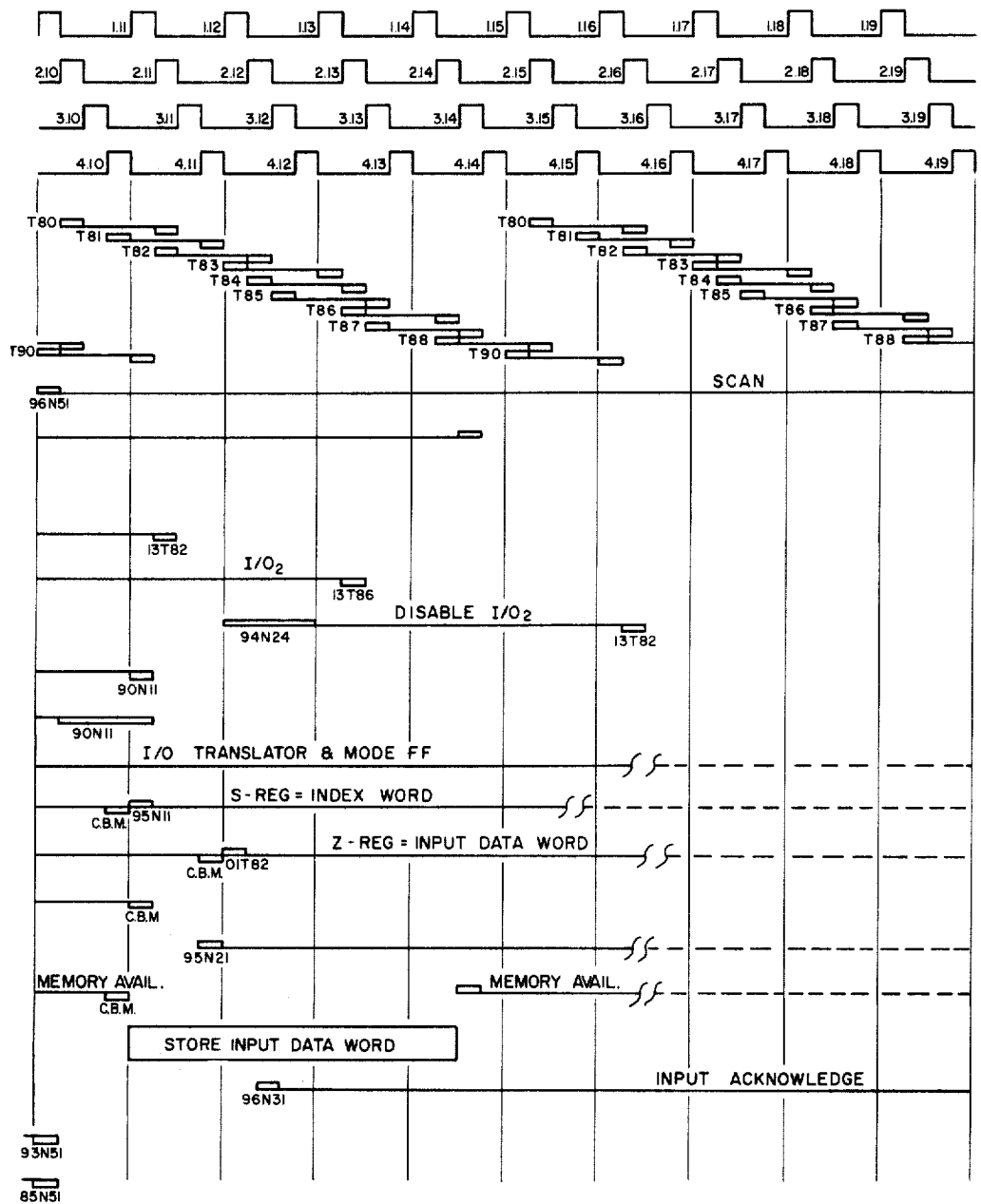

The computer which operates in accordance with the teachings of this specification is a synchronous machine having its operation rate controlled by a 4-phase clock. The clock circuit (not shown) is effective for producing a series of pulses at predetermined times to step the computer through its operations. Each cycle of the clock produces 4 pulses, as shown at the top of FIGS. 11a and 11b, each differing in phase from the other by a predetermined amount. The various pulses in a cycle will be identified by the symbol $\phi 1$, $\phi 2$, $\phi 3$, and $\phi 4$, while the clock cycle during which these various pulses occur will be identified by a second number separated from the phase number by a period (.). For example $\phi 3$ pulses in the third cycle will be identified by the symbol $\phi 3.2$, the first cycle being $\phi 3.0$.

Referring to FIGS. 12a through 12k which illustrate the circuitry for producing the required command enables for the Input-Output logic of the computer, and to the timing diagrams 11a and 11b for the circuitry of FIGS. 12a through 12k when the Input mode is operative, it can be seen that the input-output control consists of a timing chain comprised of a plurality of bistable flip-flop circuits, and a set of five flip-flop circuits which are termed the t-designator. The timing chain flip-flops labeled T80 through T88 and T90 are referred to herein as the e-designator. The five flip-flops marking up the

*t*-designator include a SCAN flip-flop V60, an I/O₁ flip-flop V61, an I/O₂ flip-flop V62, a DISABLE I/O₂ flip-flop V63, and a DISABLE I/O₁ flip-flop V64. Signals generated at different times in the timing chain, coupled with signals generated by any one or more of the flip-flops in the *t*-designator, provide the command enable signals which permit the input-output logic to control the transfer of information to and from the computer.

Referring to FIG. 12*g*, in order to initially start the timing chain, the Master Clear switch 498 is momentarily closed. As this is done the V91 flip-flop is cleared to develop a logical "0" signal on the conductor 500 which connects the "0" side of the flip-flop V91 to a first input terminal of an OR INVERTER 13V60. When the Run switch 501 is closed, at φ2.0 time, the inverter 13V60 is fully enabled, causing a logical "1" signal to be developed on its output line 502. This logical "1" signal is applied over conductor 502 to the junction 504 and subsequently, over the conductors 506 and 508. The logical "1" signal on conductor 506 passes through the OR gate 510 and is effective in setting the T80 flip-flop in the *e*-designator timing chain to its "1" state. The logical "1" signal on the conductor 508 passes through an OR gate 512 (FIG. 12*h*) to set the SCAN flip-flop V60 in the *t*-designator to its "1" state. (The SCAN flip-flop along with the other flip-flops in the *t*-designator are initially cleared by a "1" signal output from NOR circuit 11V16 (FIG. 12*h*) on the conductor 513. (The input to 11V16 is generated by the main computer control circuits.) With the SCAN flip-flop in its "1" state, a logical "0" appears on its output line 514 and also at the junction (FIG. 12*b*). From this junction the logical "0" is applied, originally, over a conductor 518 to a first input terminal of an OR INVERTER 90N11 (FIG. 12*a*). Since the T80 flip-flop is in its "1" state, a logical "1" signal appears at the output of the "0" side of this flip-flop and is applied by means of a conductor 520 to a first input terminal of an OR INVERTER 03T80. Inverter 03T80 operates on this logical "1" input signal to cause a logical "0" signal to appear on its output line 522 leading to inverter 90N11. As can be seen, both of the input lines of the inverter 90N11 have logical "0's" applied thereto; hence, a logical "1" signal appears on the output line 524 of this inverter, serving as the command enables CLEAR PRIORITY AND SUB-PRIORITY and LOAD WORKING REGISTER.

At time φ4.0, the logical "0" signal appearing at the "1" side of the T80 flip-flop passes through the inverter 13T81 and appears as a logical "1" at its output terminal 525. This logical "1" signal is conveyed by way of conductor 526 to set the V91 flip-flop and by way of conductor 527 to set the T81 flip-flop. The logical "0" signal appearing at the junction 516 (FIG. 12*b*) is also applied by means of the conductor 518 to a first input terminal of the OR INVERTER circuit 90N13 (FIG. 12*a*). Likewise, the logical "0" signal, resulting from the T81 flip-flop being in its set condition, is applied by way of a conductor 528 to a junction 530 and from there to a second terminal of the inverter circuit 90N13. Since now all of the inputs to this inverter are now logical "0's," a logical "1" signal appears on its output line 532 and serves as the command enable SEND REQUEST TO SUB-PRIORITY.

At time φ2.1, the logical "0" signal at the output terminal of "1" side of the T81 flip-flop passes through the inverter 13T82, producing a logical "1" signal on the conductor 534. The signal passes first along conductors 536 and 538, clearing the T80 flip-flop to its "0" state. The signal appearing on conductor 534 also passes by way of conductor 540 to set the next flip-flop T82 in the timing chain to its "1" state.

At time φ1.2, the logical "0" signal appearing on the output line connected to the "1" side of the T82 flip-flop passes through the NOR circuit 13T83 and along a conductor 542 to the set terminal of the T83 flip-flop of the *e*-designator timing chain. This signal sets the T83 flip-flop to its "1" state. The junction 544 is connected to the "1" side of the T83 flip-flop. The logical "0" signal appearing here is applied over a conductor 546 to a first input terminal of NOR circuit 90N24 (FIG. 12*c*). Since the other input terminal of this circuit is connected by the conductor 518 to the junction 516 on the conductor 514 connected to the "1" side of the SCAN flip-flop V60, it also has a logical "0" signal on it. This is true since the V60 flip-flop has been previously set to its "1" state. NOR circuit 90N24 is then fully enabled and causes a logical "1" signal to appear at junction 548 in its output line. This logical "1" signal is inverted by means of the NOR circuit 91N24 causing a logical "0" to appear at the junction 550 and this signal is applied by means of a bus 552 as a first input to a series of NOR circuits 89N24, 92N24, 93N24, 96N24 and 97N24. The other input to these NOR circuits comes from the Sub-Priority Network (FIGS. 20*a* and 20*b*); hence, only one of these NOR circuits will have a logical "0" applied to its second input terminal. As may be expected, the particular one of these inverters to become fully enabled by having a logical "0" applied to its second input terminal is dependent on the type of request which has been honored by the Sub-Priority Network. For example, if an External Interrupt Request has been honored, the NOR circuit 92N24 will be the one which is fully enabled, whereas if an Input Request is honored by Sub-Priority, the NOR circuit 89N24 will be fully enabled. In either case a logical "1" appears on one of the even numbered output lines 552 through 562. This signal is the command enable GATE REQUESTS TO PRIORITY.

At time φ2.2, the logical "0" signal now appearing at the output terminal of the "0" side of the T81 flip-flop passes through the NOR circuit 12T82 and the resulting logical "1" signal on the conductor 564 clears or resets the T82 flip-flop to its "0" state. Simultaneously, the logical "0" signal appearing at the junction 544 passes through NOR circuit 13T84, causing a logical "1" signal to appear on conductor 566. This signal sets the T84 flip-flop (FIG. 12*j*) in the timing chain to its "1" state. Even though the resulting logical "0" output signal from the T84 flip-flop, appearing on the conductor 568, is applied to a first input terminal of NOR circuit 90N31 (FIG. 12*d*), this inverter is ineffective to pass this signal because one of its other input terminals is connected by means of a conductor 570 and a conductor 572 to the "1" side of the I/O₂ flip-flop V62 (FIG. 12*i*), which at this time, is in its "0" state. However, at the following clock phase (φ3.2) the inverter 13T85 (FIG. 12*j*) becomes fully enabled. The logical "0" signal appearing at the "1" side of the T84 flip-flop passes through it, is inverted, and applied to the set terminal of the T85 flip-flop by means of a conductor 574. The timing diagram of FIGS. 11*a* and 11*b* shows that at time φ1.3 the T83 flip-flop will be reset to its "0" state. The reason for this is that, at this time, the T82 flip-flop is in its "0" state; hence the inverter 12T83 becomes fully enabled, causing the logical "1" signal to appear on a conductor 576 which leads to the clear terminal of the T83 flip-flop.

At time φ2.3, the logical "0" output from the "1" side of the T85 flip-flop is propagated through the NOR circuit 13T86 (FIG. 12*j*) and the resulting logical "1" signal on the output conductor 578 sets the *e*-designator flip-flop T86 to its "1" state. Also, the logical "1" signal appearing on conductor 578, at time φ2.3, passes by way of conductor 580 to reset the T84 flip-flop to its "0" state. At time φ3.3, the logical "0" from the "1" side of the T86 flip-flop is permitted to pass through the OR INVERTER circuit 13T87 and not only along conductor 582—which causes the T85 flip-flop to be reset to its "0" state—but also along conductor 584 to the set input terminal of the T87 flip-flop (FIG. 12*k*). The output from the "1" side of the T87 flip-flop appears on conductor 586 and passes therethrough to one input terminal of NOR circuit 23V16 (FIG. 12*i*). A second input to this NOR circuit is applied by means of a conductor 587 from the output of INVERTER 03V60 (FIG. 12*h*) connected to the "0" side of the SCAN flip-flop V60. Since V60 is in its "1" state, the output from 03V60 is a logical "0." NOR circuit 23V16 also has input connections coming from the three Interrupt flip-flops in the Sub-Priority Network, the arrangement being such that if an Interrupt Request has been honored, NOR circuit 23V16 will be disabled.

A third input to NOR circuit 23V16 is from NOR circuit 22V16, which produces a "0" output when one or more of its inputs is a "1" signal. The inputs to 22V16 are from the Priority Network so that when a request of one type or another has been sent to the Priority Network, NOR circuit 22V16 will output a logical "0." At time $\phi2.4$, NOR circuit 23V16 becomes fully enabled (if a request other than anyone of the three Interrupt requests is in priority) and outputs a logical "1" signal on conductor 589 to set the Memory Access flip-flop V16 to its "1" state.

At time $\phi2.4$, the logical "0" appearing at the "1" side of the T87 flip-flop is also passed through and inverted by NOR circuit 13T88. The resulting logical "1" signal appearing at the output thereof is conveyed over a conductor 588 to a junction point 590. At this junction the circuit divides into two portions: first, this "1" signal passes over conductor 592 to the clear terminal of the T86 flip-flop which causes it to be reset to its "0" state, and in the second portion the logical "1" output signal from the 13T88 inverter also passes by way of conductor 594 to set the T88 flip-flop to its "1" state. The logical "0" output from the "1" side of the T88 flip-flop is applied via the conductors 596 and 660 as a first input to NOR circuit 90N51. The "1" side of the memory access flip-flop V16 is connected by means of conductor 598 to the second input terminal of the inverter 90N51. Thus this inverter is now fully enabled, and causes a logical "1" signal to appear on the output conductor 600 which is connected through an OR circuit 602 (FIG. 12*h*) to the clear input terminal of the SCAN flip-flop V60. This signal resets the SCAN flip-flop and completes the SCAN mode of the input-output control sequences.

Whenever the computer is operating and no requests are detected by the Priority Network, the SCAN flip-flop V60 in the *t*-designator remains in its set condition and the *e*-designator timing chain recycles itself until a request is detected. This is due to the fact that the Memory Access flip-flop remains cleared when no requests are present. Unless the Memory Access flip-flop is set, NOR circuit 90N51 connected to the "1" side of the T88 flip-flop does not become fully enabled and, hence, no signal is produced on its output conductor 600 to clear the SCAN flip-flop. The timing chain continues to run and at $\phi1.5$ the T90 flip-flop is set by way of the logical "1" output signal from NOR circuit 13T90 (FIG. 12*k*). The resulting logical "0" signal appearing on the output conductor 604 of the T90 flip-flop passes by way of a conductor 606 and is applied as a first input to NOR circuit 12T80 (FIG. 12*g*).

A second input to this NOR circuit comes from the output of the inverter 03V60 by way of a conductor 587. Because the SCAN flip-flop, to which this last mentioned NOR circuit is connected, remains set when no requests are present, the signal appearing on the conductor 587 is a logical "0." On the next succeeding clock phase ($\phi2.5$) NOR circuit 12T80 becomes fully enabled and outputs a "1" signal on the conductor 608 which passes through OR circuit 510 to again set the T80 flip-flop and initiate a second SCAN cycle.

In summary, during the SCAN mode several things are accomplished. First, command enables are developed to clear the Sub-Priority and Priority network and to load the Working Register. Next, the requests appearing at the Input Request gates are transferred to the Sub-Priority network where they are examined on a fixed priority basis. Next, an enable signal is generated to gate these request signals to the Priority Network where a number of channels presenting identical types of requests are honored on a priority basis. Finally, the Memory Access flip-flop is set, provided that a request is present, which, in turn, allows the SCAN flip-flop to be cleared to its "0" state which, as will be described below, permits the second sequence ($I/O_1$) of the input-output section to be initiated.

In order to initiate the $I/O_1$ sequence it is necessary to set the $I/O_1$ flip-flop V61 (FIG. 12*h*) to its "1" state. To do this it is necessary that the NOR circuit 13V61 provide a logical "1" output signal on the conductor 610 which is connected to the set terminal of this flip-flop. For NOR circuit 13V61 to output a logical "1" signal, it is necessary that all of the inputs have logical "0"'s impressed thereon. A first input to this NOR circuit is from the "1" side of the Memory Access flip-flop V16 by way of a conductor 612. At this time the Memory Access flip-flop is set, thereby outputting a logical "0."

A second input to the NOR circuit 13V61 is from the memory timing chain (not shown). This signal indicates that the memory section of the computer is available for use by the Input-Output section. If the memory is available, this input will be a logical "0" such that NOR circuit 13V61 becomes fully enabled and permits the setting of the $I/O_1$ flip-flop V61.

At this point of an input data transfer, the memory may not be available. If this is true, the $I/O_1$ flip-flop will not be set and the next I/O cycle will not be initiated. However, when this happens the Memory Access flip-flop V16 will remain in its set state until the next I/O cycle. The setting of the $I/O_1$ flip-flop will take place at any time following if the Input-Output section is not being locked out because of an input-output instruction and memory is available. At some time following, the $I/O_1$ flip-flop will be set by the correct conditions.

With the $I/O_1$ flip-flop V61 in its set condition, a logical "1" appears on the output line 614 associated with the "0" side of this flip-flop. This signal serves as a command enable PROGAM LOCKOUT. This enable goes to the A, B, and D sequence timing chains and will remain as long as the $I/O_1$ flip-flop is set. This lockout signal prevents the computer from processing any further instructions until the data transfer being performed by the input-output section has been completed.

At time $\phi1.5$, the inverter 13T90 becomes fully enabled and passes the logical "0" output signal from the "1" side of the T88 flip-flop so that a logical "1" signal appears on a conductor 616 which sets the T90 flip-flop (FIG. 12*f*) in the *e*-designator timing chain to its "1" state. On the next phase time, the logical "0" signal appearing at the output of the "0" side of the T87 flip-flop passes through inverter 12T88, producing a "1" signal on conductor 618 and resetting the T88 flip-flop to its "0" state.

At this same time, if the memory is ready and waiting, the inverter 13T80 (FIG. 12*g*) outputs a logical "1" signal on conductor 620 which passes through the OR circuit 510 and again sets the T80 flip-flop to its "1" state. With flip-flop T80 again in its "1" state, a "1" signal appears on the output conductor 520. This signal is inverted by NOR circuit 03T80 so that a "0" signal is applied as a first input to the NOR circuit 19V61. The "0" side of the $I/O_1$ flip-flop V61 is connected by means of a conductor 622 to a first input terminal of a NOR circuit 05V60. Since the $I/O_1$ flip-flop is set at this time the signal applied to NOR circuit 05V60 is a logical "1." The signal appearing on output conductor 624 connected to the second input to NOR circuit 19V61 is therefore a "0." Since NOR circuit 19V61 has all its input terminals at a "0" level, it is fully enabled and emits a command enable INITIATE MEMORY on its output conductor 626. This command enable starts the memory timing chain running concurrently with the input-output timing chain for a predetermined time and causes the index word to be read out from its register in the memory, incremented by one and restored back into the memory at the address specified.

During the first part of the I/O$_1$ sequence, the S-register will be cleared by the memory. At the same time that the S-register is cleared, i.e., at time $\phi$4.5, the inverter 13T81 is enabled and passes a logical "1" signal to its output conductor 527 which sets the T81 flip-flop to its "1" state.

The next command enable to be generated is TRANSFER CHANNEL ADDRESS TO S. This signal appears on the conductor 628 (FIG. 12a). To generate this command enable signal, the condition necessary to fully enable the inverter 96N11 must be present. A first input to this NOR circuit comes from the "1" side of the I/O$_1$ flip-flop V61 by way of conductor 630. Since this flip-flop is in its "1" state, a "0" signal is applied to NOR circuit 96N11 via this path. A second input to this same NOR circuit is applied by way of conductor 632 connected to the "1" side of the T80 flip-flop. By referring to the timing diagram of FIGS. 11a and 11b, it is evident that, at this time, the T80 flip-flop is in its set condition with a logical "0" signal on the conductor 632. Since all the conditions are met, NOR circuit 96N11 outputs a "1" signal which is inverted by NOR circuit 98N11 to produce the above mentioned command enable TRANSFER CHANNEL ADDRESS TO S.

It will be observed that the other command enables previously described were "1" signals whereas, in this case, the signal appearing on the line 628 is a logical "0." However, at time $\phi$1.6, NOR circuits associated with the S-register (not shown) become fully enabled to gate this command enable to the S-register itself. Hence, it is a logical "1" signal which actually produces the desired result. The channel address itself comes from the priority network. When placed in the S-register it is used to address the index word for the particular input channel being use.

The e-designator timing chain continues to run, in the same manner as described in connection with the SCAN sequence, the various flip-flops therein being set and cleared in a definite order. At time $\phi$2.6, the T80 flip-flop is cleared and the T82 flip-flop is set. Also, at this time, the Memory Access flip-flop V16 is reset to its "0" state. This is accomplished by means of the "1" output from the 13T82 inverter which is connected to the "1" side of the T81 flip-flop. The "1" output from the 13T82 inverter passes from junction 534 by way of conductor 536 to a junction point 634. From this point the signal follows a conductor 636 and passes through an OR circuit 638 connected to the clear terminal of the Memory Access flip-flop.

Also occurring at time $\phi$2.6 is the setting of the DISABLE I/O$_1$ flip-flop located in the t-designator section of the input-output control circuits. The DISABLE I/O$_1$ flip-flop V64 is set by a logical "1" signal appearing at the output of the 94N21 inverter and is applied to the V64 flip-flop by way of a conductor 640. For a "1" signal to appear on this conductor it is necessary that all of the inputs to the 94N21 circuit be "0" signals. One input to this inverter is by way of conductor 642 from the output of the "1" side of the T82 flip-flop and the signal on this line is a "0" since the T82 flip-flop is in its set condition. The other input to 94N21 is by way of a conductor 644 and the bus 630, the latter being connected to the "0" output side of the I/O$_1$ flip-flop V61. Since the I/O$_1$ flip-flop V61 is in its set condition, a "0" signal is applied to inverter 94N21.

The logical "1" signal appearing at the output of NOR circuit 94N21 at this time also serves as the command enable, INCREMENT Z$_L$. The effect of this comand enable is to set the INCREMENT Z$_L$ control flip-flop G10 in the Z$_L$ counter (FIG. 30). Now that the Incrementing flip-flop is set, the memory will read out the contents of the address which is in the S-register. The contents will be read into the Z-register (held until the next memory reference) and will then go through the incrementing circuitry, to be incremented by one and restored to the address specified by the contents of the S-register.

At time $\phi$4.6, two things occur. First, the T81 flip-flop is cleared by means of the "1" output from the 12T81 inverter and, secondly, the memory timing chain produces an output signal which is effective to clear the previous contents of the Z-register.

During the time that the DISABLE I/O$_1$ flip-flop in the t-designator is set, the timing chain continues to run. At $\phi$3.8, the T87 flip-flop is set to produce a logical "0" signal on its output line 646 which is connected as a first input to the NOR circuit 94N42. The final input to NOR circuit 94N42 comes from the "1" side of the DISABLE I/O$_1$ flip-flop V64 by way of conductor 648. Since the DISABLE I/O$_1$ flip-flop is in its set state, NOR circuit 94N42 is fully enabled and produces an output signal on the conductor 652 which clears the Translator of its previous contents and produces the command enable TRANSFER CHANNEL ADDRESS TO TRANSLATOR.

The output from NOR circuit 94N42 is also conveyed by way of a conductor 654 and through an OR circuit 656 to the "1" side of the I/O$_2$ (V62) flip-flop in the t-designator. This signal sets the I/O$_2$ flip-flop to its "1" state. At time $\phi$1.10, the T88 flip-flop is in its "1" state and, therefore, presents a "0" signal along the line 596 to a junction 658 and from there along line 660 which is connected to one input of a NOR circuit 94N51. The other input to NOR circuit 94N51 arrives by way of conductors 648 and 650 from the "0" side of the DISABLE I/O$_1$ flip-flop V64. Because this flip-flop is currently set, NOR circuit 94N51 passes a "1" signal on its output conductor 662 and along a conductor 664 to the input of inverter 95N51. The "1" input to this inverter is changed to a "0" signal and is applied by way of the conductor 583 to a first input terminal of NOR circuit 96N51. The second input to this last mentioned inverter is from the 4-phase clock, occurring at time $\phi$1.10. NOR circuit 96N51 is therefore fully enabled. The resulting "1" signal appearing on its output conductor 666 passes to the OR circuit 512 (FIG. 12b) connected to the set terminal of the SCAN flip-flop V60. This signal again sets the SCAN flip-flop to its "1" state.

At the same time that the SCAN flip-flop is being set a command enable RESET INPUT REQUEST is produced on the output line 668 of NOR circuit 85N51 (FIG. 12c). This signal is produced by way of the output from 94N51, being inverted by NOR circuit 87N51 and applied as a first signal to the NOR circuit 85N51. The second input to this last mentioned NOR circuit comes from the flip-flops located in the Translator circuit; hence, this command enable is generated only when an Input Request is being processed and the Input Request One-Shot for only the particular channel specified by the address in Priority will be reset. The enabling signal from the Translator circuit comes into inverter 85N51 by way of conductor 670.

If at the time during which the T88 flip-flop is in its "1" state the contents of the upper half of the Z-register is equal to the contents of the lower half of the Z-register a command enable CLEAR INPUT ACTIVE FLIP-FLOP will be generated on the line 672. This enable results when all inputs to the NOR circuit 93N51 are logical "0"'s One input to this inverter is from the output of the Z-register Comparator and enters the control circuits via a conductor 674, thus for a signal to be gated at this time, it is necessary that the comparison result in an equality. In other words, the Input Active flip-flop on a particular channel will be cleared only when the lower half of the index word becomes equal to the upper half of the index word.

At the end of the second pass through the timing chain the SCAN flip-flop in the *t*-designator is set. The setting of this flip-flop initiates the third pass through the I/O timing chain. It is during this third pass that the second memory cycle takes place, storing the data bits coming from the peripheral equipment at a specified location in the memory. The memory is initiated for the second time by a command enable appearing on the output conductor 626 of 19V61 (FIG. 12g). The same conditions, previously required for initiating the memory during the I/O₁ mode, are again required. Since this has already been completely described, it is unnecessary to trace the source of this command enable again.

At time $\phi$4.10, the T81 flip-flop of the *e*-designator is set to its "1" state. Simultaneously, the contents of the S-register are cleared by the memory timing chain to remove the channel address specified by the Priority Network. At the same time that the S-register is cleared, the command enables CLEAR PRIORITY AND SUB-PRIORITY and LOAD WORKING REGISTER are again generated on the line 524, thus preparing the input-output section for the processing of another request. The requirements for the production of this command enable have previously been described.

Since at this time the T80 and the I/O₂ flip-flops are both set, both inputs to NOR circuit 95N11 (FIG. 12a) are "0" signals, so the command enable TRANSFER $Z_L$ to S will appear on the output conductor 676. A first "0" input to NOR circuit 95N11 comes from the "1" side of the I/O₂ flip-flop V62 by way of the conductor 572 and a bus 678. Since the Z-register now holds the index word or location where the data is to be stored, the S-register may be cleared. This occurs in the first part of the memory cycle, but the S-register will be reset so as to hold the contents of the lower part of the Z-register on the next clock phase. As indicated on the timing diagrams, at time $\phi$4.11, which is 3 phase times subsequent to the clearing of the S-register by the memory timing chain, the Z-register is also cleared by a signal from this same source. At the same time that the Z-register is cleared, the NOR circuit 95N21 (FIG. 12b) is fully enabled because of the "0" inputs from the T82 flip-flop via conductors 642 and 750, the I/O₂ flip-flop and the Translator mode flip-flop 01V34 via conductors 572 and 678, respectively. NOR circuit 95N21 therefore emits a "1" output signal on conductor 680 which is ANDED together with a signal from the D-sequency timing chain in the 96N21 inverter. This produces a logical "0" signal on a conductor 682. The signal is the command enable DISABLE MEMORY TO Z. This enable goes to a pair of flip-flops in the memory timing chain (not shown), and when these flip-flops are set, anything read out of memory to the Z-register during this particular memory reference is destroyed so that the data read from memory into the Z-register will not later interfere with the data which will be transferred to the Z-register from the peripheral equipment.

To summarize, the S-register contains the lower half of the index word and the Z-register is in a cleared condition. Next, the data signals from the peripheral equipment are gated into the Z-register by an enable signal from the *e*-designator timing chain. The memory cycle which has already been initiated will then store the data which is put into the Z-register.

At the same time that the DISABLE MEMORY TO Z command is generated, the output from NOR circuit 96N21 is applied to the inverters 93N21, 97N21 and 98N21. The resulting logical "0" signals appearing on the output conductors 684, 686 and 688 serve as the command enables TRANSFER DATA TO Z. Under control of the I/O Translator the data signals on the selected channel are thereby gated into the several stages of the Z-register.

Once the data has been transferred to the Memory Communications Register, it is stored under control of the memory timing chain into the address register specified by the lower half of the buffer control word contained in the S-register.

While the memory timing chain is controlling the transfer of information into the memory, the *e*-designator timing chain in the input-output control is running and at time $\phi$1.12 the T83 flip-flop is set. Since at this time the I/O₂ flip-flop V62 located in the *t*-designator is also set, the NOR circuit 94N24 is fully enabled such that a "1" signal appears on a conductor 690 connected to the output thereof and this signal is effective to set the DISABLE I/O₂ flip-flop V63.

The next function performed by the I/O timing and control circuits is to generate the command enable SEND INPUT KNOWLEDGE. It may be recalled that this enable is the means employed during an input buffer transfer when one of the 12 normal channels to advise the peripheral unit in question that the data transfer has been completed. The manner in which this comman enable is generated is as follows. At the time during the sequence that both the I/O₂ flip-flop V62 and the T84 flip-flop are set, NOR circuit 90N31 (FIG. 12a) is fully enabled and outputs a logical "1" signal which is inverted by circuit 91N31 so that a "0" signal appears on the conductor 692. This signal is effective to partially enable the OR INVERTER 96N31. To fully enable this last mentioned circuit, a signal must be received from the Translator indicating that an input data transfer has been in progress. This signal comes to NOR circuit 96N31 by way of conductor 670. When thus enabled, 96N31 produces the above mentioned command enable on its output conductor 694.

Finally, at time $\phi$2.16 during the DISABLE I/O₂ sequence, the NOR circuit 13T82 connected to the "1" side of the T81 flip-flop becomes fully enabled and produces a "1" signal on the conductor 534. This signal follows conductor 536 to a junction point 634 connected to a conductor 636. The "1" signal proceeds along conductor 636 to the clear terminal of the DISABLE I/O₂ flip-flop V63.

OUTPUT DATA TRANSFER ON 12 NORMAL CHANNELS

Now that the operation of the input-output control circuits has been described in detail for the input data transfer mode, it is felt to be unnecessary to go into such great detail when describing the output data transfer. However, the description will be made specific at the points where the command enables unique to the output data transfer are described.

As in the input mode, when the timing chain is initiated by depressing the Master Clear switch 498 and the Run switch 501 it continues to run, the various flip-flops in the *e*-designator being set and cleared by pulses from a 4-phase clock generator in a definite sequence. During the SCAN sequence, i.e., when the SCAN flip-flop V60 is set, the same command enables are generated in the output mode as were generated in the input mode. More specifically, during the SCAN sequence first the 90N11 inverter is fully enabled so as to produce the command enable on conductor 524 which clears the Priority and Sub-Priority circuits and loads the Working Register to thereby prepare them for the processing of subsequent requests. Next, a command enable is generated on line 532 which is effective to permit the passage of requests to the Sub-Priority circuits. The next command enable to be generated occurs at time $\phi$4.2 when the NOR circuit 97N24 (FIG. 12c) becomes fully enabled by output signals from NOR circuit 91N24 and from the inverter 20V52 located in the Sub-Priority network. The resulting output on line 562 is effective to gate output request signals on one or more channels to the Priority Network. During the time that the T88 flip-flop is set during the SCAN sequence, the NOR circuit 90N51 becomes fully enabled in the manner previously described and produces an output signal on the conductor 600 which is effective to clear the SCAN flip-flop V60. At approximately the same time NOR circuit 13V61 (FIG. 12h) becomes fully enabled, to thereby set the I/O$_1$ flip-flop V61. This completes the SCAN cycle. As before, if no requests are detected during the SCAN cycle, the Input-Output section remains in its SCAN mode until such a request is presented and detected.

As in the input mode, during the I/O$_1$ cycle a "1" signal appears on conductor 614 connected to the "0" side of the I/O$_1$ flip-flop which is the command enable PROGRAM LOCKOUT. This signal is utilized by the A, B and D-sequence timing chains and is effective to prevent the computer from processing further instructions until the data transfer being performed has been completed. During the I/O$_1$ mode, the memory timing chain is initiated when the command enable is produced on the output conductor 626 coming from NOR circuit 19V61. This command causes the memory timing chain to run concurrently with the e-designator timing chain such that the index word is read out from its register in memory to the Z-register and such that the index word is incremented by one and restored back into memory at the address specified. Next, the command enable TRANSFER CHANNEL ADDRESS TO S is produced on the conductor 628. This command enable is effective to cause a transfer of the channel address from the Priority Network to the S-register so that the memory timing chain can then effect a read out of the index word located at the specified channel address.

As the e-designator timing chain continued to run, the DISABLE I/O$_1$ flip-flop in the t-designator will be set. During the time that this flip-flop is set a signal is first produced on conductor 652 to clear the Translator flip-flops of their previous contents. Shortly thereafter, the command enable TRANSFER CHANNEL ADDRESS TO TRANSLATOR is produced on this same line. This causes certain preselected flip-flops in the Translator to be set in accordance with the channel number as determined by the Priority Network and also causes the Mode flip-flops in the Translator to be set so as to identify the particular type of communication (either input or output) to be specified. The same signal which serves as the command enable transfer the channel address to the Translator also passes by way of the conductor 654 (FIG. 12j) to set the I/O$_2$ (V62) flip-flop in the t-designator to its "1" state.

Whereas in the input mode the next command enable to be generated was the signal on line 672 (FIG. 12c) RESET INPUT REQUEST ONE-SHOTS, in the output mode the corresponding command enable that is generated is CLEAR OUTPUT ACTIVE FLIP-FLOPS. This command enable is produced on a conductor 698 which is connected to the output of NOR circuit 89N51. The conditions necessary before this command enable will be generated are, that the T88 flip-flop and the DISABLE I/O$_1$ flip-flops be set so that inverter 94N51 is enabled, that the Input-Output section be operating in the normal output mode, and finally that the Z-register Comparator be producing a "0" output signal, indicating that the contents of the upper half of the Z-register is equal to that of the lower half. As long as the Comparator fails to indicate equality, this last mentioned command enable will not be generated and the particular channel in question will remain in its active condition.

In the I/O$_2$ mode at the time during which the T80 flip-flop is set, the contents of the lower half of the Z-register, i.e., the index ford, is transmitted to the storage address register (S-register) by means of the command enable generated on the output line 676 coming from NOR circuit 95N11 (FIG. 12a). Now, when the memory is again initiated by a command enable appearing on the conductor 626 (FIG. 12g), the data word located in the memory at the address specified by the present contents of the S-register will be read into the Z-register.

In order to prepare the Output Register C$_0$ for the transmission of the data signals thereto, this register is first cleared by means of a command enable CLEAR C$_0$ appearing on the output conductor 700 coming from the 87N24 inverter (FIG. 12b). To produce this command enable, the inverter 94N24 must be fully enabled. For this condition to be met, it is necessary that T83 flip-flop be in its "1" state and also that the I/O$_2$ flip-flop V62 be in its "1" state. When the I/O$_2$ flip-flop is in its "1" state, the logical "0" appears on its output conductor 572 which is connected to one input of the 94N24 inverter by means of conductor 678. The resulting "1" signal on the output line coming from NOR circuit 94N24 is applied to the input terminal of an inverter 95N24 to thus cause a "0" signal to appear on the conductor 702 which serves as a first input to NOR circuit 87N24. The remaining condition required for the production of the CLEAR C$_0$ command enable is that the inverter 03V36 (FIG. 19c) located in the Translator be producing a "0" signal. This last mentioned inverter produces such a signal whenever the output mode of communication is being specified by the Mode flip-flops contained in the Translator. This signal from the Translator is applied to inverter 87N14 by means of the conductor 704.

Following the clearing of the C$_0$ register, the data contained in the Z-register must be transferred thereto. In order to effect this data transfer, the gates associated with the C$_0$ register must be enabled. The command enable TRANSFER Z to C$_0$ performs this function. In order to generate this command it is a requirement that the I/O$_2$ flip-flop and the T84 flip-flop be set and that the inverter 03V36 associated with the mode specifying flip-flop in the Translator be outputting a logical "0," thereby indicating that an Output Request is being processed on one of the 12 normal channels. Under these conditions, the NOR circuits 92N31 and 93N31 (FIG. 12d) are fully enabled so that "1" signals appear on their respective output lines 706 and 708.

At the time that the 94N24 inverter is enabled so as to ultimately cause the generation of the CLEAR C$_0$ command, the "1" output signal therefrom passes along a conductor 690 to set the DISABLE I/O$_2$ flip-flop V63.

During the time that the DISABLE I/O$_2$ flip-flop is set the e-designator timing chain continues to run. At the time when the T90 flip-flop is set by means of a "1" signal appearing on the conductor 616 it outputs a "0" signal on a conductor 604 connected to the "1" side thereof and this signal is applied as a first input to the NOR circuit 90N54. The other input to this last mentioned NOR circuit comes by way of conductor 710 from the "1" side of the DISABLE I/O$_2$ flip-flop V63 and since at this time this flip-flop is set, NOR circuit 90N54 is enabled and outputs a "1" to the input terminal of inverter 91N54. The resulting "0" output signal on the line 712 passes through NOR circuit 94N54 and is inverted thereby to cause a "1" output signal on a line 714 provided the inverter 03V36 (FIG. 19c) associated with the mode specifying flip-flops of the Translator is outputting a logical "0." When an Output Request is being processed, inverter 03V36 outputs a "0" signal on the conductor 716 (FIG. 12d). This signal appears at junction 718 and from there follows conductor 720 to the junction 722. It ultimately reaches the second input terminal of inverter 94N54 by way of conductor 724. Hence, a "1" appears on line 714 and serves as the command enable SEND OUTPUT ACKNOWLEDGE.

The same signals which enabled 94N54 also enable 93N54 to produce the command enable RESET OUTPUT REQUEST ONE-SHOTS on conductor 726.

This completes the description of the operation of the input-output control circuits for a normal output buffer transfer on one of the 12 normal channels.

OUTPUT MODE ON SPECIAL CHANNEL

The operation of the control and timing circuits for intercomputer data transfer is somewhat different from the operation when a data transfer is made from the computer to an ordinary peripheral device. Therefore, the manner in which the required command enable signals are developed will be described in detail.

As in the normal operating mode when the Master Clear switch 498 is momentarily closed, the V91 flip-flop (FIG. 12g) is cleared so that a "0" signal appears on its output conductor 500. At time $\phi2.0$ following the closing of the High Speed Run switch 501, the NOR circuit 13V60 becomes fully enabled and outputs a "1" signal on the conductor 502. This signal passes through the OR gate 510 to set the T80 flip-flop to its "1" state. The logical "1" signal appearing at the junction 504 on conductor 502 passes along conductor 508 and through the OR circuit 512 to set the SCAN flip-flop V60 to its "1" state. Since the T80 flip-flop is set a "1" signal appears on the conductor 520 connected to the "0" side thereof and this signal passes through and is inverted by NOR circuit 03T80 causing a logical "0" signal to be applied to a first terminal of NOR circuit 90N11. Because the SCAN flip-flop is now set, the "0" signal appearing at the output from its "1" side passes by way of conductor 514 and 518 to fully enable NOR circuit 90N11. A "1" signal therefore appears on the conductor 524 and serves as the command enable CLEAR PRIORITY and SUB-PRIORITY and FILL WORKING REGISTER.

As was described previously, the Working Register serves as a scanning device for channels 0 and 1 so that when requests are present on both of these channels, they are honored in sequence. As will be shown more fully hereinbelow when the details of the Working Register are described, the register itself is loaded in accordance with the state of the Active flip-flops for channels 0 and 1. In other words, in order for a Working Register flip-flop to be set, the Active flip-flop on its associated channel must be set. The ultimate output from the Working Register is sent to the Sub-Priority Network and is one of the enables required for setting the Out-on-2 flip-flop in Sub-Priority. Therefore, before an Output Request on channels 0 or 1 can be processed, it is necessary that at least one stage of the Working Register be set to its "1" state. Subsequently, a command is generated which will clear the Working Register flip-flop associated with the particular channel which is selected by the Priority Network for communication. On the next succeeding data transfer over the special channels, the request will be processed over the previously unused channel provided its Active flip-flop is set.

Continuing now with the description of the operation of the control and timing circuits, at the following phase 4 clock period, the NOR circuit 13T81 becomes fully enabled, outputting a "1" signal on the conductor 526 to set the V91 flip-flop and along the conductor 527 to set the T81 flip-flop to their respective "1" states. As was mentioned previously, the setting of the T81 flip-flop causes the inverter 90N13 to become fully enabled so that the command enable SEND REQUESTS TO SUB-PRIORITY appears on the conductor 532. Because the Out-on-2 Request has lowest priority and for the purpose of explanation it is assumed that this is the type of request being honored, the command enable signal on conductor 532 at this time has no effect. This signal is employed only for requests of types other than an Out-on-2 Request.

The command enable which ultimately effects a setting of the Out-on-2 flip-flop in the Sub-Priority Network occurs at time $\phi2.1$ when the NOR circuit 90N21 becomes fully enabled. As can be seen, this inverter has three inputs, all of which must be at the logical "0" level before the command enable Out-on-2 REQUESTS to SUB-PRIORITY will be generated on line 728. A first input arrives by way of conductor 730 from the output of NOR circuit 14V70 (FIG. 12a). In order for this last mentioned inverter to produce a "0" signal on its output line at least one of its inputs must be a "1" signal.

At this point it should be recalled that when data is to be transmitted from one computer to another, the sending computer places the data signals in the $C_1$ register and sets the Ready flip-flop. The receiving computer senses this Ready signal, accepts and stores the data signals when free to do so, and then sends the RESUME signal back to the sending computer. It becomes readily apparent then that the sending computer cannot process another Output Request on channels 0001 unless the Ready flip-flops are cleared or unless the Resume flip-flop is set, indicating that the previous data transfer has been completed. If the Ready flip-flop for one of the special channels should be set, it indicates that the previous data transfer has not yet been completed.

A "1" signal on conductor 732 occurs when the Resume flip-flop is set and a "1" signal appears on conductor 734 when the Ready flip-flops are cleared. Assuming these conditions are met, NOR circuit 90N21 will be fully enabled during the SCAN mode when the T82 flip-flop is set.

The next command enable to be generated occurs at time $\phi1.2$ when NOR circuit 13T83 (FIG. 12h) becomes enabled and outputs a signal on its conductor 542 to set the T83 flip-flop. The resulting logical "0" signal appearing at the output from the "1" side of the T83 flip-flop passes along conductor 546 and is applied to a first input terminal of NOR circuit 90N24. The other input of this circuit is connected to the "1" side of the SCAN flip-flop by means of the conductors 514 and 518 and hence is fully enabled causing a "1" signal to appear on the conductor 552. This signal serves as the command enable GATE OUT-ON-2 REQUEST TO PRIORITY. It is this command which causes the request to be processed by Priority so that the mode and channel address for the channel having highest priority to be generated. Again, the higher numbered channel is awarded priority so that if Output Requests are present on both channels 0 and 1, the channel address generated will uniquely identify channel 1.

At time $\phi1.3$ the "0" signal now appearing at the "0" side of the T82 flip-flop is inverted by NOR circuit 12T83 and the resulting "1" signal on conductor 576 clears the T83 flip-flop. Prior to the clearing of the T83 flip-flop, the T84 flip-flop has been set. At the phase 3 time following the setting of the T84 flip-flop, NOR circuit 13T85 becomes fully enabled, outputting a "1" signal on conductor 574 to set the T85 flip-flop to its "1" state. Because the T85 flip-flop is set, at time $\phi2.3$ NOR circuit 13T86 will output a "1" signal on the conductors 578 and 580 to respectively set the T86 flip-flop and to clear the T84 flip-flop. The output appearing on conductor 580 also passes along conductor 736 and through OR circuit 738 to clear the $I/O_2$ flip-flop V62 which was set during the processing of the preceding request. Next, at time $\phi3.3$ the 13T87 inverter connected to the "1" side of the T86 flip-flop becomes fully enabled and produces a "1" signal on the conductor 584 to set the T87 flip-flop. The signal also passes along conductor 582 to clear the T85 flip-flop.

A "0" signal from the "1" side of the T87 flip-flop passes by way of conductor 586 to a first input terminal of NOR circuit 23V16 which, in turn, has its output connected to the set terminal of the Memory Access flip-flop V16. Another input to this last mentioned NOR circuit comes from the output from the "0" side of the SCAN flip-flop by way of the inverter 03V60 and conductor 587. Since the SCAN flip-flop is set at this time the inverted output from the "0" side thereof is a logical "0" signal. NOR circuit 23V16 also has 3 input connections coming from the three Interrupt flip-flops in the Sub-Priority Network. Since the memory is not required for the process of an Interrupt Request, one of these inputs will be a "1" signal whenever an Interrupt Request is being processed, thereby disabling the setting of the Memory Access flip-flop. For an Out-on-2 Request, however, the three inputs to NOR circuit 23V16 from the Sub-Priority network will all be logical "0" signals. Still another input to NOR circuit 23V16 comes by way of the output from the NOR circuit 22V16. The inputs to this last mentioned NOR circuit come from the Priority Network and at least one will have a "1" signal thereon whenever a request has been loaded into priority by the command enable SEND REQUESTS TO PRIORITY which occurs during the first part of the SCAN cycle. At time $\phi 2.4$ the NOR circuit 23V16 becomes fully enabled and sets the Memory Access flip-flop to its "1" state. At this same time the logical "0" signal appearing at the "1" side of the T87 flip-flop passes through NOR circuit 13T88 and along conductor 594 to set the T88 flip-flop. With both the T88 flip-flop and the Memory Access flip-flop set, "0" signals are respectively applied by way of conductors 596 and 598 to the input terminals of NOR circuit 90N51. The resulting "1" signal appearing at the output of this inverter passes by way of conductor 600 and through OR circuit 602 to clear the SCAN flip-flop V60 thereby terminating the SCAN sequence. The output from NOR circuit 90N51 also appears on the conductor 740 and serves as the command enable TRANSFER PRIORITY TO WORKING REGISTER. The effect of this signal is to clear the Working Register flip-flop for the particular channel currently being honored by the Priority Network. The logical "1" signal from 90N51 is inverted by NOR circuit 92N51 causing a logical "0" signal to appear on conductor 742. This signal goes to the Resume flip-flop and causes it to be cleared if it is not already in this condition. At time $\phi 1.5$ the "0" signal appearing at the output of the T88 flip-flop passes through and is inverted by NOR circuit 13T90 and the resulting "1" signal on conductor 616 passes to set the T90 flip-flop.

At the phase 2 time following the setting of the I/O$_1$ flip-flop V61, i.e., at time $\phi 2.5$, NOR circuit 13T80 becomes fully enabled and outputs a "1" signal on conductor 620 which passes through OR circuit 510 to again set the T80 flip-flop. More specifically, when the I/O$_1$ flip-flop V61 (FIG. 12b) is set a "1" signal appears on the conductor 622 connected to the "0" side thereof and this signal is inverted by NOR circuit 05V60 so that a "0" signal appears at a junction 744 (FIG. 12g) and at a first input to NOR circuit 13T80. As has already been described, if no requests of any type are found during the SCAN mode, the SCAN flip-flop remains set and the Memory Access flip-flop remains cleared. It has been assumed for the purpose of this description that an Out-on-2 Request has been detected so that the Memory Access flip-flop is set and the SCAN flip-flop is cleared. With the Memory Access flip-flop set, the memory timing chain (not shown) outputs a signal to the conductor 746 (FIG. 12g) indicating that memory is available for use by the input-output section. Hence, that at time $\phi 2.5$, NOR circuit 13T80 is fully enabled.

With the T80 flip-flop again set a "0" signal appears on conductor 632 and is applied as a first input to NOR circuit 96N11 (FIG. 12a). The second input to this inverter comes from the "1" side of the I/O$_1$ flip-flop V61 by way of conductor 630 and hence at this time is also a "0" signal. NOR circuit 96N11 is therefore fully enabled causing a "1" signal to appear on its output conductor 748 which in turn feeds the inverter 97N11. The resulting "0" signal on conductor 628 serves as a command enable SEND CHANNEL ADDRESS TO S REGISTER. This signal goes to the gates associated with the S-register flip-flops and is effective to permit the passage of the address generated by the Priority Network into the S-register.

At the time that hte T80 flip-flop was set during the I/O$_1$ sequence, i.e., at time $\phi 2.5$, NOR circuit 19V61 became fully enabled so that a "1" signal appeared on its output conductor 626. This signal is the command enable INITIATE MEMORY and it goes to the memory timing chain causing it to run concurrently with the I/O$_1$ sequence. Since the memory timing chain is running and the channel address is in the Storage Address Register, the word located at this address (the buffer control word) will be read out from memory into the Memory Communications Register.

The timing chain continues to run and at time $\phi 4.5$ the one output from NOR circuit 13T81 sets the T81 flip-flop. At the subsequent phase 2 time NOR circuit 13T82 becomes fully enabled outputting a "1" signal on conductor 356 to set the T82 flip-flop to its "1" state. Besides performing this function this signal passes along conductor 538 to clear the T80 flip-flop and along the conductor 636 to clear the Memory Access flip-flop. The "0" signal now appearing at the output of the "1" side of the T82 flip-flop passes by way of conductor 642 and a conductor 750 to a first input terminal of NOR circuit 94N21. The second input to this last mentioned inverter comes from the "1" side of the I/O$_1$ flip-flop by way of conductors 630 and 644. With the I/O$_1$ flip-flop set, NOR circuit 94N21 is fully enabled causing a "1" signal to appear on conductor 752. This is the command enable INCREMENT $Z_L$. At this time the contents of the lower half of the Z-register are incremented by one and restored back into memory at the address currently contained in the S-register. This address, of course, is generated from the channel address as determined by the Priority Network. The contents of the lower half of the Z-register remain in the Z-register and are left unchanged. It can be seen then that on the next subsequent output transfer on this same channel, the buffer control word will differ by one from the present word and hence the data word to be transmitted will be taken from the sequential address.

The output from NOR circuit 94N21 also passes by way of canductor 640 to the set terminal of the DISABLE I/O$_1$ flip-flop V64 thereby initiating the DISABLE I/O$_1$ sequence which temporarily runs concurrently with the I/O$_1$ sequence. At time $\phi 2.8$ during the DISABLE I/O$_1$ sequence, NOR circuit 13T86 (FIG. 12j) becomes fully enabled and outputs a "1" signal on the conductor 578 which sets the T86 flip-flop. The output appearing on conductor 754 which is connected to the "0" side of the T86 flip-flop is the command enable CLEAR TRANSLATOR. This logical "0" signal is applied to gating means associated with the Translator flip-flops and when the gates are fully enabled a signal is developed for clearing out its contents. The details of this arrangement will be described more fully later on in the specification.

Now that the Translator is cleared the timing chain continues to run and the T87 flip-flop is switched to its "1" state. As a result, a "0" signal appears on the conductor 646 which is connected to a first input of NOR circuit 94N42. The other input to this circuit comes by way of conductor 648 from the "1" side of the DISABLE I/O$_1$ flip-flop V64. Since this flip-flop is set at this time, NOR circuit 94N42 is fully enabled causing the command enable TRANSFER CHANNEL ADDRESS TO TRANSLATOR to appear on the conductor 652. This signal also follows conductor 654 and passes through OR circuit 656 to set the I/O$_2$ flip-flop V62 to its "1" state. The Translator operates on this channel address causing enabling signals to be sent to various circuits in the input-output section of the computer so that the various functions to be performed are carried out only on the particular channel whose address has been generated in the Priority network.

At time $\phi 2.9$ the "0" signal appearing at the "1" side of the T87 flip-flop passes through and is inverted by NOR circuit 13T88 and the resulting "1" signal appearing at the output thereof clears the T86 flip-flop and sets the T88 flip-flop. The "0" signal appearing at the output of the T88 flip-flop is applied by way of conductors 596 and 660 to a first input of NOR circuit 94N51. Since a "0" signal is already applied to the other input of this inverter by way of the conductors 648 and 650 connected to the "1" side of the DISABLE I/O₁ flip-flop, NOR circuit 94N51 is fully enabled causing a logical "1" signal to appear on its output conductor 662. This signal is inverted by NOR circuit 87N51 causing a "0" signal to appear on conductor 756. This signal is simultaneously applied to a plurality of inverters, one of which is 89N51. A second input to this inverter comes from the output of inverter 21V52 located in the Sub-Priority Network (FIG. 17b) as will be shown in detail when this figure is described. (When an Out-on-2 request is being processed, the signal from 21V52 will be a logical "0.") The final input to NOR circuit 89N51 comes from the Z-register comparator by way of conductor 674 and this signal will be a "0" when the contents of the lower half of the Z-register becomes equal to that of the upper half. It can be seen then that NOR circuit 89N51 is fully enabled producing a "1" signal on the conductor 698. It may be recalled that in the normal output mode, i.e., an Out-on-12 operation, this signal was applied directly to the Output Active flip-flops to clear the particular flip-flop on the channel currently specified by the signals appearing at the output of the translator. The clearing of the Output Active flip-flop in that case terminated the buffer transfer on that particular channel. In the case of an Out-on-2 request the signal on conductor 698 does not go directly to the Active flip-flop on the selected channel. Instead it is applied to a so-called DISABLE INTER-COMPUTER BUFFER flip-flop (FIG. 22) causing it to be set to its "1" state. It is not until the RESUME signal is returned from the receiving computer that the Output Active flip-flop on channel 0 or 1 will be cleared.

The output from NOR circuit 94N51 is also applied by way of conductor 664 to the input of inverter 95N51. This circuit operates on this signal to cause a "0" signal to appear on its output conductor 538. At the next following $\phi1$ time NOR circuit 96N51 becomes fully enabled and outputs a "1" signal on conductor 666 which is returned by way of the OR circuit 512 (FIG. 12h) to again set the SCAN flip-flop to its "1" state. At this time the input-output logic again becomes free to look for other requests.

The signal from the "1" side of the T88 flip-flop subsequently passes over conductor 616, setting the T90 flip-flop. The resulting "0" signal appearing on its output conductor 604 passes over conductor 606 to a first input of NOR circuit 12T80. Since the SCAN flip-flop is now set the output from inverter 03V60 is a "0" signal and passes over conductor 587 to fully enable inverter 12T80 at time $\phi2.10$. A "1" signal therefore appears on conductor 608 and passes through OR circuit 510 to again set the T80 flip-flop to initiate another pass through the e-designator timing chain. While this last mentioned flip-flop is set, a "0" signal passes over the conductor 632 to a first input of NOR circuit 95N11. The other input to this inverter comes from the "1" side of the I/O₂ flip-flop and hence the command enable TRANSFER $Z_L$ to S appears on conductor 676. It may be recalled that at this time the lower half of the Z-register contains the buffer control word which is actually the address of the memory register containing the data it is desired to transmit to the receiving computer. Now when the memory is again initiated by the signal appearing on conductor 626, this word of data will be read out from the memory and placed in the Z-register.

The command enable to effect the transfer of the data from the memory to the Z-register occurs during the interval that the T82 flip-flip is set during the I/O₂ sequence. At this time the NOR circuit 95N21 has a "1" signal applied thereto by way of the conductor 760. This conductor is connected to the Input flip-flop in the Sub-Priority Network and has a "1" signal impressed thereon except when an input buffer transfer is in progress. This "1" signal causes the output from NOR circuit 95N21 to be a logical "0" which is ANDED together with a "0" signal coming from the memory timing chain by way of conductor 762 in NOR circuit 96N21. The output from NOR circuit 96N21 serves as the command enable TRANSFER DATA TO Z.

The next step in the Out-On-2 process is to prepare the output register $C_1$ for a subsequent receipt of the data word from the Z-register. It can be seen that in the time that the T83 flip-flop is set during the I/O₂ sequence both inputs to NOR circuit 94N24 will be logical "0's" and hence its output will be a "1" signal. This "1" signal is, in turn, inverted by NOR circuit 95N24 so that a "0" signal appears on its output conductor 702. This signal is applied to a first input terminal of NOR circuit 88N24. The other input comes from the Out-On-2 flip-flop in the Sub-Priority Network by way of conductor 764 and is a "0" signal when the equipment is engaged in an output data transfer on either channel 0 or channel 1. With NOR circuit 88N24 fully enabled the command enable CLEAR $C_1$ appears on the conductor 766.

The output signal appearing at this time from NOR circuit 94N24 is also conveyed along conductor 690 to set the DISABLE I/O₂ flip-flop V63 to its "1" state. At time $\phi2.12$ the output from the "1" side of the T83 flip-flop passes through and is inverted by NOR circuit 13T84 so that a "1" signal appears on the conductor 566. This signal is applied to the set terminal of the T84 flip-flop causing it to be switched to its "1" state. The "0" signal output from the "1" side of the T84 flip-flop is applied via conductor 568 to a first input terminal of NOR circuit 90N31. A second input to this inverter comes by way of conductors 570 and 572 from the "1" side of the I/O₂ flip-flop V62. By referring to the timing diagrams of FIG. 11a,b and 14a,b, it can be seen that at this time the I/O₂ flip-flop is set and hence NOR circuit 90N31 becomes fully enabled. The resulting "1" signal at its output is inverted by NOR circuit 91N31 so that a "0" signal appears on the conductor 692 connected to the output thereof. While this signal partially enables inverters 92N31 through 96N31, only inverters 94N31 and 95N31 will be fully enabled at this time. The signal to fully enable these last mentioned inverters comes by way of conductor 768 from the mode flip-flop in the Translator associated with the Out-On-2 request. The resulting logical "1" signals appearing on conductors 770 and 772 serve as the command enables TRANSFER Z TO $C_1$. The effect of this command is to load the Output Register associated with channels 0 and 1 with the data word read out from memory.

The e-designator timing chain continues to run with the various flip-flops being set and cleared in a definite sequence by the output from the 4 phase clock. At the $\phi2$ time following the setting of the T85 flip-flop NOR circuit 13T86 is enabled and outputs a signal on the conductor 580 to clear the T84 flip-flop and along the conductor 736 and through OR circuit 738 to clear the I/O₂ flip-flop V62.

The receiving computer is next advised that data is available to it in the output register of the transmitting computer by the generation of the READY signal by the transmitting computer. This occurs during the time that the T90 flip-flop in the e-designator timing chain is set. When this flip-flop is set the NOR circuit 90N54 becomes fully enabled by the "0" signals coming from the T90 flip-flop and from the "1" side of the DISABLE I/O₁ flip-flop (by way of conductor 710). The resulting "1" signal output from NOR circuit 90N54 is inverted by NOR circuit 91N54 and hence a "0" signal is applied as a first input to NOR circuit 92N54. The remaining input to this last mentioned inverter also comes from the mode flip-flop in the Translator which is set whenever an Out-On-2 Request is being processed. More specifically, the "0" signal from the Translator enters the control and timing circuits by way of conductor 768 and this signal follows the conductor 774 which is connected to conductor 768 at junction 776. With NOR circuit 92N54 fully enabled a "1" signal appears on its output conductor 778 and serves as the command enable SET READY FLIP-FLOP. As will be shown more clearly hereinbelow when the details of the ready and resume circuits are described in detail, this signal is combined with a signal from the Translator to set the Ready flip-flop on the particular channel over which the data transfer is to be made. The Ready flip-flop will remain until a RESUME signal is returned from the receiving computer, and recognized during A SUBSEQUENT SCAN cycle of the sending computer. The circuits employed in the control and timing circuits for generating the command enable to clear the Ready flip-flops have already been described and it is therefore felt unnecessary to repeat this explanation here.

REQUEST CIRCUITS—FIG. 16

FIG. 16 illustrates the circuitry employed at the interface between the peripheral equipment and the Input-Output section of the computer. The apparatus shown in FIG. 16 is for only a single channel, but identical circuits are employed for each of the Input, Output and External Interrupt Request channels used in the system except for the Output Request circuits on channels 0 and 1.

When the peripheral equipment has data on the lines available to the computer, it informs the computer by sending a control signal called an Input Request. Similarly, when the peripheral equipment can accept data, it informs the computer by sending a control signal called an Output Request. The External Interrupt Request provides a means whereby a peripheral device may direct the computer to accept data from it.

The Request one-shot 800 is intially conditioned by being set to its "1" state. The "1" signal for performing this function comes from the input-output control circuits at an appropriate time depending upon the type of request being processed and is applied to the conductor 802. The signal passes through the OR circuit 804 to set all of the Request One-Shot circuits in anticipation of a waiting Input, Output or External Interrupt Request. Under normal operating conditions, prior to the completion of a previous input or output buffer transfer, the Request One-Shot on the then selected channel has been reset or cleared. When the request signal on the line drops or is removed, the input to the Request Amplifier 806 becomes a "0" signal. The amplifier merely changes the signal level and performs no logical inversion. The output from Amplifier 806 is therefore also a "0" signal which is inverted to a "1" signal by the NOR circuit 808. The "1" output on the conductor 810 appears at a junction 812, and from there passes by way of conductor 814 through OR circuit 844 to set the Request One-Shot.

Now, when a new request is transmitted to the computer, the signal appearing on the conductor 816 is a logical "1." The output from amplifier 806 is also a "1" signal and forces the output from NOR circuit 808 to a "0." The "0" signal has no effect on the Request One-Shot, but it does pass by way of conductors 818 and 820 to a first input of a NOR circuit 822.

As has already been explained, before a request can be transmitted to the Sub-Priority Network, it is a requirement that the Input or Output Active flip-flop associated with the channel in question be set. When this flip-flop is set, a "0" signal appears on the conductor 824 and is applied to the junction 826. From there the signal follows conductor 828 to a second input terminal of NOR circuit 822. Because the Request One-Shot for the channel under consideration has been previously set, a "0" signal appears on its output conductor 830, and is applied to junction 832. A conductor 834 connects this point to a third input terminal of NOR circuit 822. Hence, it is fully enabled to output a "1" signal on the conductor 836. This signal is applied to one of the input lines in the Sub-Priority Network (FIGS. 17a and 17b).

Since at any time there may be Input, Output or External Interrupt Requests on more than one channel, a signal must also be transmitted to the Priority Network at a proper time so that the channel be honored may be established. This is the function of the NOR circuit 838. Three of the enable signals required by NOR circuit 838 are the same three that enabled NOR circuit 822. In other words, the "0" signals appearing at the junctions 826 and 832 are also applied by way of the conductors 840 and 842 to a pair of inputs of NOR circuit 838. In addition, a command enable from the input-output control circuits is required. It may be recalled that at the time during the SCAN sequence that the T83 flip-flop is set, the command enable GATE REQUEST TO PRIORITY is generated at the output of NOR circuit 89N24 for an Input Request and at the output of NOR circuit 97N24 (FIG. 12c) for an Output Request. This command enable is a "1" signal and is applied to the NOR circuit 844 by way of a conductor 846. This signal is inverted by NOR circuit 844 and a "0" signal appears on its output conductor 848. At the following phase 4 time, the NOR circuit 838 is fully enabled and transmits a "1" signal on the conductor 850 to the Priority Network to set the designated flip-flop.

Since it is a requirement of the system that for each word buffered into the computer there must be a separate request, a provision must be made to reset the Request Gates following each request. The command to reset the Request One-Shot which in turn controls the gate, is generated by the e-designator timing chain. For an Input Request, the command enable for resetting the one-shot is generated at the output of NOR circuit 85N51 on conductor 668 (FIG. 12d). The command enable is generated at the output of NOR circuit 93N54 for an Output Request. The "1" signal is applied to the NOR circuit 852 causing a "0" signal to appear on its output conductor 854. This "0" signal is applied as a first input to a NOR circuit 856. A second input to this NOR circuit comes from the Translator and enters on line 858. As will be explained more fully later on, a "0" signal appears only on the line associated with the particular channel currently being honored in the Priority Network. At $\phi 1$ time then, the NOR circuit 856 will be fully enabled to output a "1" signal on conductor 860 which clears the Request One-Shot to ready it for the next request on that channel.

SUB-PRIORITY NETWORK—FIG. 17

The Sub-Priority Network accepts the various request signals to determine which mode of operation is to be processed by the Input-Output section at a particular time. The network is composed of a plurality of working circuits, each one with its associated flip-flop and gates. When a request is to be processed by the Sub-Priority network, the designated flip-flop for the selected mode of operation is set by enables from both the request gates discussed previously and from the SCAN cycle. When one mode of operation is selected by Sub-Priority, it disables all other modes having lower priority at that instant. For example, if an Input Request and an External Interrupt Request and an Out-on-12 Request are simultaneously entered into the Sub-Priority circuits, the External Interrupt flip-flop will be set, and its output will disable both the Input Request circuits and the Out-on-12 Request circuits.

Before proceeding with the explanation of the remainder of the Sub-Priority Network, the means employed for the time sharing of requests will be discussed. In the Sub-Priority network the Out-on-12 mode has precedence over the Input mode so it is conceivable that the computer could be locked out of an Input mode if several Output Requests are simultaneously present on several channels. A time-share circuit is incorporated into the Sub-Priority Network to prevent this. As will be subsequently shown, when an Input mode or an Out-on-12 mode of operation is being processed by the Input-Output section, its associated flip-flop in the Translator (FIG. 22)

is set. Before the input or output buffer transfer operation is completed, i.e., during the DISABLE I/O₁ and/or I/O₂ sequence, the SCAN flip-flop is set for a second time to its "1" state. The input-output logic is at that time free to examine the waiting requests and process them through Sub-Priority. If an Out-on-12 Request is currently being processed, then the Output flip-flop V36 in the Translator is set and a "1" signal appears on the conductor 902 (FIG. 17c) and is applied to the inverter 12V54. A "0" signal therefore appears on its output conductor 904 which is connected to a first input terminal of NOR circuit 12V52. Since the I/O₂ flip-flop V62 (FIG. 12i) is also currently set, a "1" signal is provided on the conductor 906. Since this line receives its signal from the "0" side of the I/O₂ flip-flop, inverter 12V58 outputs a logical "0" signal to the junction 908. From there, the signal follows conductor 910 to a second input terminal of NOR circuit 12V52. This circuit is therefore fully enabled and emits a "1" signal on its output conductor 912. This conductor, in turn, is connected to a first input terminal of the NOR circuits 13V52, 17V52 and 13V50. This "1" signal disables these last mentioned inverter gates, thus preventing Output Requests from following one another. The Sub-Priority Network is therefore free to process an Input Request which may have been waiting. Similarly, if the immediate preceding request had been of the Input type, the mode designating flip-flop V34 of the Translator circuits would be outputting a "0" signal on the conductor 914 (FIG. 17b). Again, the I/O₂ flip-flop would be set so as to output a "1" signal on conductor 906. This last mentioned signal is inverted by NOR circuit 12V58 so that a "0" signal appears at junction 908. The signal at this junction follows conductor 916 to a second input terminal of NOR circuit 12V59. This NOR circuit is enabled and outputs a "1" signal on conductor 918 connected to a first input of inverter gates 13V51 and 17V51. This "1" signal disables these two gates, preventing the Sub-Priority network from immediately processing another Input Request. This prevents Input Requests from following one another and allows Output Requests to be processed or interleaved between Input Requests.

The outputs from the External Interrupt One-Shots (FIG. 4b) are connected into either NOR circuit 24I80 or 24I88. It may be recalled that the preferred embodiment of the present invention employes 14 input and 14 output channels, and hence, the total number of input lines to the NOR circuits 24I80 and 24I88 is 14. Similarly, the signals from the Output One-Shots are connected to the input terminals of the NOR circuit 24O40 and 24O46. Likewise, the output signals from the Input one-Shots enter the Sub-Priority Network and are applied to NOR circuits 24I40 and 24I48. The inputs to the inverters 24O28 and 24O20 come from the Internal Interrupt Generators (output) while the inputs to the inverters 24I28 and 24I20 come from the Input Internal Interrupt Generators.

At the start of the e-sequence timing chain NOR circuit 90N11 contained therein, outputs a "1" signal on the conductor 524 (CLEAR SUB-PRIORITY), clearing all the flip-flops in the Sub-Priority Network. It may be recalled that immediately following the clearing of the Sub-Priority flip-flops, the command enable SEND REQUESTS TO SUB-PRIORITY is generated by the e-designator timing chain. This signal enters the Sub-Priority Network on the conductor 920 and is changed to a "0" signal by inverter 12V55. This "0" signal is simultaneously applied to the inverter gates 17V51, 13V51, 17V52, 13V52, 17V53, 13V53, 17V54, 13V54, 17V55 and 13V55 by means of the bus 922. Assume that Input Requests are present on one or more of the input lines to NOR circuits 24I48 and/or 24I40. These last mentioned two inverters will output logical "0" signals on their conductors 924 and 926. Provided that the previously honored request was not also an Input Request, the signal on conductor 918 will be a "0." Hence, at time ϕ3 following the generation of the command enable on conductor 920, inverter gates 27V51 and/or 13V51 will be fully enabled and will output "1" signals which pass through OR gate 928 to set the Input flip-flop V51. The signal appearing on the conductor 930 is therefore a logical "0." If no other flip-flop of higher priority, i.e., if neither the Output flip-flop V52, the External Interrupt flip-flop V55 or either of the two Internal Interrupt flip-flops are in a set state, logical "0" signals will be applied to the remaining inputs of NOR circuit 19V51. However, if one of the other flip-flops is set, disabling signals will be presented to this last mentioned inverter. The fact that inverter 19V51 is controlled by both the Output flip-flop V52 and the Interrupt flip-flops makes the Input Request mode subordinate to the other two modes. In other words, if any one of the flip-flops V52 through V55 are set, the NOR circuit 19V51 cannot be fully enabled so that an Input Request cannot be processed.

Assuming for the moment that only Input Requests are present, NOR circuit 19V51 will be enabled and will output a "1" signal on the conductor 936. This "1" signal is, in turn, inverted by NOR circuit 20V51 such that a "0" signal appears on the conductor 938. This signal is applied to various NOR circuits in the Input-Output control circuits previously described to thereby effect operation in an output mode. The destinations for the "0" signal on conductor 938 are listed in the legend alongside thereof in FIG. 17c.

The logical "1" output signal from NOR circuit 19V51 also passes by way of a conductor 940 to an inverter 15V06 associated with the Priority Network (FIG. 18d).

Inverter 15V06 is one of six NOR circuits (15V00–15V06) connected to the output terminals of the flip-flops contained in the Priority Network. As will be described more fully hereinbelow, inverters 15V00 through 15V03 perform a translation so as to develop an address in binary code of the particular channel having the highest priority. The inverters 15V04 and 15V06 complete the channel address by outputting signals indicative of the type of request currently being honored by the Sub-Priority Network. The "1" input to inverter 15V06 causes a "0" signal to appear on its output conductor. Since at this time the Interrupt flip-flops V53 through V55 and the Out-On-12 flip-flop V52 are in a cleared condition, NOR circuit 15V04 outputs a "1" signal on its output conductor. This combination of signals on the output conductors from 15V04 and 15V06 designates an input mode of communication.

In substantially the same manner as has been described for an Input Request, the Out-on-12 flip-flop V52 and its associated inverters and gates accept Output Requests from the 12 normal channels and produce signals for causing the Input-Output section of the computer to operate in an output mode of communication. One or more of the 12 communications channels may simultaneously be presenting Output Request signals to the computer. If so, "1" signals will be applied to one or more of the input terminals of the NOR circuits 24O40 and/or 24O46. Logical "0" signals appear on their output conductors 942 and 944. Provided that the next preceding request to be processed is not also an Output Request, NOR circuit 12V52 in the Time Share circuit will be outputting a "0" signal on the conductor 912 connected to a first input terminal of NOR circuits 13V52 and 17V52. Now, when the command enable SEND REQUEST TO SUB-PRIORITY is generated by the I/O control circuits at the following time ϕ3, a "1" signal will appear on conductor 946 and/or 948 to set the Out-on-12 flip-flop V52. The "1" signal appearing on the conductor 932 disables the inverter 19V51 thereby giving an Out-on-12 Request priority over an Input Request. The "0" signal appearing on conductor 950 is applied to a first input terminal of inverter 19V52. As long as no External nor Internal Interrupt Request is present, the signals appearing on conductor 934 connected to the output of NOR circuit 02V55, on conductor 935 connected to the output of NOR circuit 02V54, and on conductor 937 connected to the "0" side of the V53 flip-flop will be "0's" so that inverter 19V52 will be fully enabled. The logical "1" signal resulting on the output conductor 952 of this inverter is applied by way of the conductor 954 to the inverters 15V04 and 15V06 (FIG. 18d) in the Priority Network to specify an Output mode of communication. The signal appearing on conductor 952 is also inverted by NOR circuits 20V52 and 21V52 to generate "0" enabling signals on the conductors 956 and 958 respectively. These last mentioned signals are transmitted to various inverters in the input-output control circuits to effect operation in the output mode. The signal on conductor 956 also is applied to the Translator to set the Output mode flip-flop V36 to its "1" state.

The enabling sequence for the gate circuits 17V54 and 13V54 is the same as for the previously described External Interrupt except that the inputs to the NOR circuits 24O28 and 24O20 come from the Output Monitors. As was explained in connection with FIG. 4 which illustrated the overall system, when the lower half of the index word becomes equal to the upper half, the Internal Interrupt Generator produces an output signal which passes to the Sub-Priority Network. Therefore, a logical "1" signal appearing at the output of any one of the 14 Internal Interrupt Output Generators will cause a logical "0" signal to appear on conductor 960 and/or 962. Another input to the NOR circuits 17V54 and 13V54 comes by way of conductor 964 from the Interrupt flip-flop (FIG. 24a) associated with the Interrupt Address Storage Register. As will be explained more fully when this last mentioned figure is explained in detail, the output from the Interrupt flip-flop V57 will be a "0" when the computer is not in a fault condition and not processing a previous Interrupt Request. Assuming this to be the case, at the $\phi 3$ time following the generation of the command enable SEND REQUEST TO SUB-PRIORITY at the output of NOR circuit 90N13 (FIG. 12a), logical "1" signals will appear on conductor 966 and/or 968 which passes through the OR circuit 970 to set the Internal Interrupt Output flip-flop V54. With the V54 flip-flop set a logical "0" signal appears on its output conductor 972 and is applied to a first input terminal of the inverters 02V54 and 19V54. The resulting "1" signal appearing on conductor 935 is applied to the circuits 19V51–19V53 of the lower ordered Request flip-flops thereby disabling the other lower modes in the Sub-Priority Network. Provided that the External Interrupt flip-flop is not set so that a "0" signal appears on the conductor 934, NOR circuit 19V54 will be fully enabled producing a "1" signal on its output conductor 974. This signal forces the output from inverter 20V54 to a "0." This output is one of the enables required, at the time during which the T83 flip-flop in the I/O control circuits is set, to enable the NOR circuit 96N24 for the transmission of requests to priority. The "1" output from NOR circuit 19V54 appearing on conductor 976 is effective to disable the setting of the Memory Access flip-flop and provides an enable for loading the Interrupt Storage Address Register. As will be described when the details of the Priority Network are set forth, the two outputs from 19V54 to the inverters 15V05 and 15V04 (FIG. 18d) in the Priority Network sets the initial address of the Internal Interrupt Output Entrance Register to a predetermined address (00060 octal). This is the special address for channel 0 and it is incremented by the channel number of the particular channel currently being referenced.

Since the Memory Access flip-flops remain cleared, the I/O₁ flip-flop cannot be set. This means that the control circuits remain in the SCAN sequence so that when the e-designator returns to time T80 the Sub-Priority and Priority Networks are cleared again in preparation for another request. The significance of this is that the input-output section of the computer relinquishes control of the interrupt to the main computer control.

Since the manner in which the Internal Interrupt Input flip-flop V53 in Sub-Priority is set is substantially identical to that of the V54 flip-flop, it is felt to be unnecessary to describe it in detail. It might be well to mention, however, that the inputs for setting the V53 flip-flop come from the output of the Input Internal Interrupt Generators.

The final circuits in the Sub-Priority Network to be considered are those devoted to the processing of an Out-On-2 request. As before, there is a flip-flop V50 (FIG. 17c), the state of which determines how the request is to be processed. In order to set this flip-flop, it is necessary that NOR circuit 13V50 be fully enabled. Each of the higher ordered flip-flops V51 through V55 provides an output to NOR circuit 13V50. If any one of these last mentioned flip-flops are set a "1" signal will be applied to 13V50 to thereby prevent the setting of the Out-On-2 flip-flop. If no other request of higher priority appear at the input of the computer, NOR circuit 13V50 will become fully enabled at the $\phi 1$ time following the generation of the command enable SEND OUT-ON-2 REQUESTS TO SUBPRIORITY. It will be recalled that this signal is developed at the output of NOR circuit 90N21 of the control and timing circuits. It enters Sub-Priority by way of the conductor 978 and is converted to a "0" signal by means of the inverter 12V50. Also, to fully enable NOR circuit 13V50 the inverter 15V40 in the Working Register must be outputting a "0" signal. This condition is met whenever at least one of the Working Register stages is set. The final input to NOR circuit 13V50 comes from the output of NOR circuit 12V52 by way of the conductor 912. A "0" output from NOR circuit 12V52 indicates that the last request processed was not of the output type. If the preceding request had been an Output Request at least one of the inputs to NOR circuit 12V54 would have been a "1" signal causing a "0" signal to appear on the conductor 904. NOR circuit 12V52 would then be fully enabled and would produce a "1" signal on conductor 912 to disable NOR Circuit 13V50.

Provided then, that all the aforementioned conditions are met, NOR circuit 13V50 will output a "1" signal on conductor 980 to set the Out-On-2 flip-flop V50. With the V50 flip-flop set, the logical "1" output from the "0" side thereof forces the output from inverters 05V50 and 03V50 to a "0." The "0" output from 05V50 is sent to the Priority circuits to enable the loading of the request to a designated channel. The "0" output from NOR circuit 02V50 is one of the enables required to clear the designated flip-flop in the Working Register. The "0" output from NOR circuit 03V50 which is sent to inverter 13V35 in the Translator is one of the enables required to set the mode flip-flop V35 (Out-On-2) and the other output from 03V50, which is sent to NOR circuit 17O40, is an enable used to clear the Resume flip-flop in preparation for the reception of the next RESUME for the request currently being processed. The direct output from the "1" side of the V50 flip-flop appearing on conductor 982 goes to inverter 13V71 (FIG. 22) and 13V71 will be fully enabled if the buffer transfer is completed on the request currently being processed. The "0" output from the "1" side of the V50 flip-flop also passes through inverter 02V50 and the resulting logical "1" signal on conductor 984 goes to the Priority Network and is used to set up the special address in priority of the Output Buffer Control Register.

PRIORITY NETWORK—FIG. 18

The Priority Network is used to determine the channel priority and set up the special address for a particular mode of operation. As is illustrated in FIGS. 18a through 18e, the priority network is comprised of 12 flip-flops and associated gates interconnected in such a manner so as to be able to designate a specific channel number from 2 through 13. Because of the manner in which the configuration is wired the higher numbered channels have priority over the lowered number channels. The network specifies a particular channel by which one or more of the flip-flops V00 through V13 are set. Also, the Priority Network is concerned with the outputs from the already mentioned NOR circuits 15V00 through 15V03 which provide the translation for the designated channel.

It may be recalled that during the SCAN cycle at the start of the *e*-designator timing chain, the CLEAR command is generated. This signal from NOR circuit 90N11 enters the Priority circuit by way of a conductor 1002 (FIG. 18*a*) and is applied either directly or through an OR circuit to the "0" input terminal of each of the flip-flops V00 through V13.

Following the determination by the Sub-Priority Network of a mode of operation, request signals are gated into the Priority Network to determine the channel to be used for this selected mode of operation. The command enable GATE REQUESTS TO PRIORITY comes from one of the NOR circuits 89N24, 92N24, 93N24, 96N24 or 97N24 (FIG. 12*c*) depending on which of these circuits receives an enabling signal from the Sub-Priority Network. As has been mentioned, the outputs from these inverters go to the Request Gates (see FIG. 16) and permit the request signals of the type determined by Sub-Priority to be applied to one or more of the Priority flip-flops. For example, if the Sub-Priority Network determines that an Output Request is to be honored and peripheral devices on channels 3, 5 and 8 are simultaneously presenting Output Request signals to the computer, logical "1" signals will be gated in on the conductors 1004, 1006 and 1008 of the Priority Network.

In explaining the operation of the Priority Network it is felt to be expedient to assume one type of request on several channels and then trace the resulting signals through the network to thereby show the manner in which a binary coded address for one specific channel having highest priority results. In accordance with the foregoing statement, assume that the Sub-Priority Network has determined that an Input Request is to be processed and that upon the generation of the command enable GATE REQUESTS TO PRIORITY, logical "1" signals appear on the conductors 1010, 1012 and 1014 associated with channels 10, 7 and 5 respectively. As has already been mentioned, the Priority Network operates to give top priority to the highest numbered channel having the type of request currently being honored by Sub-Priority. The logical "1" input on conductor 1010 (channel 10) passes through the OR circuit 1016 to set the flip-flop V10 to its "1" state. The resulting logical "1" signal appearing at the "0" side thereof passes from the junction 1018 by way of a conductor 1020 and through an OR circuit 1022 to also set the Auxiliary flip-flop V08. The "1" signal appearing at the junction 1018 also passes by way of a conductor 1024 to a first input terminal of NOR circuit 15V01 so that a "0" signal appears on its output conductor 1026.

The "1" signals on the conductors 1012 and 1014 would normally pass through their respective OR circuits 1028 and 1030 to set the V07 and V05 flip-flops to their "1" state. However, since the V08 flip-flop is set, a "1" signal appears on the output conductor 1032 of inverter 04V08 connected to the "1" side of the V08 flip-flop. This signal passes via conductor 1032 to a first input terminal of the even numbered OR circuits 1034 through 1038. The "1" signal passes through these OR circuits to the "0" side of the V07 and V05 flip-flops to thereby hold them in their cleared state in spite of the presence of the assumed Input Request signals which would otherwise set them.

The "1" signal appearing at the "0" side of the V08 flip-flop passes by way of a conductor 1040 to one input terminal of NOR circuit 15V03. As a result, a "0" signal appears on the output conductor 1042 of this inverter. By tracing the various conductors connected to the input terminals of NOR circuits 15V00 and 15V02, it will be seen that they are all carrying "0" signals under the conditions which have been assumed, thereby causing "1" signals to appear on their respective output conductors 1044 and 1046. The output signals from the NOR circuits 15V00 through 15V06 therefore form the code combination 0110101. The lowest order 4 bits of this combination are the complement of the channel address while the highest order 3 bits are employed to specify the particular mode of operation being performed.

The inputs to inverters 15V04 through 15V06 come from the Sub-Priority Network and the output from these 3 inverters specify by means of a binary code combination the particular mode of operation selected by the Sub-Priority Network. For example, if the Out-On-12 flip-flop V52 in the Sub-Priority Network is set, a "1" signal is applied to the conductor 1048 and hence to the input of inverters 15V04 and 15V06. This results in the binary code combination 010 being developed on the output conductors 1050, 1052 and 1054. This particular combination then specifies an output mode to the various circuits in the computer. Since it has been assumed that an Input Request is being processed, a "1" signal will be applied by the Sub-Priority Network to the conductor 1056 leading to a first input to inverter 15V06 in the Priority Network. The output from inverters 15V04, 15V05 and 15V06 will therefore form the code combination 110, which uniquely identifies an input mode of operation to the various circuits in the computer.

By complementing the lowest 4 bits of the above 7-bit address, it can be seen that the combination will read 1010 (decimal 10). This corresponds to the original assumption of an Input Request appearing on the conductor 1010 associated with channel 10. It can be seen then, that the designated channel number is a function of the outputs from inverters 15V00 through 15V03, with the full mode address being a function of the outputs from inverters 15V00 through 15V06. Since these outputs from the 15VXX circuits are transmitted to gate circuits in the S-register to the Interrupt Storage Register, and to the Translator, the enable output is a "0." In this manner, when a "1" signal appears in the address, it appears as a "0" output from a 15VXX circuit; and conversely a "0" in the address appears as a "1" output from a 15XX circuit. The full mode address is loaded into the S-register so that then the address can be referenced in memory. As has already been mentioned, the command to send the address to the S-register is generated during I/O₁ sequence at the time when the inverter 96N11 is enabled.

The Interrupt Address is loaded into the Interrupt Storage Register (FIG. 24) to be held for use during a subsequent A-sequence. The command to send the Interrupt Address to the Storage Register is generated during the SCAN cycle when the T86 flip-flop in the *e*-designator timing chain is set. The designated channel number is loaded into the Translator flip-flops to generate enable signals required during the processing of a request. The command to send the channel number to the Translator is generated during the DISABLE I/O₁ sequence when NOR circuit 94N/2 is enabled.

In the description of the input-output control circuits it is mentioned that one of the enables required for setting the Memory Access flip-flop V16 comes from the Priority Network. Under the assumed conditons, the "1" signal which appears on conductor 1058 (FIG. 18*c*) connected to the output of NOR circuit 04V08 by means of conductor 1032 is the signal which permits the setting of the Memory Access flip-flop. If no requests had been present, none of the lines in the Priority Network leading to the Memory Access flip-flop would be carrying "1" signals and the control circuits would remain in the SCAN mode.

An Out-On-2 request is loaded into the Priority Network upon receipt of a command from the I/O timing and control circuits coupled with the enables from the Working Register and the Sub-Priority Network. More specifically, at the time during the SCAN sequence when the T83 flip-flop is set, the output from NOR circuit 90N24 is a "1" and enters the Priority Network by way of conductor 1060. This forces the output from inverter 16V00 to a logical "0" signal and it is simultaneously applied to a first input of the inverter 17V00 associated with channel "0" and 17V01 associated with channel "1." At the next following ϕ4 time either one or both of the 17VXX circuits are enabled depending on the state of the Working Register flip-flops. If both circuits are enabled "1" signals pass through the OR circuits 1062 and 1064 to set the V00 and V01 flip-flops. Because of the priority scheme adopted herein, higher numbered channels are given precedence over lower numbered channels. Under this condition, then, the "1" output from the "0" side of the V01 flip-flop appearing on conductor 1066 forces the output from NOR circuit 15V00 to a logical "0." This in effect increments the special address to set up the address of the Buffer Control Register utilized for an output data transfer on channel 1. If only inverter 17V01 were enabled the "0" output from the "1" side of the V01 flip-flop would be inverted by NOR circuit 02V01 and the resulting "1" signal appearing on conductor 1068 would be effective to set the V00 flip-flop. It is necessary that this last mentioned flip-flop be set since the output from the "0" side thereof provides the signal used to enable the Memory Access flip-flop. If it were only the 17V00 inverter which had been enabled to set the V00 flip-flop, no other flip-flops in the Priority Network would be set since the special address for channel 0 has already been set up.

The output from the V00 and V01 flip-flops are also used to enable the clearing of the Working Register. The signals which are effective to clear the Working Register come from the NOR circuits 19V00 and 19V01. A first enable input to the 19VXX circuits comes by way of conductor 1070 from the Sub-Priority Network. If both the V00 and V01 flip-flops are set, NOR circuit 19V01 can be enabled by the "0" output from the "1" side of the V01 flip-flop but 19V00 is disabled by the "1" signal which now appears at the output from inverter 02V01. If V01 is set and V00 is cleared, NOR circuit 19V01 is disabled by the "1" input thereto which comes from the "1" side of the V01 flip-flop by way of conductor 1072. However, NOR circuit 19V00 can be fully enabled by the "0" inputs coming from the "1" side of the V00 flip-flop and the inverter 02V01. It may be recalled that at the time that the T88 flip-flop (FIG. 12k) is set, NOR circuit 90N51 outputs a "1" signal serving as the command enable TRANSFER PRIORITY TO WORKING REGISTER. This signal enters the Priority Network on conductor 1074 and is inverted by NOR circuit 18V00. The resulting logical "0" signal appearing on conductor 1076 is effective to fully enable NOR circuit 19V00 and the "1" output from this circuit clears the Working Register flip-flop associated with channel "0."

Table II indicates the particular flip-flops which are to set as well as the particular 15VXX inverters which produce "0" signals when requests appear on a given channel. For example, a request on channel 7 causes flip-flop V07 and auxiliary flip-flops V04, V05 and V06 to be set so that NOR circuits 15V00, 15V01 and 15V02 will be outputting "0" signals. The flip-flop V04 will output a "1" signal to the NOR circuit 22V16 for setting the Memory Access flip-flop.

*Table II.—Priority setup*

| Selected Channel | Channel FF Set | Auxiliary FF'S Set | Active 15V- -Circuits (s) ("0" Output) | Memory Access FF Enable |
|---|---|---|---|---|
| 0 | V00 | | | 00V00 |
| 1 | V01 | V00 | 15V00 | 00V00 |
| 2 | V02 | V00 | 15V01 | 00V00 |
| 3 | V03 | V00, V01, V02 | 15V01, 15V00 | 00V00 |
| 4 | V04 | | 15V02 | 00V04 |
| 5 | V05 | V04 | 15V02, 15V00 | 00V04 |
| 6 | V06 | V04 | 15V02, 15V01 | 00V04 |
| 7 | V07 | V04, V05, V06 | 15V02, 15V01, 15V00 | 00V04 |
| 8 | V08 | | 15V03 | 00V08 |
| 9 | V09 | V08 | 15V03, 15V00 | 00V08 |
| 10 | V10 | V08 | 15V03, 15V01 | 00V08 |
| 11 | V11 | V08, V09, V10 | 15V03, 15V01, 15V00 | 00V08 |
| 12 | V12 | | 15V03, 15V02 | 00V12 |
| 13 | V13 | V12 | 15V03, 15V02, 15V00 | 00V12 |

It is felt that the foregoing example considered in view of the above table is sufficient to explain the operation of the Priority Network and that it is unnecessary to further describe the various elements and connections thereof.

TRANSLATOR FIG. 19

The Translator used in the Input-Output section of the computer provides a unique translation for a certain specific channel that is being utilized or specified. The translation effectively takes place in a register comprised of the 4 flip-flops V30 through V33. The outputs from the 4 flip-flops are interconnected in a predetermined manner with a set of NOR circuits to provide the enable signals required to operate certain circuits in the Input-Output section. Also associated with the Translator is a set of flip-flops V34 through V36 which, when set, designate an Input mode, an Out-on-12 mode, or an Out-on-2 mode of operation.

As was mentioned in the introductory portion of the specification, during the execution of an Input Buffer, an Output Buffer or an External Function Instruction, the 4 bits making up the j* designator are loaded into the Translator. The resulting translation causes a signal to be developed on a set of lines associated with the particular channel specified by j*. During the A-sequence a "0" signal is applied to the conductor 1080 (FIG. 19a) connected to a first terminal of NOR circuit 11V32. At the following phase 1 time this inverter becomes fully enabled and outputs a "1" signal on its output conductor 1082 which passes through the OR circuit 1084 to clear the V30 flip-flop. This same signal passes by way of the bus 1086 to an input terminal of the OR gates 1088, 1090, and 1092. Hence, the entire Translator is cleared. Subsequently, but still during the A-sequence, in which one of the above mentioned instructions is obtained from memory and placed in the Z-register, a command to transfer j* to the Translator enters on a conductor 1094. This signal also passes along the bus 1096 so that it is applied to a first input terminal of NOR circuits 15V30 through 15V33. Another input to these NOR circuits comes from the Z-register stages 20 through 23 which currently hold the value of j*. (Reference to the instruction word format of FIG. 3 clearly illustrates this point.) At ϕ2 time, then the NOR circuits 15V30 through 15V33 become fully enabled to gate the even numbered 4 bits of j* through the OR circuits 1098 through 1104 to set one or more of the Translator flip-flops V30 through V33. Whether or not a particular one of these flip-flops is set depends on the signal ("1" or "0" bit) coming from the Z-register.

Assuming that an Input Buffer Instruction is being processed and the 4 bits of j* are 0011 (decimal 3), flip-flops V30 and V31 will be set during the A-sequence whereas flip-flops V32 and V33 will remain cleared. The "0" output from the "1" side of the V30 flip-flop passes through the NOR circuit 1106 so that a "1" signal appears on the conductor 1108 and is applied to one input terminal of NOR circuit 34V00. The "1" signal appearing at the output of the "0" side of the V30 flip-flop passes by way of conductor 1110 to one input terminal of NOR circuit 32V00. The inverted output from the "0" side of the V30 flip-flop passes via conductor 1112 so that a "0" signal is applied to an input terminal of NOR circuit 33V00. Similarly, the "1" signal appearing at the output of the "0" side of the V31 flip-flop passes over conductor 1114 to another input terminal of NOR circuit 34V00. The "0" signal appearing at the output of NOR circuit 1116 passes over conductor 1118 to a junction 1120. From there the "0" signal follows conductor 1122 to an input to NOR circuit 32V00, and by way of a conductor 1124, to a second input to NOR circuit 33V00. The "1" signal appearing at the output of the "1" side of the V32 flip-flop is inverted by NOR circuit 1126 causing a "0" signal to be applied by way of conductor 1128 to still another input terminal of NOR circuit 33V00. A conductor 1130 conveys the "0" output signal from the "0" side of the V32 flip-flop to a third input terminal of NOR circuit 32V00. NOR circuit 1132 inverts the "0" signal coming from the "0" side of the V32 flip-flop causing a "1" signal to be applied by way of conductor 1134 to the third input terminal of NOR circuit 34V00. Finally, because the V33 flip-flop is cleared, a "0" signal appears on the conductor 1136 connected to the output of NOR circuit 1138. This signal passes to junction 1140 and over conductor 1142 to the last input terminal of NOR circuit 33V00. The "0" signal appearing at the output from the "0" side of the V33 flip-flop passes by way of conductor 1144 to the fourth input terminal of NOR circuit 32V00.

It can be seen that the only inverter having all "0" signal inputs applied thereto is NOR circuit 33V00. The remaining inverters, i.e., 32V00 and 34V00 each have at least one input having a "1" signal thereon. The output from NOR circuit 33V00 passes to the Input Active flip-flop for channel 3 to set it to its "1" state thereby rendering this channel active.

While FIGS. 19a through 19c illustrate the interconnections from the Translator flip-flops to the inverters for only three channels, it should be understood that in the actual embodiment of the invention eleven additional inverters (XXV00) are provided so that the various possible code combinations obtainable from the selective setting of the 4 flip-flops can uniquely select one channel out of 14. It is felt to be within the realm of ordinary skill in the art for one to visualize how the other eleven NOR circuits are interconnected with the flip-flops to provide the desired translation.

In addition to the translation of he j* designator of the instruction word, the Translator also operates on the channel address generated in the Priority Network during a buffer transfer. As illustrated in FIG. 19a, the I/O control circuits supply inputs to the Translator Gates 11V30 and 1146 (FIG. 19c) by way of conductors 1148 and 1150. More specifically, at the time during the DISABLE I/O₁ sequence when the T86 flip-flop is set, "0" signals appear on conductors 1148 and 1150 to enable partially the inverters 11V30 and 1146. At the time φ1 following the generation of the command enables by the control and timing circuits, the inverters 11V30 and 1078 become fully enabled, emitting "1" signals on their respective output conductors 1152 and 1154. The signal on conductor 1152 first passes through the OR circuit 1084 to clear the V30 flip-flop. Secondly it passes over the bus 1156 and through the OR circuits 1088, 1090 and 1092 to clear out the other three Translator flip-flops. The "1" signal on conductor 1154 also passes along conductor 1158 so that the Input mode flip-flop V34, the Out-on-2 mode flip-flop V35 and the Out-on-12 mode flip-flop V36 are cleared.

After having been cleared by a command from the input-output control circuits, the Translator flip-flops can now be loaded with the channel address provided by the Priority Network. The data input to the inverters 13V30 through 13V33 is from the inverters 15V00 through 15V03 of the Priority Network. It may be recalled that the outputs from these last mentioned inverters define a specific channel on which an input or an output operation is taking place. The outputs from the circuits 15V00 through 15V03 circuits enable or disable the 13V30 through 13V33 circuits according to the channel specified. At the φ2 time following the generation of the command enable TRANSFER CHANNEL ADDRESS TO TRANSLATOR, the inverters 13V30 through 13V33 output signals which pass through the OR circuits 1098 through 1104 to set one or more of the flip-flops V30 through V33. The manner in which the translation takes place has already been described in connection with the j* designator and it is felt to be unnecessary to again trace the way in which one specific channel is uniquely selected. The legend appearing at the top of FIG. 19b indicates the destination for the output signals from the Translator.

The mode flip-flops V34 through V36 (FIG. 19c) indicate, when set, that an Input, an Output-on-2 or an Out-on-12 Request is being processed by the Input-Output section. The manner in which these flip-flops are initially cleared has been previously explained. When the command enable is generated by the e-designator timing chain to load the Translator, it is also utilized as an enable to set one of the Mode flip-flops. The other enable to the NOR circuits 1160, 1162 and 1164 comes from the Sub-Priority Network (FIGS. 17a and 17b). The particular flip-flop to be set is dependent upon the type of request currently being processed by Sub-Priority. If it is an Out-on-12 Request, NOR circuit 1164 will be fully enabled and the Out-on-12 Mode flip-flop V36 will be set. If it is an Input Request, NOR circuit 1160 becomes fully enabled causing the Input Mode flip-flop V34 to be set. The output signals from the mode flip-flops are all utilized by the input-output control circuits illustrated in FIGS. 12a–12k in a manner already described.

Another source of address signals for the Translator is the Interrupt Address Storage Register (FIG. 24). As was mentioned in the introductory portion of the specification the Interrupt Address Storage Register is loaded with the special address generated in the Priority Network and it is held therein for use during a subsequent A-sequence. It is during the A-sequence that a command enable is applied to the conductor 1166 in the Translator to fully enable selected ones of the NOR circuits 17V30 through 17V33. Whether or not one of these NOR circuits is enabled depends on the type of signal (logical "1" or "0") coming from the Interrupt Address Storage Register. A "1" signal is emitted from the NOR circuits having all "0" signals applied thereto, and it passes through the OR circuits 1098 through 1104 to set the Translator flip-flops. The output signals from these flip-flops are connected to the set of NOR circuits 32V00 through 34V00 so that the translation results in a signal being developed on their output lines, corresponding to the channel number generated in the Priority Network. In the case of an External Interrupt, the designation is for a channel on which the honored Interrupt Request has occurred. Since the outputs from the Interrupt Storage Address Register flip-flops depend initially upon the inputs from the inverters 15VXX circuits in Priority, the Translator flip-flops V30 through V33 are set according to the channel on which the interrupt has occurred.

As is indicated by the legend at the top of FIG. 19b, the signal coming from the Translator when an External Interrupt Request is being processed passes to the External Interrupt One-Shot circuit on the designated channel and is one of the enables required to clear the one-shot in anticipation of another External Interrupt Request which might follow on the same channel. The signal also passes to the Data Input Amplifiers for the selected channel and is employed as an enabling signal to permit the transfer of the 30 bit interrupt code to the Z-register for subsequent storage in the memory. It may be recalled that this 30 bit word generally identifies the type of fault which caused the generation of the External Interrupt control signal.

WORKING REGISTER—FIG. 20

The Working Register serves as a means for alternating the transmission of data over channels 0 and 1 when both of these channels are active. Associated with the Working Register flip-flops V40 and V41 is a Loading flip-flop V58. The Loading flip-flop enables and disables the setting of the Working Register stages. When the computer is master cleared, a "1" signal comes from the main control section of the computer and appears on the conductor 1170. This signal passes through the OR circuit 1172 to clear the V41 flip-flop and through the OR circuit 1174 to clear the V40 flip-flop. The Loading flip-flop V58 is initially cleared by a signal coming from the input-output control and timing cirsuits. More specifically, each time that the NOR circuit 13T83 in the I/O control circuits is fully enabled a "1" signal is sent by way of the conductor 1176 to clear the Loading flip-flop. As long as the Loading flip-flop remains in its cleared condition, the Working Register stages cannot be set. Therefore, in order to load the Working Register, NOR circuit 13V58 which is connected to the set terminal of the Loading flip-flop must be fully enabled. Two of the signals required to enable NOR circuit 13V58 come from the "0" side of the Working Register stages V40 and V41 by way of conductors 1178 and 1180 respectively. Since both of these registers were previously cleared, the signals appearing on conductors 1178 and 1180 will be "0" signals.

The command enable LOAD WORKING REGISTER is generated by the input-output control circuits during the SCAN sequence when the T80 flip-flop is set. It will be recalled that this is the same time that the command signal is generated to clear both the Priority and Sub-Priority networks. After inversion, this command enable signal appears on conductor 1182 which is connected to one of the inputs to NOR circuit 13V58. At the time $\phi1$ following the generation of this command enable by the control circuits, NOR circuit 13V58 becomes fully enabled to set the Loading flip-flop to its "1" state. The resulting logical "0" output signal from the "1" side thereof is applied by way of conductors 1184 and 1186 to a first input terminal of NOR circuits 13V40 and 13V41. Another enabling signal to these last mentioned inverters comes from the Output Active flip-flops for channels 0 and 1. When the Output Active flip-flop for channel 0 is set, a "0" signal is applied to NOR circuit 13V40 by way of the conductor 1188, and if the Output Active flip-flop on channel 1 is set, a "0" signal is applied to NOR circuit 13V41 by way of conductor 1190. At a subsequent $\phi3$ time, either one or both of the 13VXX circuits are enabled, depending upon the status of the Active flip-flops. The resulting "1" signals appearing on conductor 1192 and/or 1194 are effective to set the Working Register stages.

Figure 18A:
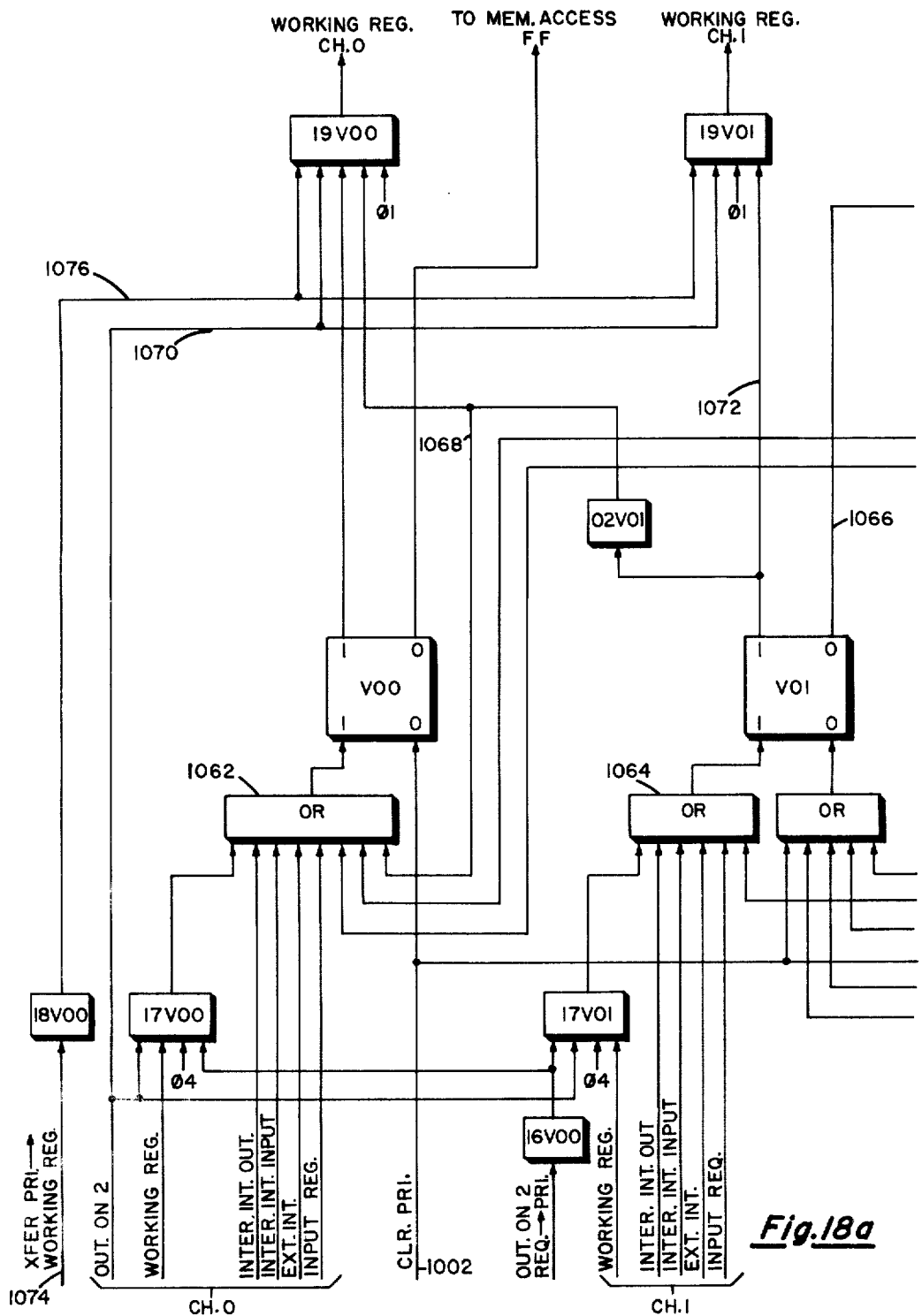
Figure 18C:
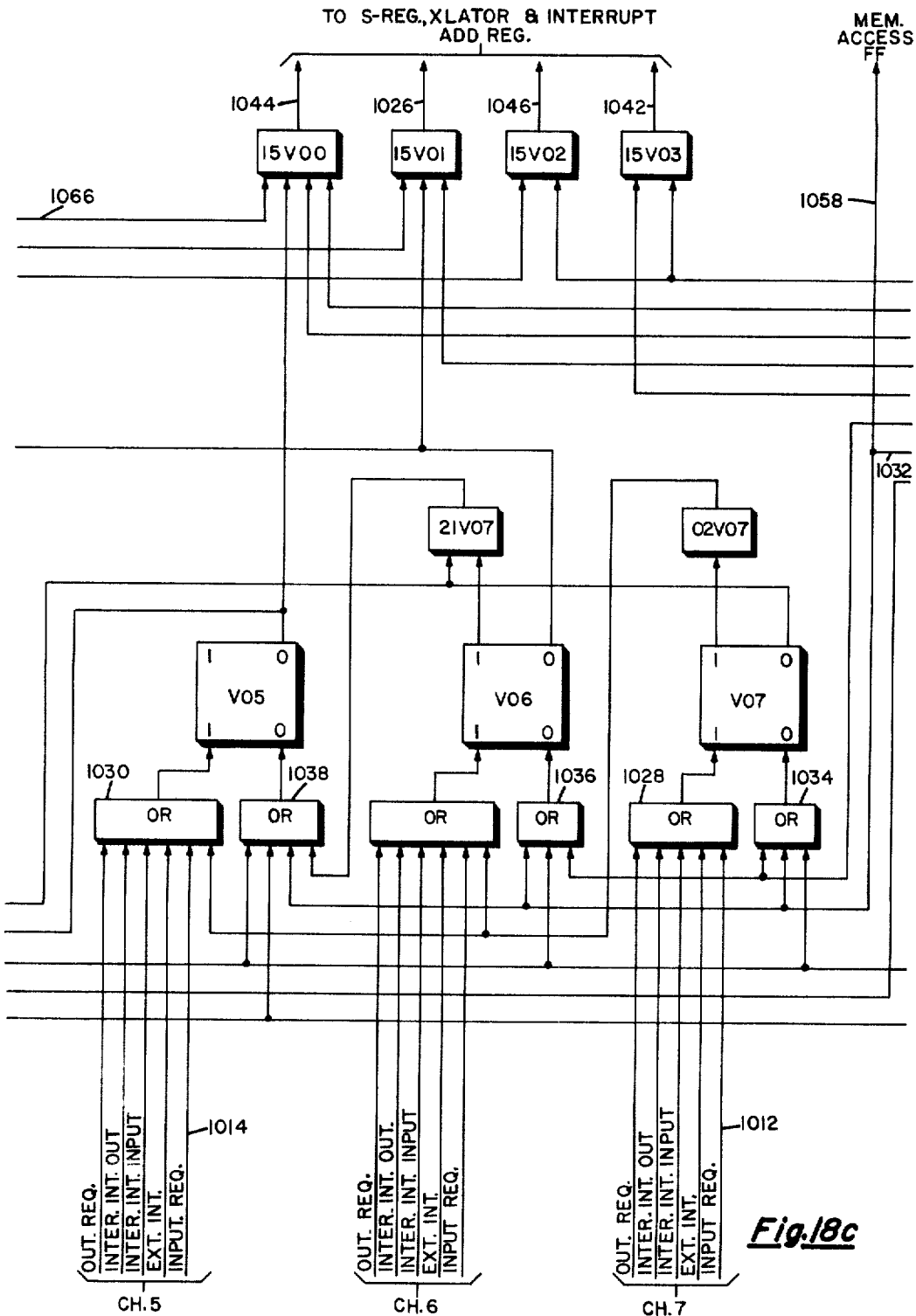
Figure 18E:
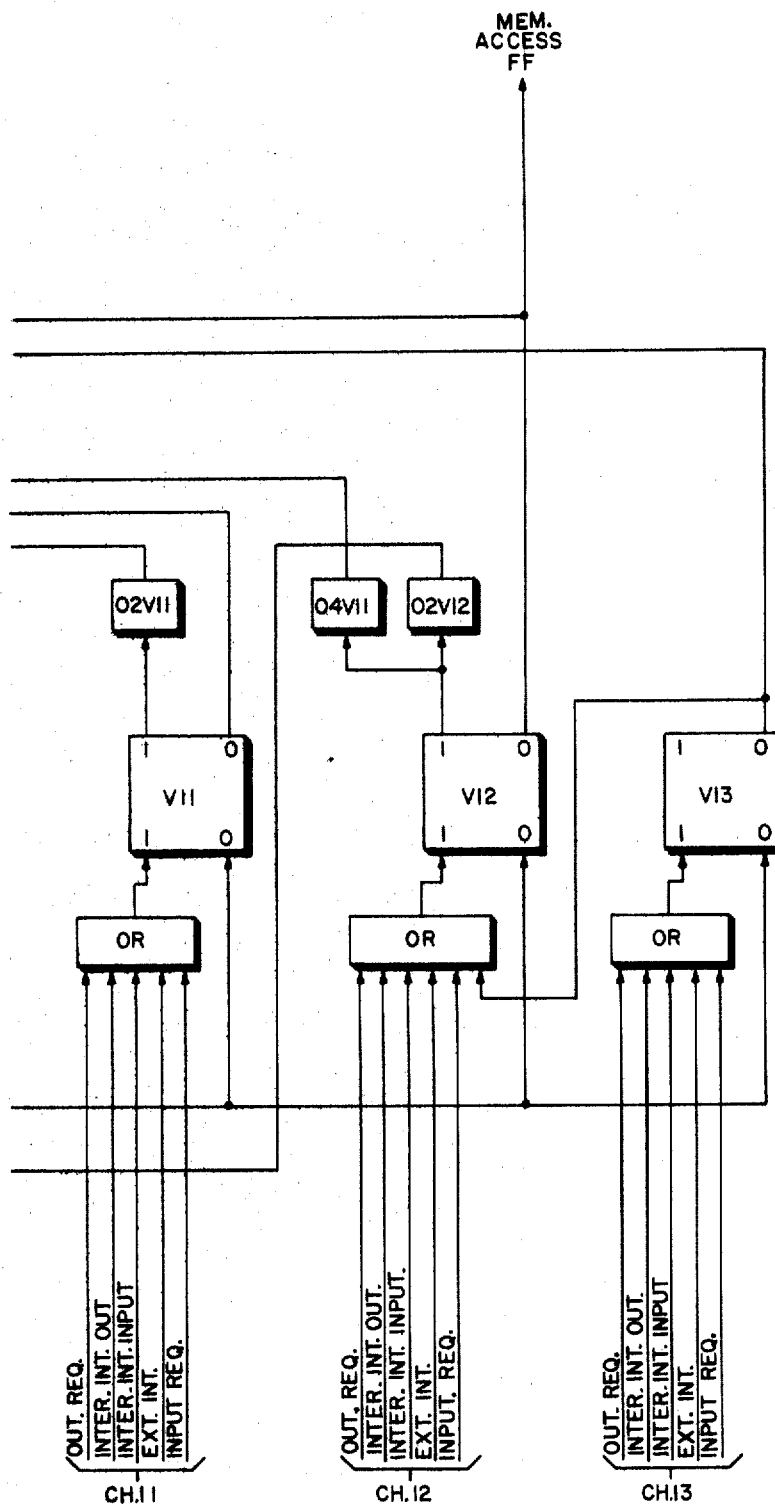

In order to illustrate the time share function of the Working Register, let it be assumed that both channels 0 and 1 have their Output Active flip-flops set. Under this condition, both stages V40 and V41 are set by the logical "1" outputs from the 13VXX inverters. The "1" signals appearing on conductors 1196 and 1198, which are connected to the "0" side of the Working Register stages, force the output from NOR circuit 15V40 to a "0." This "0" output signal appearing on conductor 1200 is one of the enables required by NOR circuit 13V50 in the Sub-Priority Network (FIG. 17c) to load the Out-on-2 request into Sub-Priority. At the same time that this request is loaded into the Sub-Priority Network, NOR circuit 13T83 (FIG. 12h) outputs a "1" signal on conductor 1176 to again clear the Loading flip-flop V58, thereby removing one of the enables required by the 13V40 and 13V41 gates. When the Out-on-2 Request is processed by the Sub-Priority Network, enabling signals are generated in the manner already described to load the request into the Priority Network to determine channel priority. It may be recalled that the "0" outputs appearing at the "1" side of the V40 and V41 flip-flops are required to enable the 17VXX circuits in the Priority Network. When the higher priority channel is designated, in this case channel 1, a signal is sent from the Priority Network to clear the associated flip-flop in the Working Register. Referring to FIG. 18a, when a request is being processed on channel 1, NOR circuit 19V01 outputs a "1" signal which appears on conductor 1202 (FIG. 20) and passes through OR circuit 1172 to clear the Working Register stage V41. Stage V40, however, is not cleared because inverter 19V00 in the Priority Network is outputting a "0" signal under the assumed conditions. Therefore, on the next loading cycle NOR circuit 13V58 is disabled by the "1" signal which comes from the "0" side of the V40 flip-flop. The next Out-on-2 Request must be handled on channel 0 since V40 is the only flip-flop set at this time. The same sequence of events is repeated with stage V40 being cleared by the "1" output from NOR circuit 19V00 in Priority. Now, on the next subsequent loading cycle NOR circuit 13V58 can again be enabled because both of the Working Register stages are again cleared. It will be seen then that the circuitry of FIG. 20 is effective to time-share the transmission of data over channels 0 and 1.

As was stated earlier when the general system operation was described in connection with FIG. 4, when the Input-Output Section of the computer is processing an Out-of-2 Request, a RESUME signal must be received before another request can be loaded into the Sub-Priority Network. In the event that the last word transferred on channel 0 or 1 caused the initial and terminal addresses of the index word to become equal, the buffer transfer would be terminated. However, before the Output Active flip-flop on the channel in question can be cleared, the RESUME signal must be received. In the meantime, it is conceivable that the Working Register could have been cleared and then loaded on the following loading cycle, possibly setting up an Out-on-2 request on a channel on which the buffer has been completed. To obviate this difficulty, means are provided for clearing the Working Register stage associated with the channel which has just been rendered inactive. The details of the above mentioned means will be described more fully later on when the Output Active circuits for channels 0 and 1 are explained. For now it is sufficient to say that at the time when the Output Active flip-flop on the channel on which the buffer transfer has been completed is cleared, a signal is developed on conductor 1204 or 1206 depending upon which of channels 0 or 1 has been rendered inactive. This signal passes through the OR circuit 1172 or 1174 to clear the V40 or V41 flip-flop. With V40 or V41 cleared, no Out-on-2 request can be processed on that particular channel.

OUTPUT ACTIVE FLIP-FLOPS—CHANNELS 0 AND 1—FIG. 21

FIG. 21 shows the Output Active flip-flops for the special intercomputer channels 0 and 1, as well as the various gates and signal paths associated therewith. During the execution of an Output Buffer or an Output Buffer with Monitor instruction ($f=74$ or 76) the Active flip-flop on the channel specified by the $j*$ designator of the instruction word is set. More specifically, during the D-sequence, a signal is developed by the main computer control circuits (not shown) which is applied by way of conductor 1210 to the input of NOR circuit 12O00. The resulting logical "0" signal appearing at the output thereof is applied by way of conductors 1214 and 1212 to a first input of the gates 13O00 and 13O01. The particular one of these gates designated by $j*$ in the instruction word is enabled at a φ1 time to set the particular Active flip-flop on the channel so specified. More specifically, if the j* designator specifies channel 0 the Translator will cause a "0" signal to be developed on the conductor 1216 whereas if the j* designator is of a value to specify channel 1, the Translator outputs a "0" signal to the conductor 1218. Depending on which one of these conductors receives the signal from the Translator, either the gate 13O00 or the gate 13O01 will be fully enabled to set either the Output Active flip-flop for channel 0 or the Output Active flip-flop for channel 1. The output from the 13OXX circuit also is fed to the External Interrupt Gate associated with the selected channel and is used to clear any previous External Interrupt on channel 0 or 1. It will be recalled that in order to load the Working Register it is necessary to have the Active flip-flop associated with the particular stage of the Working Register set. The output from the "1" side of the Output Active flip-flops for channels 0 and 1 goes to the inverters 13V40 and 13V41 of the Working Register, respectively, to obtain this gating function.

With the channels active, the computer can now read out a data word from its memory and load it into the output register $C_1$. The computer then sends the READY signal on the designated channel and awaits the return of the RESUME signal. If the RESUME signal is received within the specified time, the computer sets up another output buffer on the previously unused channel provided that it is also active. This mode of data transmission continues normally until the buffer has been completed. When the initial and terminal addresses of the buffer control word are equal, the Disable Intercomputer flip-flop V71 (FIG. 22) is set by an enable from the input-output timing circuits. At the time during the disable I/O₂ that the T90 flip-flop is set, the READY signal is sent out on the designated channel. If the RESUME signal is received in less than a nominal 64 seconds, a normal buffer termination takes place. At the time during the SCAN sequence that the T82 flip-flop is set, the output from NOR circuit 90N21 is a logical "1" and is applied by way of the conductor 1220 to the input of inverter 16O00. The resulting output signal from NOR circuit 16O00 serves to partially enable the gates 17O00 and 17O01. At φ4 time one of the gates 17O00 or 17O01 is fully enabled by the "0" output from the Disable Intercomputer flip-flop V71 and the "0" output from the Ready flip-flop. If the data transmission is taking place over channel 0 the Ready flip-flop O60 (FIG. 23a) for this channel will be set, whereas if the transmisison is taking place over channel 1 the Ready flip-flop O61 will be set. Assuming that a transmission is taking place over channel 0, NOR circuit 17O00 (FIG. 21) outputs a "1" signal which appears at the junction 1222. From here it passes over conductor 1224 and through the OR circuit 1226 to clear the Output Active flip-flop for channel 0. At the same time, the signal also passes over the conductor 1228 to the Working Register stage V40 to clear it. Similarly, if the data transmission is taking place over channel 1 it will be NOR circuit 17O01 that is fully enabled so that a "1" signal appears at the junction 1230. This signal passes by way of conductor 1232 and through OR circuit 1234 to clear the Output Active flip-flop for channel 1. This same signal also passes on conductor 1236 to clear the Working Register stage V41 associated with channel 1.

If the Active flip-flop in question had been initially set using an instruction with f=76, an Internal Interrupt signal is generated upon completion of the buffer transfer. As will be explained more fully when the details of the Output Monitor circuits are described, the "0" output from the "0" side of the Output Active flip-flop is an enable to the Output Monitor which serves to load the Interrupt Request into Sub-Priority. This "0" output also goes to another gate in the Output Monitor circuit to effect a loading of the Interrupt Request to the Priority Network.

If, because of a malfunction, the RESUME signal is not received within the specified time, the Output Active flip-flop under consideration is cleared and a simulated External Interrupt is generated. Since the READY signal remains on the line until the RESUME is returned, if no RESUME is returned the Ready flip-flop remains in a set condition. The resulting logical "0" signal output from the Ready flip-flop is one of the enable signals required by the gates 15O00 and 15O01. If the RESUME is not received, then at the time during the SCAN sequence that the T81 flip-flop (FIG. 12g) is set, the output from NOR circuit 94N13 is a logical "1" signal which indicates the simulated RESUME. This signal is applied by way of the conductor 1238 to the input of inverter 14O00. The resulting "0" signal output from this inverter enables the particular gate 15OXX which has the READY signal still existing thereon. The resulting "1" signal appearing at the output of this gate passes through either OR circuit 1226 or 1234 to clear one of the Output Active flip-flops. The signal also passes over either conductor 1240 or 1242 to clear the particular monitor in question, thereby preventing the initiation of an Internal Interrupt to clear the associated flip-flop in the Working Register, and to set the 194 or 195 flip-flops to initiate a simulated External Interrupt signal.

Referring again to FIG. 20, which shows the details of the Working Register, let it be assumed that only one channel is set active, e.g. channel 1. Under this condition during the loading cycle only the Working Register flip-flop V41 will be set. When the Out-on-2 Request is loaded into Priority, a logical "1" output from NOR circuit 19V01 (FIG. 18a) contained therein, clears the V41 flip-flop. The Working Register is at this time completely cleared, both the V40 and V41 flip-flops being in their "0" state. During the next SCAN cycle, at the time that the T80 flip-flop is set, the Working Register is again loaded. Since under the assumed conditions channel 1 is the only one active, V41 will be the only flip-flop set. This Out-on-2 Request is loaded into Priority during the SCAN cycle when the T82 flip-flop is set after a RESUME has been received. However, if a simulated RESUME is received, steps must be taken to prevent the second Out-on-2 Request from being honored. This is accomplished when the inverter 90N13 (FIG. 12a) is enabled. The resulting logical "1" signal therefrom forces the output from gate 14O00 (FIG. 21) to a "0." This output in conjunction with the "0" output from the Ready flip-flop O61 enables the gates 15O01 to clear the Output Active flip-flop on channel 1 and the Working Register flip-flop V41 associated with channel 1. The effect of all of this is to disable the Out-on-2 Request before it is honored by the Input-Output section. The simulated External Interrupt is in the meantime processed to check the cause of the malfunction on channel 1.

DISABLE INTERCOMPUTER BUFFER
CIRCUIT—FIG. 22

In FIG. 22 there is shown the circuitry employed to enable the clearing of the Output Active flip-flops on channels 0 and 1 when the buffer transfer has been completed. The output from the Disable Intercomputer Buffer flip-flop V71 is applied to the 17O00 and 17O01 (FIG. 21) gates associated with the Output Active flip-flops for channels 0 and 1 and is one of the enables required for clearing these last mentioned flip-flops. In order to set the V71 flip-flop, NOR circuit 13V71 must be fully enabled. When an Out-on-2 Request has been honored by the Sub-Priority Network so that the V50 flip-flop contained therein is set, a "0" signal is applied by way of the conductor 1246 to a first input terminal of NOR circuit 13V71. The command enable to set the V71 flip-flop is initiated by the input-output timing and control circuits when the initial and terminal addresses of the buffer control word become equal. When this condition arise the output from NOR circuit 89N51 (FIG. 12e) is a logical "1" signal during the time that the T88 flip-flop is set during the DISABLE I/O₁ sequence. This "1" signal is applied by way of conductor 1248 to the inverter 12V71 causing a "0" signal to appear on conductor 1250 which is connected to a second terminal of NOR circuit 13V71. At the time $\phi1$ following the generation of this command enable, NOR circuit 13V71 becomes fully enabled and outputs a "1" signal on its conductor 1252 to set the V71 flip-flop.

In order to clear the Disable Intercomputer Buffer flip-flop, the Resume flip-flop V40 (FIG. 23b) must be set such that a "0" signal appears on the conductor 1254 leading to a first input of NOR circuit 15V76. If the logical "1" output from NOR circuit 91N21 is a result of the Ready flip-flop being cleared rather than the Resume flip-flop being set, NOR circuit 15V76 cannot be enabled. However, if the Resume flip-flop O40 is set and the output from NOR circuit 14V71 is a "0," at $\phi1$ time inverter 15V76 will be fully enabled and the V71 flip-flop will be cleared. The clearing of this flip-flop removes the disabling signal from the special intercomputer channels.

READY AND RESUME CIRCUITS—FIG. 23

It will be recalled that the READY signal is transmitted from the sending computer to an external computer and is the means employed for advising the receiving computer that data is available in the sending computer's output register and can be sampled. This signal remains on the line until the Resume flip-flop is set. The Ready flip-flops V60 and V61 for channels 0 and 1, respectively, may initially be cleared by a Master Clear signal applied to the conductor 1256. When the data is placed in the output register, the Ready flip-flops are in their cleared state. The command to send the READY signal is initiated by the I/O control circuits at the time that the T90 flip-flop is set during the disable I/O₂ sequence. At this time the output from NOR circuit 92N54 (FIG. 12f) is a "1" which when applied by way of conductor 1258 to the input of inverter 12O60 forces the output from 12O60 to a "0" signal. This signal is applied by way of conductor 1260 to a first input terminal of the 13OXX gates associated with the Ready flip-flops V60 and V61. At a $\phi4$ time following the generation of this command enable, the particular 13OXX circuit designated by the output from the Translator (channel designation) is enabled to set only one of the Ready flip-flops. The output from the "0" side of the Ready flip-flop is amplified by means of the ready amplifier 1262 or 1264 and a "1" signal appears on the output conductor 1266 or 1268, depending upon which of the Ready flip-flops is set. These last mentioned conductors are the control lines which are connected into the input-output section of the receiving computer. With a Ready flip-flop set, the "0" output from the "1" side thereof is utilized as a partial enable required for clearing the Output Active flip-flop associated with the channel in question for setting the Resume flip-flop and for resetting the Resume Gate flip-flop. More specifically, the "0" signal appearing at the "1" side of the V60 flip-flop when it is set, is applied by means of the conductor 1270 to a first input of an inverter 15O80. Similarly, the "0" signal at the "1" side of the V61 flip-flop when it is set passes by way of conductor 1272 to a first input terminal of inverter 15O81.

The Ready signal remains on the control line until a Resume signal is returned from the receiving computer or a Simulated Resume is generated by the transmitting computer. At any rate, when the Resume flip-flop V40 (FIG. 23b) is set, it is then possible for the input-output control circuits to generate the command enable CLEAR READY FLIP-FLOP. It may be recalled that this command is generated at the time that the T82 flip-flop is set during the SCAN sequence when the output from NOR circuit 90N21 (FIG. 12b) is a "1" signal which forces the output from NOR circuit 14V71 (FIG. 22) to a "0." At the next succeeding $\phi1$ time the "0" output from 14V71 passes through and is inverted by NOR circuit 15O60 (FIG. 23a) so that a logical "1" signal appears on conductor 1274. This signal passes by way of conductors 1276 and 1278 to clear the particular Ready flip-flop which had been previously set.

The RESUME signal is sent from an external computer to inform the transmitting computer that the data lines have been sampled. After the data has been set on the output lines of the transmitting computer and the READY signal has been sent on the designated channel, the computer waits for the return of the RESUME signal. In FIG. 23 the RESUME signals enter the computer by way of conductor 1280 for channel 0 and 1282 for channel 1. With no signal on the line, the input to the inverters 13O80 and 13O81 are both "0's." The resulting logical "1" signal appearing at the output terminals of these inverters pass through the OR circuits 1284 and 1286 to set the Resume Gate flip-flops O80 and O81. The resulting logical "0" signal appearing at the output from the "1" side of the Gate flip-flops is one of the enables required by the inverters 15O80 and 15O81. When a RESUME signal is received, for example, on channel 1, the input to inverter 13O81 is a logical "1" signal which forces the output from this inverter to a "0." This "0" signal is applied by means of conductor 1288 to a first input terminal of the gate 15O81. For the RESUME signal to appear on channel 1 it is necessary that a READY signal was previously sent over this same channel and hence a "0" signal is applied by means of a conductor 1272 from the "1" side of the Ready flip-flop V61 to a second input of gate 15O81. As has been mentioned, the Resume Gate flip-flops O80 and O81 are both set at this time so that a "0" signal appears on the conductor 1290 connected to the "1" side of the Resume Gate flip-flop and is applied to a third input of the 15O81 gate. At a $\phi2$ time then this gate becomes fully enabled outputting a "1" signal on conductor 1292 which passes through OR circuit 1294 to set the Resume flip-flop V40. When it is set, the "0" output from the "1" side thereof enables the particular 17OXX gate which is currently receiving a "0" signal from the "1" side of its associated Ready flip-flop. Under the conditions which were assumed in the example, i.e., the V61 flip-flop is set, it will be gate 17O81 which is fully enabled at this time. The resulting "1" signal appearing on its output conductor 1296 passes to the "0" side of the Resume Gate flip-flop O81 and clears it. The effect of this is to remove the enable from the 15O81 gate. Also, this action insures that the signal on the Resume control line must be dropped by the external computer before it can again be set to the "1" state. The logical "0" signal appearing at the output of the Resume flip-flop V40 also appears on conductor 1298 and is applied to the inverter 15V76 of the Disable Intercomputer Buffer circuit of FIG. 22. Its effect is to clear the Disable Buffer flip-flop. At the same time, the logical "1" signal appearing on conductor 1300 is applied to NOR circuit 14V70 in the input-output control circuits (FIG. 12b) and forces the output from this inverter to a "0" which is an enabling signal for NOR circuit 90N21. As has already been mentioned, the output from NOR circuit 90N21 is utilized during the SCAN sequence to provide enables to clear the Ready flip-flop, the Disable Buffer flip-flop and to load the next Out-on-2 Request into the Sub-Priority Network. The Resume flip-flop remains set until the next Out-on-2 Request is processed by Sub-Priority. At this time the output from inverter 03V50 (FIG. 17c) connected to the "1" side of the Out-on-2 flip-flop in Sub-Priority circuit becomes a logical "0." The command enable CLEAR RESUME FLIP-FLOP is generated by the input-output control circuits at the time during the SCAN sequence that the T88 flip-flop is set. The output from NOR circuit 92N51 (FIG. 12e) which appears at this time, is a "0" signal which at $\phi1$ time fully enables NOR circuit 17O40. The resulting logical "1" output signal on conductor 1302 clears the Resume flip-flop in preparation for the reception of the next RESUME signal.

INTERRUPT STORAGE ADDRESS REGISTER—FIG. 24

The Interrupt Storage Address Register is illustrated in block diagram form in FIGS. 24a and 24b and consists of a 6-bit register comprised of the flip-flops V20 through V25 and the Interrupt flip-flop V57.

This register may be cleared in one of two ways. First when the Master Clear pulse is applied to the conductor 1310 the output from NOR circuit 10V20 is forced to a "0" level, which when applied by way of conductor 1312 serves to partially enable NOR circuits 11V20 and 11V23. At the subsequent φ4 time, these inverters become fully enabled thereby producing logical "1" signals on the conductors 1314 and 1316. These conductors lead to the "0" side of each of the flip-flops in the register and hence the signals thereon are effective to clear the register. The second way in which the Interrupt Storage Address Register may be cleared is by the production of a "1" signal at the output of NOR circuit 88N51. More specifically, when an Interrupt Request is processed by the Sub-Priority Network, one of the inputs to NOR circuit 22V53 is a "1" signal which forces its output to a "0" signal. For example, if an Internal Interrupt Input is the mode selected by the Sub-Priority Network, the output from NOR circuit 19V53 (FIG. 17b) will be a logical "1" signal whereas if an External Interrupt is honored, the output from NOR circuit 19V55 (FIG. 17a) in the Sub-priority Network will be a "1" signal. Provided, then, that an Interrupt Request of some type is being processed, at the time during the SCAN sequence that the T87 flip-flop is set, NOR circuit 88N51 becomes fully enabled producing a "1" signal on the conductor 1318. This signal in turn causes inverters 10V20 and 12V23 to output logical "0" signals. At the following φ4 time NOR circuits 11V20 and 11V23 become fully enabled thereby clearing all of the Interrupt Address Register flip-flops.

When the Interrupt flip-flop V57 is set, an interrupt mode is indicated. For an interrupt, the logical "1" output from NOR circuit 88N51 in addition to the effecting the clearing of the register, forces the output from NOR circuit 12V20 to a "0." Therefore, at the following φ2 time, NOR circuit 13V57 becomes enabled and outputs a "1" signal on conductor 1320 to set the Interrupt flip-flop V57. The resulting logical "1" signal appearing at the "0" side of the Interrupt flip-flop and at the output of inverter 02V57 connected to the "1" side of this flip-flop, prevents the processing of any Interrupt Request by the Sub-Priority Network. This measure insures that the original conditions which cause the flip-flop to be set in the first place have been met. At the same time, the "0" output from the Interrupt flip-flop V57 is utilized as a conditional enable in the A-sequence timing chain (not shown) to permit the execution of an instruction, other than the next instruction in the program. As will be shown subsequently, the next instruction to be processed following the interrupt will be determined by the contents of the Interrupt Address Storage Register.

The manner in which the Interrupt Address Storage Register is loaded will now be explained. The logical "1" output appearing on conductor 1318 from NOR circuit 88N51 occurring when either an External Interrupt or an Internal Interrupt is honored by Sub-Priority, forces the output from NOR circuits 12V20 and 12V23 to "0"'s which are applied as inputs to the 13V20 through 13V25 inverter circuits. Another input to these last mentioned circuits comes from the Priority Network and is the address for the particular type of interrupt currently being honored. At the following φ2 time, selected ones of the 13V20 through 13V25 inverters are fully enabled, depending upon the output from the Priority Network, to effect a setting of certain of the register flip-flops V20 through V25. In other words, the setting of the register is conditioned by the interrupt address generated by the Priority Network. This information is held in the Interrupt Storage Address Register until acted upon during the A-sequence of the main computer control.

The upper 2 bits of the interrupt address, i.e., the outputs from flip-flops V24 and V25, are translated by the inverters 21V24 through 24V24 to generate reset signals for clearing the circuits that originally generated the interrupt. For example, if it is an External Interrupt which has been honored by Sub-Priority, the special addresses allocated in memory are in the range between 00020 through 00035 (octal). The initial address of the external interrupt entrance register is set to 00020 and this address is incremented by the channel number of the particular channel that is currently being honored by the Priority Network. In other words, if the External Interrupt is being processed on channel 6, the address set up will be 00026. In binary notation, the usable portion of the upper octal bit is 01. This means that the V25 flip-flop remains cleared and the V24 flip-flop is set. Under this condition the only circuit that can be enabled at this time is NOR circuit 22V24 which has "0" inputs from the "0" side of the V25 flip-flop and the "1" side of the V24 flip-flop. The resulting logical "1" signal appearing on its output conductor 1322 is applied to the External Interrupt Gates to reset them. If it had been an Internal Interrupt Input which had been honored by Sub-Priority, the special address is question would lie in the range between 00040 and 00055 (octal), the particular address being dependent upon the particular channel on which this request was generated. In this case the usable upper bits are always 10 which sets the V25 flip-flop and keeps the V24 flip-flop cleared. It will be seen that NOR circuit 23V24 is the only circuit fully enabled at this time and the resulting "1" signal appearing on its output conductor 1324 is employed to clear the Input Monitor circuits. Finally, the last type of interrupt, i.e., an Internal Interrupt Output, utilizes the special addresses in memory from 00060 to 00075 (octal). This means that the upper bits are 11 (binary) which causes the V24 and V25 flip-flops to be set. The only inverter having all of its inputs at the "0" level will be 24V24 under this condition and the resulting "1" signal appearing on its output conductor 1326 is employed to clear the Output Monitor circuits. Whenever an Interrupt request has been loaded into the Interrupt Address Storage Register, either one or both of the flip-flops V24 and V25 will be set. As a result, logical "1" signals will be presented to the inputs of the inverter 21V24 causing a "0" signal to appear on the conductor 1328. This signal goes to the A-sequence timing chain and serves as an enable for the processing of the Interrupt Request. Since the present invention is concerned primarily with the input-output section of the computer, it is felt to be unnecessary to describe in detail the various timing and control circuits making up the main control section of the computer. However, it can be stated generally that when an interrupt is processed by the computer, a special sub-routine is executed. During the A-sequence a signal is provided to the Storage Address Register (S-register) to transfer the contents of the Interrupt Address Register thereto. With this special address now in the Storage Address Register, the memory can be referenced and the special sub-routine executed in the normal manner. In addition to providing outputs to the S-register, the Interrupt Address Storage Register also supplies signals to the Translator. More specifically, the output from the "1" side of the Interrupt Address flip-flops V20 through V23 connect into the Translator. The manner in which the Translator is loaded with this special address has already been described in connection with FIG. 19 and therefore will not be repeated here. The output from the Translator along with the output from one of the inverters 22V24 through 24V24 resets the Interrupt circuits only on the particular channel specified by the Translator.

ACTIVE FLIP-FLOP NORMAL CHANNELS— FIG. 25

Each of the 12 normal input and output channels has an Active flip-flop associated with it. Whenever this flip-flop is set, the channel is active or capable of handling input or output data. When the flip-flop is in a cleared condition, the channel is inactive and not capable of handling data.

As was mentioned, the control of initially setting a channel active belongs to the main computer program. It may be recalled that during the execution of an Input Buffer Instruction or an Output Buffer Instruction in the A-sequence, the $j*$ designator is transmitted to the Translator to designate the channel which is to be set active. During the D-sequence a command enable is generated to set the channel active and this signal is applied by way of a conductor 1330 to a NOR circuit 1332. This signal is ANDED along with the enabling signal from the Translator and $\phi 1$ signal from the clocking circuits, to fully enable the NOR circuit 1334. This last mentioned circuit outputs a "1" signal to set the Active flip-flop to its "1" state. The resulting "0" signal appearing at the output of the "1" side of the Active flip-flop is applied to the Input or Output Request Gate for the selected channel.

Once set, the channel remains active until the initial and terminal addresses of the index word are equal. It should be recalled that during the DISABLE I/O₁ sequence if the contents of the lower half of the Z-register become equal to that of the upper half, NOR circuits 93N51 or 89N51 (FIG. 12c) become enabled, depending on whether an input or an output buffer is in process. The resulting command enable to clear the active flip-flop is applied to the conductor 1336 and is inverted by the NOR circuit 1338. The resulting "0" signal is applied to a first terminal of the NOR circuit 1340. The Translator at this time holds the channel number of the designated channel. At the following $\phi 1$ time, therefore, NOR circuit 1340 outputs a "1" signal which passes through the OR gate 1342 to clear the Active flip-flop.

EXTERNAL FUNCTION AND OUTPUT ACKNOWLEDGE CIRCUITS—FIG. 26

When an output buffer transfer has been completed so that the data signals are contained in the $C_0$ register, the computer follows later by sending a control signal to the peripheral device on the selected channel. In the case of a normal output buffer the Output Acknowledge signal informs the peripheral unit that the data is available. In the case of an External Function, the control signal informs the peripheral unit to sample the data line.

In FIG. 26 there is shown a flip-flop O83 which is the means employed to determine whether it will be an Output Acknowledge signal or an External Function signal which will be sent out on the selected channel. The command enable SEND OUTPUT ACKNOWLEDGE from inverter 94N54 (FIG. 12f) sets the O83 flip-flop. When this flip-flop is set a "1" signal appears at the junction 1350. This "1" signal is conveyed by way of the conductor 1352 to the input of an inverter 18O62. The resulting "0" output signal on the conductor $\overline{1354}$ provides one of the enables required for the Output Acknowledge Amplifiers 30Y02, 30Y03, etc. The logical "1" signal appearing at the junction 1350 passes through NOR circuit 20O62 and the "1" signal appearing on the output conductor $\overline{1358}$ from this inverter is effective to disable the External Function Amplifiers 41Y02, 41Y03, etc.

When the computer is in an output mode and has set the data line, the Translator holds the designated channel number. The "0" output from the Translator is one of the enables required by the 13OXX inverters to set its associated flip-flop. For example, if channel 2 is the selected channel, NOR circuit 33V02 located in the Translator is outputting a "0" signal which is applied by way of the conductor 1360 to a first input terminal of NOR circuit 13O62. At the time in the e-designator timing chain when the inverter 94N54 is fully enabled, the command enable SEND OUTPUT ACKNOWLEDGE is applied to the conductor 1362. This signal is inverted by NOR circuit 12O62 so that a "0" signal is applied by way of circuit $\overline{1364}$ to a second input terminal of the NOR circuit 13O62 and others similarly disposed. At the following $\phi \overline{4}$ time the NOR circuit 13O62 will be fully enabled and will output a "1" signal on its conductor 1366 to set the O62 flip-flop. None of the other flip-flops can be fully enabled at this time because only one channel may be selected at a time by the Translator. With the flip-flop O62 set a "0" signal is developed on its output conductor $\overline{1368}$ which fully enables the Output Acknowledge Amplifier 30Y02. If the output buffer had been performed on channel 3 it would have been inverter 13O63 which would have been fully enabled so that the Output Acknowledge signal would be sent from the amplifier 30Y03.

In the case of an External Function signal, when the computer executes the External Function Instruction, a signal is developed in the A-sequence timing chain (not shown) which passes to the "0" input terminal of flip-flop O83 by way of the conductor 1370. A "0" signal appears at junction 1350 when the O83 flip-flop is cleared. This signal passes by way of conductor 1352 and through inverter 18O62 to produce a "1" signal on conductor 1354, disabling the Output Acknowledge Amplifier. The "0" signal which appears at junction 1350 is inverted by NOR circuit 20O62 so that a "0" signal appears on the conductor 1358. The External Function Amplifiers 41Y02, 42Y03, etc. are therefore partially enabled. The A-sequence timing chain also outputs a "1" signal on the conductor 1372 during the execution of an External Function Instruction. Inverter 12O62 therefore outputs a "0" signal on its conductor $\overline{1364}$ to partially enable the NOR circuits 13O62, 13O63, etc. It may be recalled that during the execution of the External Function Instruction, the $j*$ portion of the instruction word is loaded into the Translator flip-flops so that control signals are developed on only those lines associated with the selected channel. One of the lines coming from the Translator is connected to an input of the inverters 13OXX. Therefore, at phase 4 time, only the inverter receiving a signal from the Translator will be fully enabled to set its associated flip-flop. For example, if the $j*$ designator is 0011 (decimal 3) the Translator will output a "0" signal to the conductor 1374 connected to the 13O63 inverter on channel 3. With the O63 flip-flop set only External Function Amplifier 41Y03 will be fully enabled to output the External Function signal to the peripheral unit on channel 3.

The Output Acknowledge signal remains on the line for a predetermined time and is then cleared. This clearing signal is applied by way of the conductor 1376 connected to one input of NOR circuit 10O62 and comes from inverter 11O60 (FIG. 23). This circuit inverts the "1" signal causing a "0" signal to be applied to an input of inverter 11O62. At the following $\phi 1$ time circuit 11O62 is fully enabled and outputs a "1" signal on conductor 1378 to clear the Output Acknowledge and External Function flip-flops. During the execution of an External Function instruction the timing chain outputs a signal to clear the External Function flip-flops. The signal is applied to NOR circuit 10O62 by way of conductor 1380.

INPUT ACKNOWLEDGE CIRCUITS—FIG. 27

The Input Acknowledge signal is the means employed by the computer to inform the peripheral unit on the selected channel that the computer has stored the data and is now capable of accepting another word. FIG. 27 illustrates a typical input acknowledge circuit for a single channel. It may be recalled that at the time during the DISABLE I/O$_1$ sequence when the T88 flip-flop is set, the inverter 86N51 becomes fully enabled and generates the command enable CLEAR INPUT ACKNOWLEDGE FLIP-FLOPS. This signal is applied to the NOR circuit 10I60 so that a "1" signal appears on its output conductor 1382 to partially enable NOR circuit 11I60. At the next following phase 4 time 11I60 is fully enabled generating a "1" signal which clears the Input Acknowledge flip-flop. The flip-flop was originally set on the preceding Input Buffer transfer.

When the computer is in an input mode and has sampled the data lines, the Translator has already been loaded with the designated channel number. The "0" output from the Translator is one of the enables required by the 13I60 circuit. The command enable SEND INPUT ACKNOWLEDGE is generated by the e-sequence timing chain during the DISABLE I/O$_2$ sequence when the output from NOR circuit 97N51 is a "1" signal. The NOR circuit 12I60 of FIG. 27 inverts this signal causing a "0" signal to be applied to a second input terminal of NOR circuit 13I60. At the following $\phi 1$ time, this last mentioned inverter becomes fully enabled, setting the Input Acknowledge flip-flop on the channel specified by the Translator. With the flip-flop set, the input to the control line driver or amplifier 10Y00 is a "0" signal. The Input Acknowledge signal is now on the control line running to the peripheral unit and will remain there for a fixed time established by a timing chain.

SIMPLIFIED Z-REGISTER AND BUFFER COMPARATOR STAGES—FIG. 28

The memory communications register or Z-register is comprised of a set of 30 bistable stages and functions as a portal between the memory and other parts of the computer. FIG. 28 illustrates the hardware required for implementing only two stages of the Z-register. Because the remaining stages of the Z-register are substantially identical to those shown, they have been omitted from the drawing for the sake of simplicity. The reason for illustrating stages Z09 and Z24 is that they occupy the same relative bit positions in the lower half and the upper half of the Z-register, respectively. As will be described subsequently, the buffer comparator compares the output from the corresponding stages of $Z_L$ and $Z_U$ and when equality is detected a signal is generated to terminate the buffer transfer on the selected channel. To further simplify the drawing of FIG. 28, only the inputs and outputs from the Z-register which are utilized by the Input-Output section of the computer are illustrated.

The stages of the Z-register are capable of being cleared by signals coming from the memory timing chain, thus preparing them for later reception of data from the memory or from the other registers of the computer.

FIG. 29 illustrates a typical gated amplifier for supplying data signals to one stage of the Z-register. Similar equipment is provided for each stage of the Z-register. It may be seen that the Translator provides the gating signals required by the Data Input Gated Amplifiers. Hence, the data signals coming from a piece of external equipment can be applied to the Z-register by way of only one channel at a time.

The data bits are gated into the Z-register by means of the command enables TRANSFER DATA TO $Z_U$ and TRANSFER DATA TO $Z_L$ which come from NOR circuits 98N21 and 97N21 (FIG. 12b) of the I/O control circuits, respectively. These command enable signals are applied to the conductors 1390 and 1392 of the Z-register. The inverters 14Z20 and 14Z05 invert these command enable signals causing "0" signals to appear on the conductors 1394 and 1396. Provided that the data signal coming from the peripheral device on the selected channel in the 9th bit position is a "1" signal so that the output from the NOR circuit 1398 (FIG. 27) is a "0" signal, NOR circuit 15Z09 will be fully enabled at time $\phi 1$, outputting a "1" signal to set the 9th stage of the Z-register.

If the data bit from the peripheral device had been a "0" signal, NOR circuit 1398 would have been fully enabled, and hence, a "1" signal would have been applied to the input terminal of NOR circuit 15Z09. This signal would have disabled this last mentioned inverter and stage Z09 would have remained cleared. Data bits are loaded into the other stages of the Z-register in substantially the same manner.

As has already been described, the Z-register provides an output to various registers in the computer. These registers include the $C_0$ and $C_1$ registers which are the interface between the computer and the peripheral equipment during an output buffer transfer operation. Also, the Z-register feeds signals to the Storage Address Register (S-register) so that index words extracted from the memory may be used to read and/or write data signals from or into the memory. Since only the lower 15 stages of the Z-register ever contain address representing signals, these are the only stages which provide an output to the S-register. The Z-register also provides a connection to the incrementing circuits so that the index words can be incremented by one before being replaced in their buffer control register in the memory. The details of this incrementing circuitry will be described later on in the specification. Finally, each stage of the Z-register provides outputs to the buffer comparator.

FIG. 28 illustrates the circuitry required for comparing the contents of corresponding stages in the lower and upper halves of the Z-register. Assuming first that the contents of stage 9 are equal to those of stage 24 (say both logical "0"'s), the signals applied to the input terminals 1400 and 1402 of NOR circuit 30Z09 will be "0" and "1," respectively. Under the assumed condition the signals applied to input terminals 1404 and 1406 of NOR circuit 32Z09 will be a "0" and a "1," respectively. Therefore, both inverters 30Z09 and 32Z09 will be outputting "0" signals to NOR circuit 33Z01 causing a "1" signal to appear on its output conductor 1408. Inverter 33Z04 connected to the output of inverter 33Z01 will therefore output a "0" signal to the input terminal of inverter 33Z06. Provided that the output from the other stages of the comparator are also logical "0" signals, indicating an equality between corresponding bits in the upper and lower half of the Z-register, NOR circuit 33Z06 will be fully enabled and will output a "1" signal on the conductor 1410. Inverter 33Z07 converts this "1" signal to a logical "0" so that when equality is detected between all stages, a "0" signal will be supplied to the inverters 89N51 and 93N51 in the input-output control circuits. It will be recalled that when the input to these last mentioned NOR circuits from the buffer comparator are "0" signals, a command enable is generated to clear the Active flip-flop on the selected channel involved. By tracing the signal flow through the comparator stages illustrated when it is assumed that stages 9 and 24 of the Z-register both contain "1" signals, it will be seen that NOR circuit 33Z04 will still be outputting a "0" signal.

Now if it is assumed that the contents of corresponding stages in $Z_U$ and $Z_L$ are different (say Z24=1 and Z09=0), the output from NOR circuit 33Z04 will be a "1" signal serving to disable NOR circuit 33Z06. More specifically, the signals appearing on the input terminals 1400 through 1406 will be 1, 1, 0 and 0 respectively. It can be seen that under the assumed conditions NOR circuit 32Z09 will be fully enabled and will output a "1" signal to the input of NOR circuit 33Z01. The signal appearing on conductor 1408 will now be a "0" and hence the output from NOR circuit 33Z04 will be a logical "1" signal. This signal disables the NOR circuit 33Z06 so that a logical "1" signal is generated in the output of NOR circuit 33Z07. This "1" signal when applied to the appropriate inverters in the Input-Output Control section prevents the generation of the command enable signals employed to clear the Active flip-flops. Therefore, only when the contents of the lower half of the Z-register are equal to the contents of the upper half will the Active flip-flops be cleared.

Z-REGISTER INCREMENTING CIRCUITS—FIG. 30

It may be recalled that when the Input-Output section of the computer is operating, each time that a data transfer takes place the index word associated with the particular channel involved is read out from the memory to the memory communications register (Z-register). After the index word is transmitted to the S-register, it is incremented and restored back into the memory at the address from which it was originally obtained. FIG. 30 illustrates by means of a logical block diagram the apparatus required for incrementing the contents of the Z-register as these contents are replaced in the memory. While for the sake of simplicity only the hardware required for 3 stages of the Z-register is illustrated, it should be understood that identical circuits are provided for each stage thereof. The output signals from the inverters 28ZXX are applied to the memory inhibit generators (not shown). When a "1" signal appears on one or more of the lines 1412, 1416 or 1418, a "1" signal is prevented from being written into the memory from this particular bit location in the Z-register. In order to output a "1" signal on the lines 1412, 1414, 1416 and 1418, it is a requirement first that at least one of the inputs to the NOR circuits 38ZXX be a "1" signal, and secondly that a "0" signal appear on the inhibit enable line 1420. When both of the inputs to the 38ZXX inverters are "0" signals they become fully enabled and permit the writing of a "1" signal into the memory.

Considering for a moment the inputs to the inverters 25Z01 and 26Z01, it can be seen that in order to produce "1" signals on their respective output conductors 1422 and 1424, the inputs to these inverters must all be logical "0" signals. A first input to NOR circuit 26Z01 comes from an inverter connected to the "1" side of the Z-register stage involved. More specifically, the inverter 26Z01 in FIG. 30 is supplied with an input signal from the NOR circuit 02Z01 which is an inverter connected to the output from the "1" side of the second stage (Z01) of the Z-register. The second input to inverter 26Z01 is applied by way of conductor 1426. This conductor is the means employed for propagating a carry signal from a lower order stage of the incrementing circuits. A "1" signal appears on the conductor 1424 only when the second stage of the Z-register is cleared and when no carry signal is being propagated from the lower order stage.

The inverter 25Z01 has 3 input connections, all of which have to be at the "0" level in order to output a "1" signal on conductor 1422. In order for the signal appearing on conductor 1428 to be a "0," it is necessary that the INCREMENT $Z_L$ control flip-flop be set. When this flip-flop is set by the command enable INCREMENT $Z_L$ coming from inverter 94N21 in the input-output control circuits, the inverter 03G10 connected to the "0" side of the control flip-flop will be outputting a "0" signal on its conductor 1430. This signal passes along the bus 1432 to which the conductor 1428 is connected. A second input to NOR circuit 25Z01 comes from the inverter 05Z01 which is connected to the "1" side of the second stage of the Z-register. Only when the second stage is cleared will the signal appearing at the output of NOR circuit 05Z01 be a logical "0." The final input to NOR circuit 25Z01 comes from the inverter 03Z00. This inverter is connected to the "1" side of the first stage of the Z-register. When the first stage of the Z-register is in its cleared condition, inverter 03Z00 is outputting a "0" signal. In general then, to fully enable the 25ZXX inverter, associated with a particular Z-register stage, it is necessary that the INCREMENT $Z_L$ control flip-flop be set, that the corresponding stage of the Z-register in question be cleared, and that all lower order stages of the Z-register also be cleared. Only when these conditions are satisfied will a "0" signal appear on the conductor 1422.

As an aid in the understanding of the operation of the incrementing circuit, an example of its operation will now be given. Assuming that the first, second and third stages of the Z-register contain the bits 1, 1, and 0 respectively (decimal 3) and further assuming that the INCREMENT $Z_L$ control flip-flop is set, NOR circuits 25Z00 and 25Z01 will be fully enabled while inverters 26Z00, 26Z01, 25Z02, and 26Z02 will be disabled. Logical "1" signals therefore appear on the conductors 1434 and 1422 while "0" signals appear on the conductors 1436, 1424, 1438, and 1440. The only one of the 38ZXX inverters to be fully enabled is 38Z02. Provided that the inhibit enable line 1420 is maintained at the logical "0" level, conductors 1412 and 1416 will have "1" signals thereon while conductor 1418 carries a "0" signal. Since the presence of a "1" signal on the conductors 1412 through 1418 prevents "1" signals from being written into the memory, the code group which will be restored is 001 (decimal 4). It can be seen that this number is one greater than the number which was originally assumed to be in the Z-register.

If, in the above example, the INCREMENT $Z_L$ control flip-flop had remained cleared, the data appearing on conductors 1412 through 1418 would have been 001 so that the data word 110, binary 3, would have been restored into the memory. In other words, the data from the Z-register is written into the memory unaltered.

This completes the description of the unconventional circuits employed in the Input-Output section of the computer. The remaining circuits illustrated in FIGS. 4a through 4c which have not been described in detail are considered to be well known in the art so that a detailed description of them and their operation is deemed unnecessary.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Apparatus for controlling the transfer of data representing signals from a data handling device to the memory of a digital computer comprising: a digital computer having program control means and random access memory means for storing data representing signals and data control words, said data control words defining a group of addressable storage locations in said memory; a plurality of data handling devices; a plurality of communications channels having data lines and control lines adapted to receive both data representing signals and control signals simultaneously from said plurality of data handling devices; selecting means responsive to said control signals from said plurality of data handling devices for selecting only one of said channels at a time for transmission of said data representing signals to said memory means; address register means connected to said memory means; means responsive to the output from said selecting means for placing a memory address of a particular data control word unique to the selected channel in said address register means; gating means connected intermediate said data lines and said memory, responsive to the output of said selecting means for selectively passing data representing signals to the addressable storage location specified by said particular data control word contained in said address register means; incrementing means associated with said address register means for increasing said data control word upon each transfer of data on said selected channel; a comparator connected to said address register means for producing an indicating signal when the contents of said address register means exceeds a predetermined value and means connected to said program control means and responsive to said indicating signal for interrupting the normal program of instructions being executed by the computer.

2. Apparatus as in claim 1 wherein said last mentioned means includes monitor circuits responsive to said indicating signal from said comparator for generating an interrupt signal on said selected channel.

3. Apparatus as in claim 2 and further including register means responsive to said interrupt signal for storing a starting address for initiating the execution of a predetermined program.

4. Apparatus for controlling the transfer of data representing signals from the memory of a digital computer to an external data handling device comprising: a digital computer having program control means and a random access memory means for storing data representing signals and data control words, said data control words defining a group of addressable storage locations in said memory; output register means adapted to receive data signals from said memory means; a plurality of communications channels connected to the output of said register means adapted to transmit data representing signals to a plurality of external data handling devices connected thereto; priority determining means for generating selecting signals for controlling one of said channels at a time for transmission of said data representing signals; a plurality of bistable circuits responsive to the selecting signals from said priority determining means for generating an address for a particular data control word unique to said selected channel; gating means responsive to said selecting signals connected intermediate said memory and said output register for selectively passing data representing signals from the addressable storage location specified by said particular data control word; incrementing means associated with said memory means for increasing said data control word upon each transfer of data on said selected channel; comparator means adapted to receive the output of said incrementing means for comparison with the predetermined value; interrupt signal generating means connected to said program control means for interrupting the normal program of instructions being executed by the computer when the data control word exceeds said predetermined value.

5. Apparatus as in claim 4 and further including further register means responsive to the output from said interrupt signal generating means for storing an address for initiating the execution of a predetermined program.

6. Apparatus for implementing the transmission of information between the memory sections of two interconnected digital data processing machines comprising in combination: a transmitting computer and a receiving computer each having memory means and a plurality of communications channels including data signal lines and control signal lines at least one of said plurality of communications channels on said transmitting computer being connected to said receiving computer; output register means in said transmitting computer for temporarily holding data signals read out from its memory means; means for applying a ready signal to one of said control lines in said one of said plurality of communications channels for advising said receiving computer of the presence of data signals in said output register; means in said receiving computer responsive to said ready signal from said transmitting computer for conditioning a particular memory register in said receiving computer for a subsequent receipt of said data signals; gating means connected intermediate said one of said plurality of communications channels and the memory means in said receiving computer for selectively passing said data signals from said output register of said sending computer to the memory of said receiving computer; and means in said receiving computer for transmitting a signal on another of said control signal lines in said one of said plurality of communications channels for advising said sending computer that said data signals have ben received.

7. Apparatus for implementing the transmission of information between the memory sections of two or more interconnected digital data processing machines comprising in combination: a transmitting computer and at least two receiving computers each having memory means, random access input-output control means, and a plurality of communications channels, said channels including data signal lines and control signal lines; signaling means in said receiving computers connected to a first control signal line in said communications channels, which when active advise said sending computer of their ability to accept data representing signals therefrom; time sharing means in said sending computer connected to said first control signal line for determining the particular receiving computer which will be capable of accepting data during a particular sending operation; output register means in said sending computer adapted to receive data and control signals from the memory of said sending computer for holding said data and control signals read out from its memory means; means connected with said time sharing means for applying a second signal to a second of said control lines for advising said particular receiving computer of the presence of data signals in said output register; means in said particular receiving computer responsive to said second signal for conditioning a predetermined memory register in said receiving computer for a subsequent receipt of the data signals from the output register of said sending computer; gating means connected intermediate the communication channel connected between said sending computer in said particular receiving computer and the memory means of said particular receiving computer for selectively passing said data signals from said output register of said sending computer to the memory of said particular receiving computer; and means including the input-output control means in said particular receiving computer for transmitting a third signal on a third of said control signal lines for advising said sending computer that said data signals have been received.

8. Apparatus as in claim 7 and further including time monitor means connected to receive said second and third signals for generating an interrupt signal when said third signal is received by said sending computer more than a predetermined time after the transmission of said second signal to said receiving computer.

9. Apparatus as in claim 8 and further including register means responsive to said interrupt signal for storing an address for initiating the execution of a predetermined program by said particular receiving computer.

10. Apparatus for implementing the transmission of information between the memory sections of two or more interconnected digital data processing machines comprising in combination: a transmitting computer and at least two receiving computers, each having memory means for storing data representing signals and data control words, input-output control means, and a plurality of communications channels each including data signal lines and control signal lines; signaling means in said receiving computers which when active advise said sending computer of their capacity to receive data representing signals therefrom; means including a first control signal line in the channels connecting said sending computer to said receiving computer for connecting said signalling means to the sending computer; working register means in said sending computer, the contents of which determining the particular one of the receiving computers which will be capable of accepting data during a particular sending operation; an output register in said sending computer for holding data signals read out from its memory means; means connected with said working register means for applying a first control signal to one of the control lines connecting said sending computer to said particular receiving computer for advising said particular receiving computer of the presence of data signals in the output register of said sending computer; priority determining means in said receiving computers connected to receive said first control signal for generating a memory address of a storage location in the memory of said particular receiving computer unique to the mode of operation and the particular channel specified by said first signal; means for extracting a data control word from said memory address; means including said input-output control means and gating means connected intermediate the memory means of said particular receiving computer and said data signal lines of said sending computer for selectively passing the data representing signals from the output register of said sending computer to the location in the memory of said receiving computer specified by said data control word; and means including the input-output control means in said receiving computer for subsequently producing a second control signal on another of said control signal lines in the channel between said sending computer and said particular receiving computer for advising said sending computer that the data representing signals have been received and stored.

11. Apparatus for controlling the transfer of data representing signals between the random access memory of a digital computer and external data handling devices, comprising: a digital computer having random access memory means for storing data representing signals and data control words, said data control words defining a group of addressable storage locations in said memory; a plurality of data handling devices; a plurality of communications channels each containing data lines, request control lines and acknowledge control lines for connecting said computer to said plurality of data handling devices; mode determining means in said computer for examining the signals on said request control lines and selecting a particular mode of operation as determined by the control line signals; priority determining means connected to receive the output from said mode determining means for selecting only one of the channels that may simultaneously be carrying identical control line signals; address generating means connected to said priority determining means for developing a memory address unique to said particular mode and selected channel; an address register adapted to receive said memory address; means responsive to the contents of said memory address register for reading out the data control word contained at said address to said memory address register; gating means connected between said data lines and said memory means; and control means connected to said gating means, rseponsive to the presence of said data control word in said address register means, for enabling the transmission of data signals to or from the storage location determined by said data control word.

12. Apparatus as in claim 11 and further including means connected to said control means for applying a signal to a particular control line associated with the selected one of said plurality of communications channels for signalling the data handling device connected thereto that the data signals have been transferred.

13. Apparatus as in claim 11 wherein said mode determining means includes a bistable circuit for each of the possible modes of operation of said computer; means connecting the request control lines for each of said plurality of channels to corresponding one of said bistable circuits; a plurality of gates, means connecting the outputs of said bistable circuits to said plurality of gates such that only one of said gates is enabled in response to the receipt of request control signals by said bistable circuits.

References Cited by the Examiner

UNITED STATES PATENTS

| | | | |
|---|---|---|---|
| 3,029,414 | 4/1962 | Schrimpf | 340—172.5 |
| 3,056,110 | 9/1962 | Cypser et al. | 340—172.5 |
| 3,061,192 | 10/1962 | Terzian | 235—157 |
| 3,063,036 | 11/1962 | Reach et al. | 340—172.5 |
| 3,079,082 | 2/1963 | Scholten et al. | 235—157 |

FOREIGN PATENTS 875,695   8/1961   Great Britain.

OTHER REFERENCES

Pages 75–81, December 1959, Lourie et al., Arithmetic and Control Techniques in a Multiprogram Computer, Proceedings of the Eastern Joint Computer Conference.

Pages 101–107, December 1959, Chao, The System Organization of MOBIDIC B, Proceedings of the Eastern Joint Computer Conference.

ROBERT C. BAILEY, *Primary Examiner.*

MALCOLM A. MORRISON, *Examiner.*

P. J. HENON, *Assistant Examiner.*